(12) United States Patent
Liu

(10) Patent No.: US 12,495,274 B2
(45) Date of Patent: Dec. 9, 2025

(54) METHOD FOR DETERMINING CONTROL TARGET, MOBILE DEVICE, AND GATEWAY

(71) Applicant: HUAWEI TECHNOLOGIES CO., LTD., Guangdong (CN)

(72) Inventor: Jianjun Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 656 days.

(21) Appl. No.: 17/920,646

(22) PCT Filed: Apr. 20, 2021

(86) PCT No.: PCT/CN2021/088395
§ 371 (c)(1),
(2) Date: Oct. 21, 2022

(87) PCT Pub. No.: WO2021/218707
PCT Pub. Date: Nov. 4, 2021

(65) Prior Publication Data
US 2023/0141356 A1    May 11, 2023

(30) Foreign Application Priority Data
Apr. 26, 2020    (CN) .......................... 202010340394.0

(51) Int. Cl.
*H04W 4/02* (2018.01)
*H04L 12/28* (2006.01)

(52) U.S. Cl.
CPC ........ *H04W 4/026* (2013.01); *H04L 12/2816* (2013.01)

(58) Field of Classification Search
CPC .......... G01S 3/14; G08C 17/02; G08C 23/04; H04B 7/0626; H04B 7/0632; H04B 7/0641; H04B 7/0658; H04L 12/12; H04L 12/2816; H04L 5/0025; H04L 5/0048; H04L 5/0091; H04L 67/125; H04M 1/72415; H04M 1/72457; H04W 4/025; H04W 4/026; H04W 52/325; H04W 52/54; H04W 4/023
See application file for complete search history.

(56) References Cited

U.S. PATENT DOCUMENTS

| 8,457,651 | B2* | 6/2013 | Forutanpour ..... H04M 1/72412 345/158 |
| 11,520,550 | B1* | 12/2022 | Bushnell ................. H04R 5/04 |
| 2015/0348403 | A1 | 12/2015 | Berelejis et al. |

(Continued)

FOREIGN PATENT DOCUMENTS

| CN | 104460330 A | 3/2015 |
| CN | 104635505 A | 5/2015 |

(Continued)

*Primary Examiner* — Matthew D. Anderson
*Assistant Examiner* — Dung L Lam

(57) ABSTRACT

A method for determining a control target is provided. In the method, a mobile device, a gateway, and intelligent devices collaborate to independently construct an intelligent network including three-dimensional location information. After network construction is completed, a control target can be intelligently determined based on a pointing direction of the mobile device held by a user. This simplifies a process of determining the control target and improves usability of human-machine interaction.

20 Claims, 45 Drawing Sheets

(56) References Cited

U.S. PATENT DOCUMENTS

2016/0252605 A1 9/2016 Xia et al.
2018/0151060 A1 5/2018 Griffin

FOREIGN PATENT DOCUMENTS

| CN | 107422956 A | 12/2017 |
| CN | 107493311 A | 12/2017 |
| CN | 109831738 A | 5/2019 |
| CN | 110568767 A | 12/2019 |

* cited by examiner

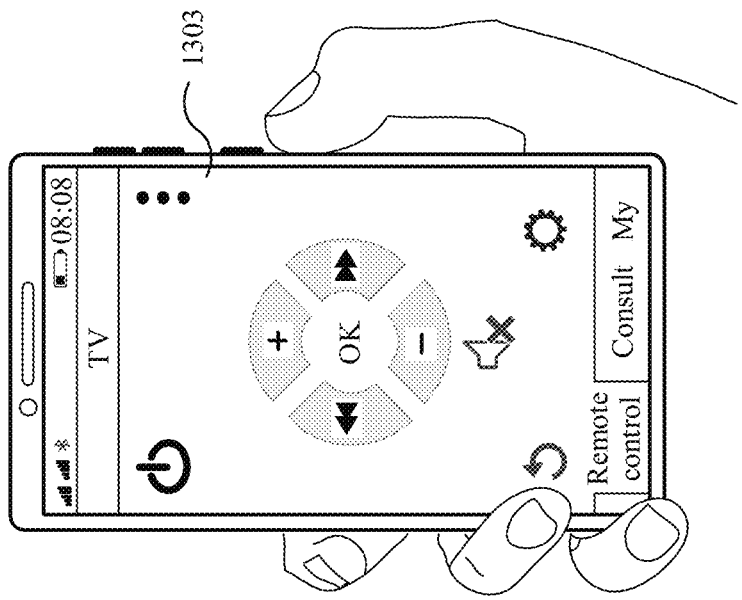
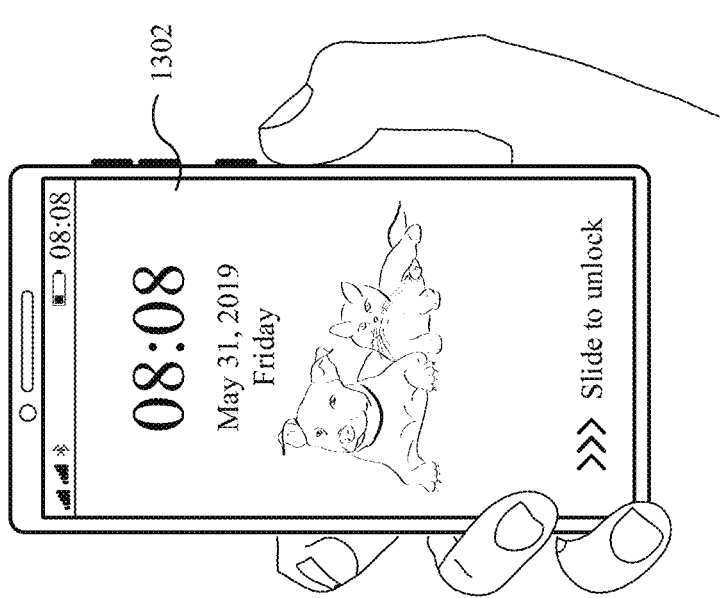
FIG. 13B

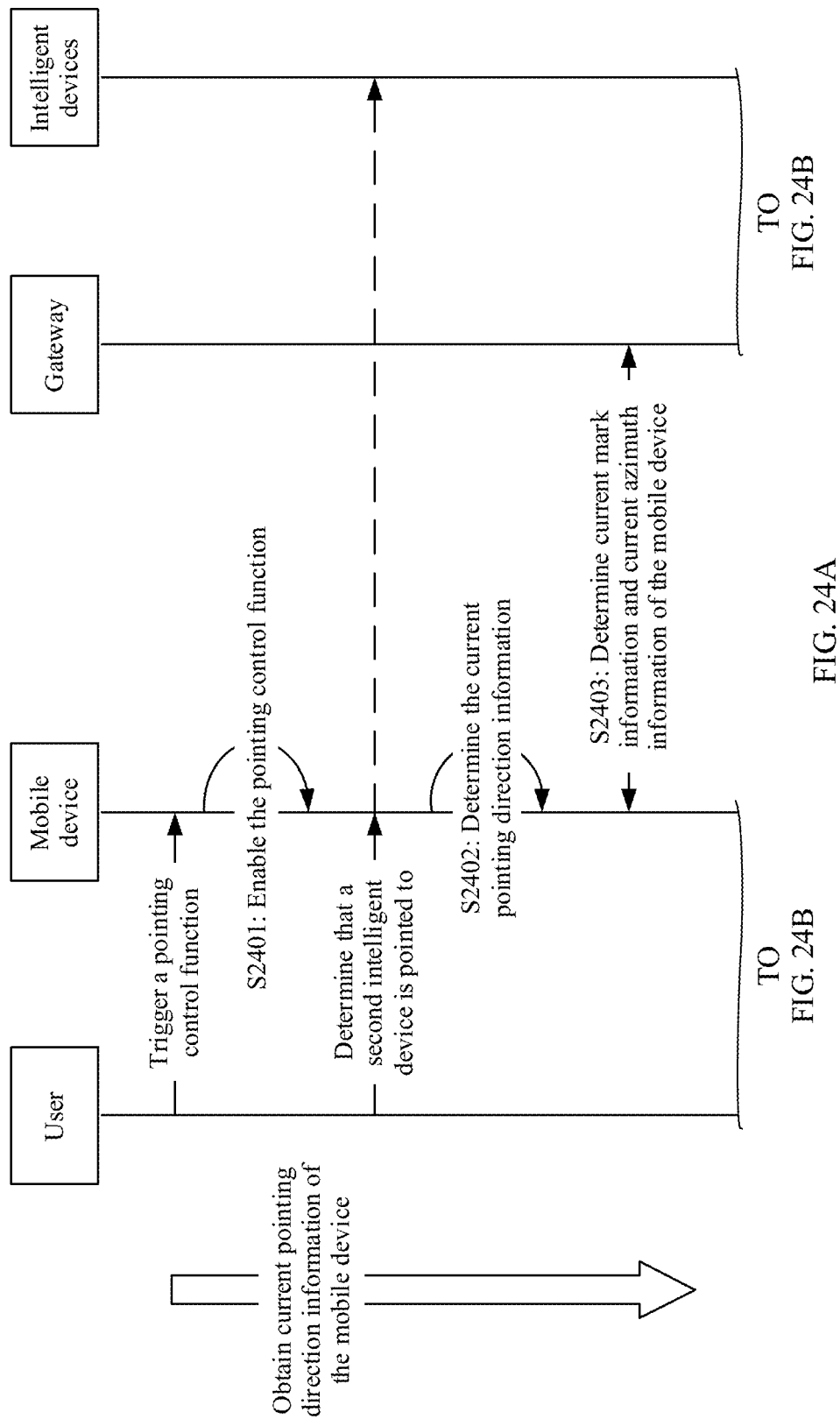

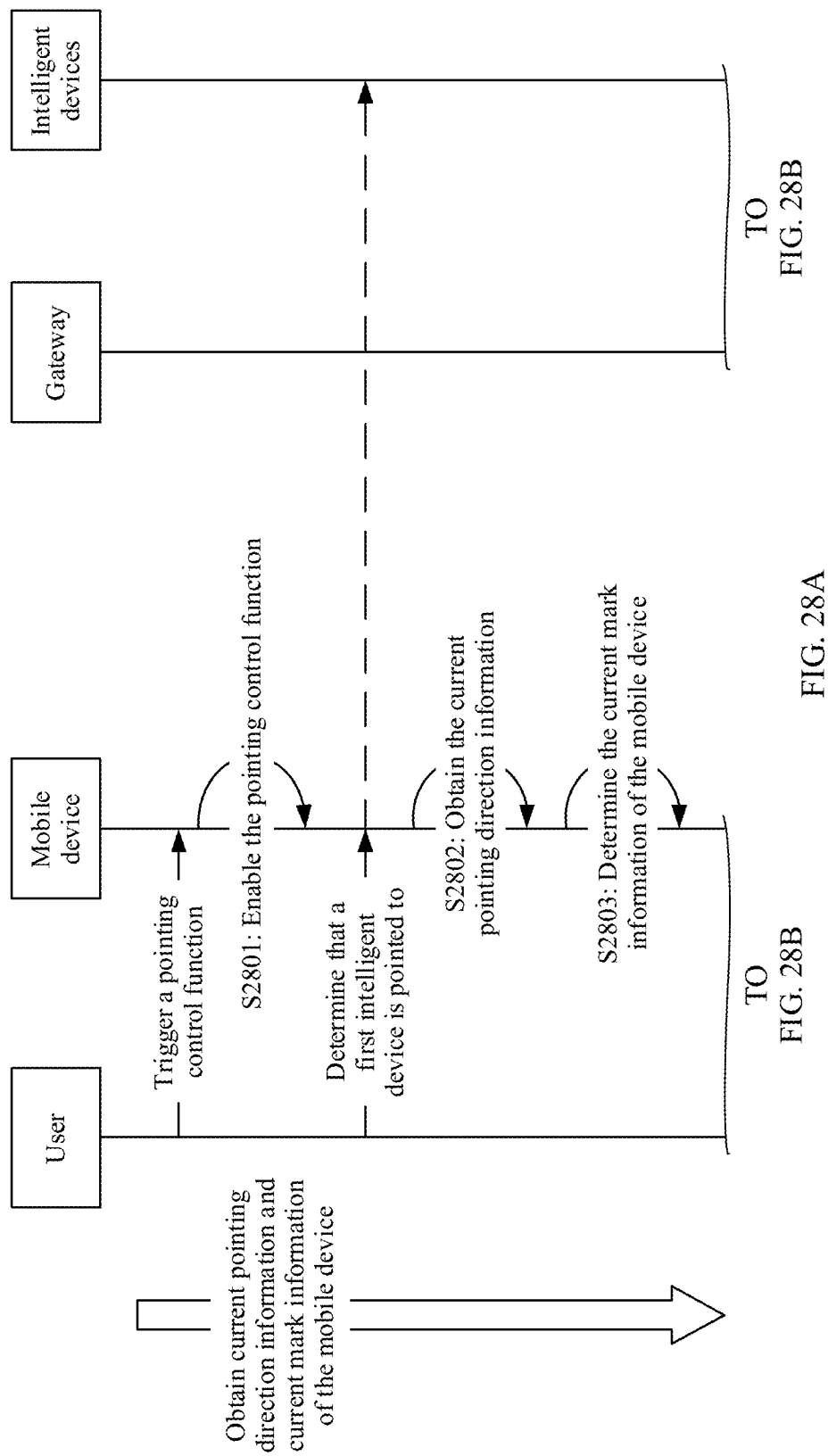

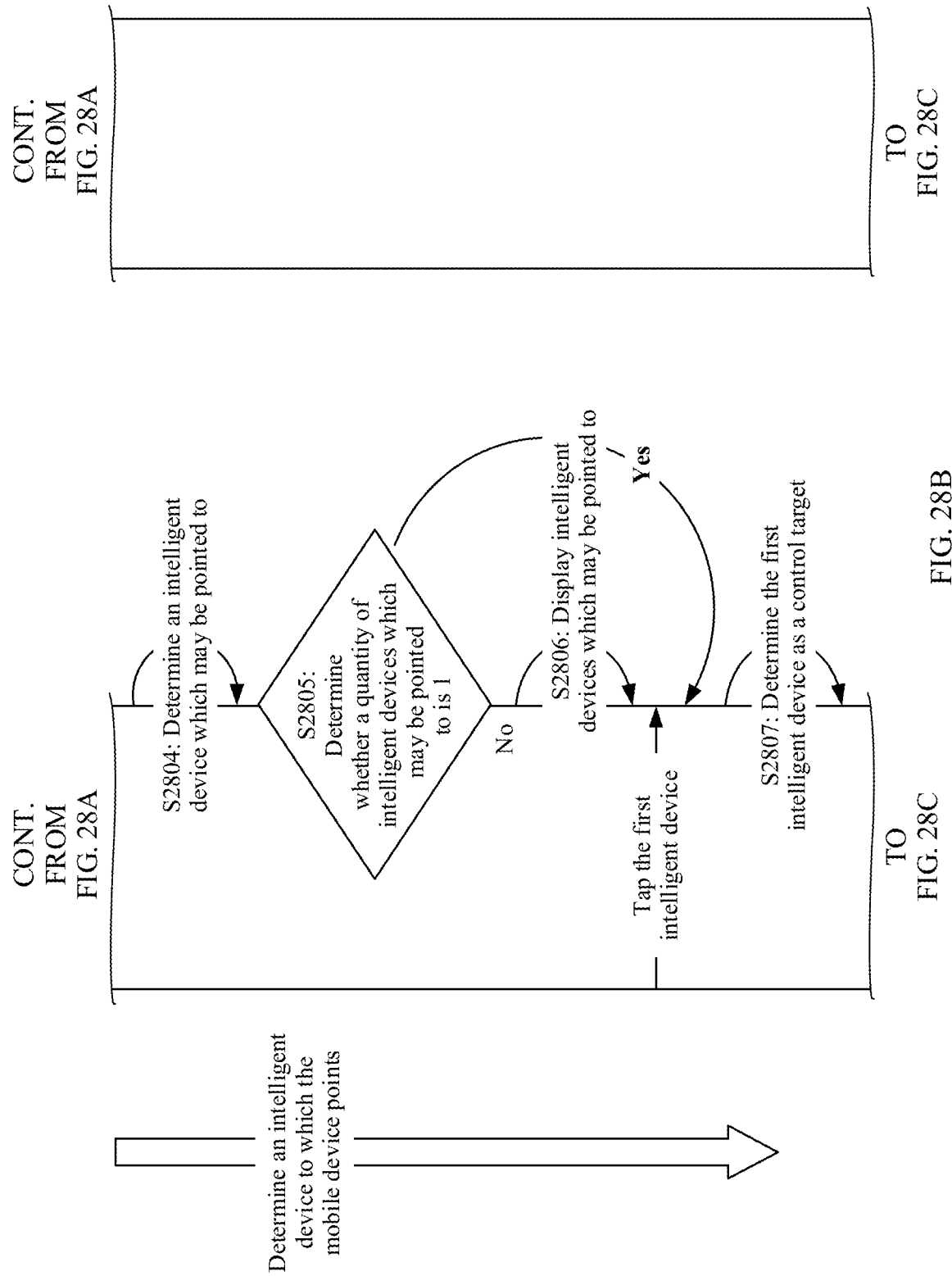

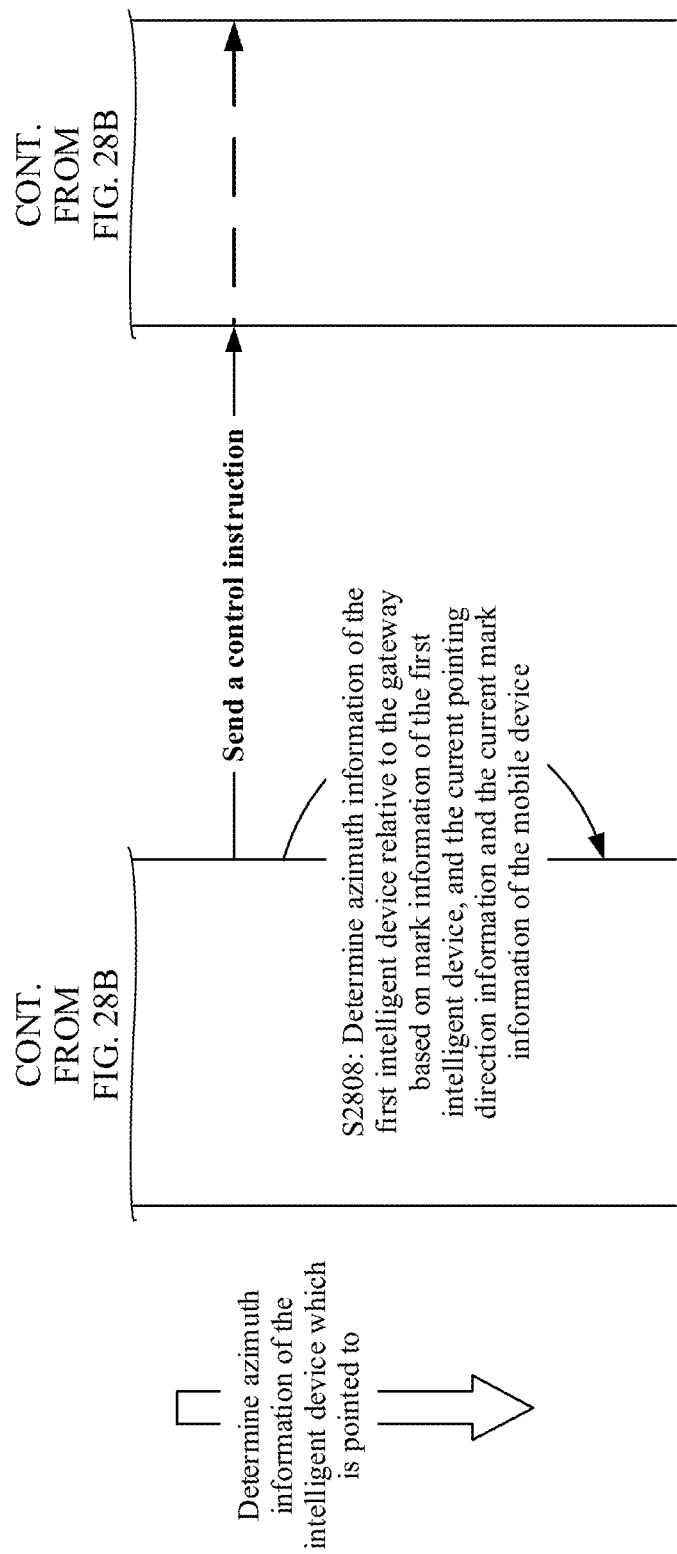

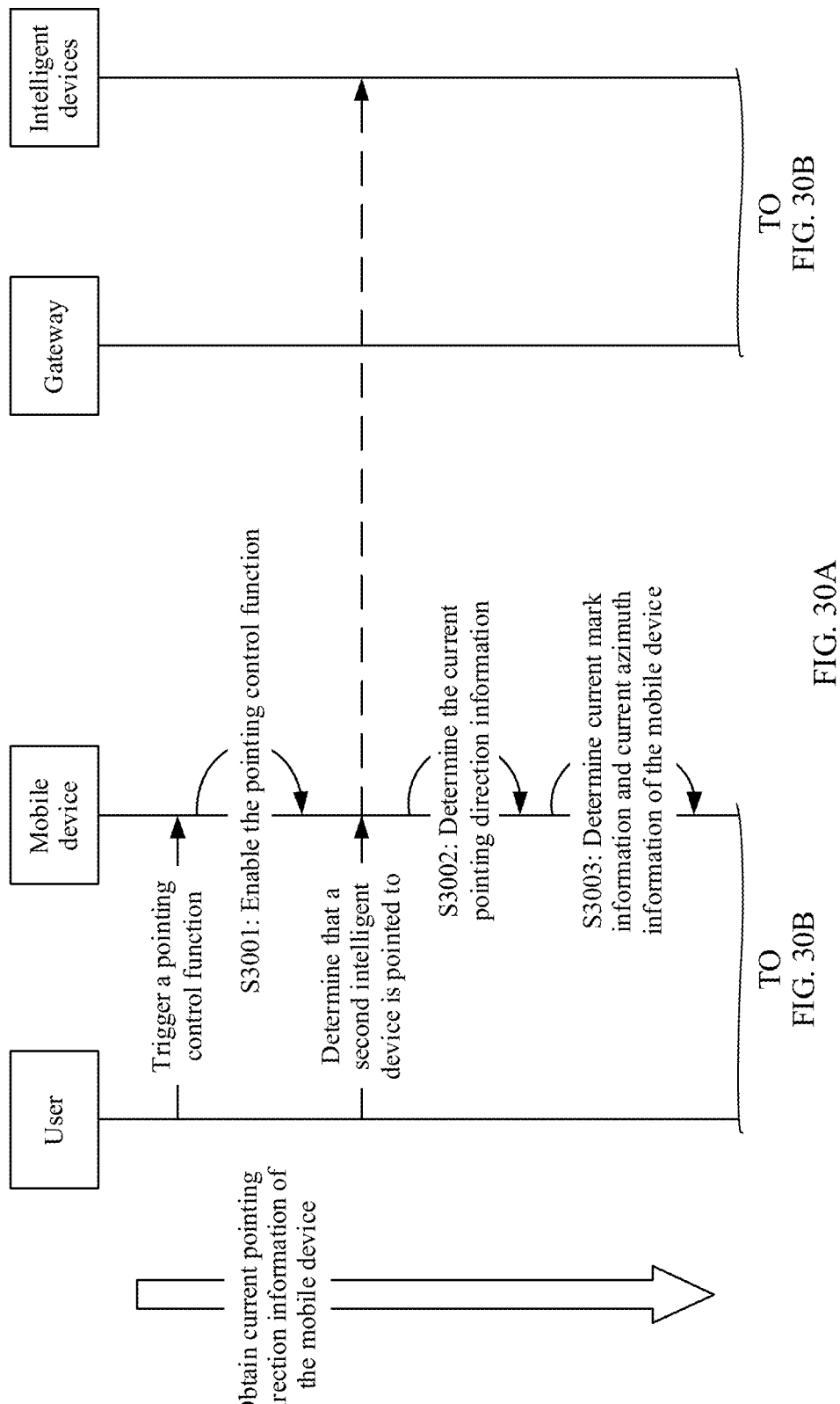

FIG. 30B

CONT.
FROM
FIG. 32A

S3207: Determine a perpendicular distance between the horizontal plane of the mobile device and a horizontal plane of each intelligent device 

S3208: Determine a perpendicular distance from each intelligent device to the horizontal plane of the gateway 

S3209: Determine a straight-line distance to each intelligent device 

S3210: Determine a horizontal distance from a projection point of each intelligent device on the horizontal plane of the gateway to the gateway 

FIG. 32B

CONT.
FROM
FIG. 32A

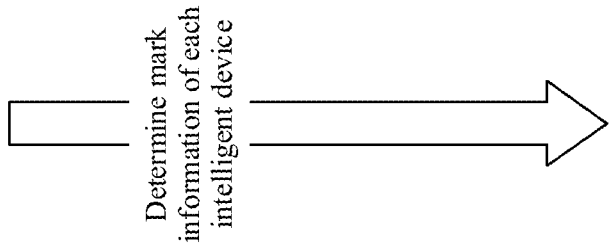

Determine mark information of each intelligent device

METHOD FOR DETERMINING CONTROL TARGET, MOBILE DEVICE, AND GATEWAY

CROSS-REFERENCE TO RELATED APPLICATIONS

This application is a National Stage of International Application No. PCT/CN2021/088395, filed on Apr. 20, 2021, which claims priority to Chinese Patent Application No. 202010340394.0, filed on Apr. 26, 2020. Both of the aforementioned applications are hereby incorporated by reference in their entireties.

TECHNICAL FIELD

This application relates to the field of terminals and artificial intelligence, and in particular, to a method for determining a control target, a mobile device, and a gateway.

BACKGROUND

With the development of electronic technologies and computer technologies, an intelligent device that can be directly controlled by using a mobile device becomes a part of people's daily life. The intelligent device facilitates people's daily arrangement and enriches people's daily life. However, interaction between a user and the intelligent device is still not convenient enough.

FIG. 1 is a schematic diagram of a current scenario of controlling an intelligent device. The user usually needs to first open a mobile phone, then start an intelligent device control application (Application, APP), then select, on the started intelligent device control application, the intelligent device that needs to be controlled, then select an item in a displayed intelligent device control interface to perform an operation, and finally send an operation instruction to the intelligent device through a router to perform control.

Currently, an entire process of determining a control target requires at least three or four steps with complex operations. If there are a large quantity of to-be-selected intelligent devices, the process of determining the control target may be more complex, causing poorer usability.

SUMMARY

This application provides a method for determining a control target, a mobile device, and a gateway, which can intelligently determine a control target based on a pointing direction of the mobile device, to greatly simplify a process of determining the control target, and improve usability of human-machine interaction.

According to a first aspect, an embodiment of this application provides a method for determining a control target. The method includes: A mobile device and/or a gateway determines mark information of each intelligent device, where the mobile device is interconnected to each intelligent device through the gateway, and the mark information includes a straight-line distance to the gateway and a perpendicular distance to a horizontal plane of the gateway; the mobile device and/or the gateway determines azimuth information of at least two intelligent devices relative to the gateway based on a pointing operation performed by the mobile device on the at least two intelligent devices, where the azimuth information is used to indicate an azimuth of a projection on the horizontal plane of the gateway relative to the gateway; the mobile device and/or the gateway determines azimuth information of each of other intelligent devices relative to the gateway based on the azimuth information of the at least two intelligent devices relative to the gateway and mark information of the at least two intelligent devices and based on distances to the gateway and each intelligent device that are measured by the mobile device on at least two movement location points, where the movement location point is a location point that the mobile device passes through in a movement process; and the mobile device and/or the gateway determines an intelligent device in a current pointing direction of the mobile device as a control target based on current pointing direction information, current mark information, and current azimuth information of the mobile device.

In this embodiment of this application, the mobile terminal, the gateway, and the intelligent devices collaborate to independently construct an intelligent network including three-dimensional location information. After network construction is completed, the control target can be intelligently determined based on a pointing direction of the mobile device held by a user. This greatly simplifies a process of determining the control target and improves usability of human-machine interaction.

With reference to the first aspect, in some embodiments, that a mobile device and/or a gateway determines mark information of each intelligent device specifically includes: The mobile device determines distances between three movement location points and straight-line distances from the three movement location points to each intelligent device, where the three movement location points are not on a same straight line; and the mobile device and/or the gateway determines the mark information of each intelligent device based on the distances between the three movement location points and the straight-line distances from the three movement location points to each intelligent device.

Specifically, in some embodiments, that the mobile device and/or the gateway determines the mark information of each intelligent device based on the distances between the three movement location points and the straight-line distances from the three movement location points to each intelligent device specifically includes: The mobile device and/or the gateway determines the mark information of each intelligent device based on the distances between the three movement location points, the straight-line distances from the three movement location points to each intelligent device, and a perpendicular height calculation model. The perpendicular height calculation model is used to determine a height of a triangular pyramid under a condition that each edge length of the triangular pyramid is known.

With reference to the first aspect, in some embodiments, that the mobile device and/or the gateway determines azimuth information of at least two intelligent devices relative to the gateway based on a pointing operation performed by the mobile device on the at least two intelligent devices specifically includes: In response to an operation that a user points the mobile device towards a first intelligent device, the mobile device obtains current pointing direction information and current mark information, where the pointing direction information includes an elevation angle of the mobile device and a pointing azimuth of the mobile device, and the first intelligent device is an intelligent device in intelligent devices interconnected to the gateway; in response to an operation that the user determines the first intelligent device as a control target, the mobile device and/or the gateway determines azimuth information of the first intelligent device relative to the gateway based on mark information of the first intelligent device, the current pointing direction information, and the current mark information;

and by taking the same steps as above, the mobile device and/or the gateway determines azimuth information of a second intelligent device relative to the gateway. The second intelligent device is another intelligent device different from the first intelligent device in the intelligent devices interconnected to the gateway.

Specifically, in some embodiments, that the mobile device and/or the gateway determines azimuth information of the first intelligent device relative to the gateway based on mark information of the first intelligent device, the current pointing direction information, and the current mark information specifically includes: The mobile device and/or the gateway determines the azimuth information of the first intelligent device relative to the gateway based on the mark information of the first intelligent device, the current pointing direction information, the current mark information, and an azimuth information calculation model. The azimuth information calculation model is used to determine azimuth information of a pointed point relative to the gateway under a condition that mark information of a pointing point and the pointed point in space and pointing azimuth information when the pointing point points to the pointed point are known.

With reference to the first aspect, in some embodiments, that the mobile device and/or the gateway determines azimuth information of each of other intelligent devices relative to the gateway based on the azimuth information of the at least two intelligent devices relative to the gateway and mark information of the at least two intelligent devices and based on distances to the gateway and each intelligent device that are measured by the mobile device on at least two movement location points specifically includes: The mobile device measures the distances to the gateway and each intelligent device on the at least two movement location points; the mobile device and/or the gateway determines azimuth information of the at least two movement location points relative to the gateway and mark information of the at least two movement location points based on the determined azimuth information of the at least two intelligent devices relative to the gateway, the mark information of the at least two intelligent devices, and distances from the at least two movement location points to the at least two intelligent devices and the gateway; and the mobile device and/or the gateway determines the azimuth information of each of the other intelligent devices relative to the gateway based on the azimuth information of the at least two movement location points relative to the gateway, the mark information of the at least two movement location points, and distances from the at least two movement location points to each of the other intelligent devices different from the at least two intelligent devices.

With reference to the first aspect, in some embodiments, that the mobile device and/or the gateway determines an intelligent device in a current pointing direction of the mobile device as a control target based on current pointing direction information, current mark information, and current azimuth information of the mobile device specifically includes: In response to an operation that the user points the mobile device towards the intelligent device, the mobile device and/or the gateway determines the current pointing direction information, the current mark information, and the current azimuth information of the mobile device; and the mobile device and/or the gateway determines the intelligent device in the current pointing direction of the mobile device as the control target based on the current pointing direction information, the current mark information, and the current azimuth information of the mobile device, the mark information and the azimuth information of each intelligent device, and a pointed target calculation model. The pointed target calculation model is used to determine the pointed point under a condition that mark information and azimuth information of each point in space and the pointing direction information when the pointing point points to the pointed point are known.

With reference to the first aspect, in some embodiments, before the step that the mobile device and/or the gateway determines an intelligent device in a current pointing direction of the mobile device as a control target based on current pointing direction information, current mark information, and current azimuth information of the mobile device, the method further includes: The mobile device enables a pointing control function in response to an operation that the user triggers the pointing control function.

With reference to the first aspect, in some embodiments, after the step that the mobile device and/or the gateway determines an intelligent device in a current pointing direction of the mobile device as a control target based on current pointing direction information, current mark information, and current azimuth information of the mobile device, the method further includes: The mobile device displays a control interface for the control target, and triggers a corresponding operation instruction in response to a touch operation of the user; or the mobile device monitors a user action, and triggers a corresponding control instruction in response to the user action.

In the method for determining a control target according to the first aspect of this application, many steps may be performed by the mobile device or the gateway. This is not limited in embodiments of this application. It may be understood that, if a step needs to be performed by the gateway, but related data obtained by the mobile device is required for performing the step, the mobile device sends the related data to the gateway before the gateway performs the step. Similarly, if a step needs to be performed by the mobile device, but related data obtained by the gateway is required for performing the step, the gateway sends the related data to the mobile device before the mobile device performs the step.

According to a second aspect, an embodiment of this application provides a mobile device. The mobile device includes one or more processors and a memory, the memory is coupled to the one or more processors, the memory is configured to store computer program code, the computer program code includes computer instructions, and the one or more processors invoke the computer instructions to enable the mobile device to perform the following operations: determining mark information of each intelligent device, where the mobile device is interconnected to each intelligent device through a gateway, and the mark information includes a straight-line distance to the gateway and a perpendicular distance to a horizontal plane of the gateway; determining azimuth information of at least two intelligent devices relative to the gateway based on a pointing operation performed by the mobile device on the at least two intelligent devices, where the azimuth information is used to indicate an azimuth of a projection on the horizontal plane of the gateway relative to the gateway; determining azimuth information of each of other intelligent devices relative to the gateway based on the azimuth information of the at least two intelligent devices relative to the gateway and mark information of the at least two intelligent devices and based on distances to the gateway and each intelligent device that are measured by the mobile device on at least two movement location points, where the movement location point is a location point that the mobile device passes through in a movement process; and determining an intelligent device in a current pointing direction of the mobile device as a control target based on current pointing direction information, current mark information, and current azimuth information of the mobile device.

With reference to the second aspect, in some embodiments, the one or more processors are specifically configured to invoke the computer instructions to enable the mobile device to perform the following operations: determining distances between three movement location points and straight-line distances from the three movement location points to each intelligent device, where the three movement location points are not on a same straight line; and determining the mark information of each intelligent device based on the distances between the three movement location points and the straight-line distances from the three movement location points to each intelligent device.

Specifically, in some embodiments, the one or more processors are specifically configured to invoke the computer instructions to enable the mobile device to perform the following operation: determining the mark information of each intelligent device based on the distances between the three movement location points, the straight-line distances from the three movement location points to each intelligent device, and a perpendicular height calculation model. The perpendicular height calculation model is used to determine a height of a triangular pyramid under a condition that each edge length of the triangular pyramid is known.

With reference to the second aspect, in some embodiments, the one or more processors are specifically configured to invoke the computer instructions to enable the mobile device to perform the following operations: in response to an operation that a user points the mobile device towards a first intelligent device, obtaining current pointing direction information and current mark information, where the pointing direction information includes an elevation angle of the mobile device and a pointing azimuth of the mobile device, and the first intelligent device is an intelligent device in intelligent devices interconnected to the gateway; in response to an operation that the user determines the first intelligent device as a control target, determining azimuth information of the first intelligent device relative to the gateway based on mark information of the first intelligent device, the current pointing direction information, and the current mark information; and by taking the same steps as above, determining azimuth information of a second intelligent device relative to the gateway. The second intelligent device is another intelligent device different from the first intelligent device in the intelligent devices interconnected to the gateway.

Specifically, in some embodiments, the one or more processors are specifically configured to invoke the computer instructions to enable the mobile device to perform the following operation: determining the azimuth information of the first intelligent device relative to the gateway based on the mark information of the first intelligent device, the current pointing direction information, the current mark information, and an azimuth information calculation model. The azimuth information calculation model is used to determine azimuth information of a pointed point relative to the gateway under a condition that mark information of a pointing point and the pointed point in space and pointing azimuth information when the pointing point points to the pointed point are known.

With reference to the second aspect, in some embodiments, the one or more processors are specifically configured to invoke the computer instructions to enable the mobile device to perform the following operations: measuring the distances to the gateway and each intelligent device on the at least two movement location points; determining azimuth information of the at least two movement location points relative to the gateway and mark information of the at least two movement location points based on the determined azimuth information of the at least two intelligent devices relative to the gateway, the mark information of the at least two intelligent devices, and distances from the at least two movement location points to the at least two intelligent devices and the gateway; and determining the azimuth information of each of the other intelligent devices relative to the gateway based on the azimuth information of the at least two movement location points relative to the gateway, the mark information of the at least two movement location points, and distances from the at least two movement location points to each of the other intelligent devices different from the at least two intelligent devices.

With reference to the second aspect, in some embodiments, the one or more processors are specifically configured to invoke the computer instructions to enable the mobile device to perform the following operations: in response to an operation that the user points the mobile device towards the intelligent device, determining the current pointing direction information, the current mark information, and the current azimuth information of the mobile device; and determining the intelligent device in the current pointing direction of the mobile device as the control target based on the current pointing direction information, the current mark information, and the current azimuth information of the mobile device, the mark information and the azimuth information of each intelligent device, and a pointed target calculation model. The pointed target calculation model is used to determine the pointed point under a condition that mark information and azimuth information of each point in space and the pointing direction information when the pointing point points to the pointed point are known.

With reference to the second aspect, in some embodiments, the one or more processors are further configured to invoke the computer instructions to enable the mobile device to perform the following operation: enabling a pointing control function in response to an operation that the user triggers the pointing control function.

With reference to the second aspect, in some embodiments, the one or more processors are further configured to invoke the computer instructions to enable the mobile device to perform the following operation: displaying a control interface for the control target, and triggering a corresponding operation instruction in response to a touch operation of the user; or monitoring a user action, and triggering a corresponding control instruction in response to the user action.

According to a third aspect, an embodiment of this application provides a chip. The chip is applied to a mobile device, the chip includes one or more processors, and the processor is configured to invoke computer instructions to enable the mobile device to perform the method according to any one of the first aspect and the possible implementations of the first aspect.

According to a fourth aspect, an embodiment of this application provides a computer program product including instructions. When the computer program product is run on a mobile device, the mobile device is enabled to perform the method according to the first aspect and the possible implementations of the first aspect.

According to a fifth aspect, an embodiment of this application provides a computer-readable storage medium, including instructions. When the instructions are run on a mobile device, the mobile device is enabled to perform the method according to any one of the first aspect and the possible implementations of the first aspect.

It may be understood that the mobile device according to the second aspect, the chip according to the third aspect, the computer program product according to the fourth aspect, and the computer storage medium according to the fifth aspect are all configured to perform the method provided in embodiments of this application. Therefore, for beneficial effects that can be achieved, refer to beneficial effects in a corresponding method. Details are not described herein again.

According to a sixth aspect, an embodiment of this application provides a gateway. The gateway includes one or more processors and a memory, the memory is coupled to the one or more processors, the memory is configured to store computer program code, the computer program code includes computer instructions, and the one or more processors invoke the computer instructions to enable the gateway to perform the following operations: determining mark information of each intelligent device, where a mobile device is interconnected to each intelligent device through a gateway, and the mark information includes a straight-line distance to the gateway and a perpendicular distance to a horizontal plane of the gateway; determining azimuth information of at least two intelligent devices relative to the gateway based on a pointing operation performed by the mobile device on the at least two intelligent devices, where the azimuth information is used to indicate an azimuth of a projection on the horizontal plane of the gateway relative to the gateway; determining azimuth information of each of other intelligent devices relative to the gateway based on the azimuth information of the at least two intelligent devices relative to the gateway and mark information of the at least two intelligent devices and based on distances to the gateway and each intelligent device that are measured by the mobile device on at least two movement location points, where the movement location point is a location point that the mobile device passes through in a movement process; and determining an intelligent device in a current pointing direction of the mobile device as a control target based on current pointing direction information, current mark information, and current azimuth information of the mobile device.

With reference to the sixth aspect, in some embodiments, the one or more processors are specifically configured to invoke the computer instructions to enable the gateway to perform the following operations: receiving distances between three movement location points and straight-line distances from the three movement location points to each intelligent device that are sent by the mobile device, where the three movement location points are not on a same straight line; and determining the mark information of each intelligent device based on the distances between the three movement location points and the straight-line distances from the three movement location points to each intelligent device.

Specifically, in some embodiments, the one or more processors are specifically configured to invoke the computer instructions to enable the gateway to perform the following operation: determining the mark information of each intelligent device based on the distances between the three movement location points, the straight-line distances from the three movement location points to each intelligent device, and a perpendicular height calculation model. The perpendicular height calculation model is used to determine a height of a triangular pyramid under a condition that each edge length of the triangular pyramid is known.

With reference to the sixth aspect, in some embodiments, the one or more processors are specifically configured to invoke the computer instructions to enable the gateway to perform the following operations: after a user points the mobile device towards a first intelligent device, receiving current pointing direction information and current mark information that are sent by the mobile device, where the pointing direction information includes an elevation angle of the mobile device and a pointing azimuth of the mobile device, and the first intelligent device is an intelligent device in intelligent devices interconnected to the gateway; in response to an operation that the user determines the first intelligent device as a control target, determining azimuth information of the first intelligent device relative to the gateway based on mark information of the first intelligent device, the current pointing direction information, and the current mark information; and by taking the same steps as above, determining azimuth information of a second intelligent device relative to the gateway. The second intelligent device is another intelligent device different from the first intelligent device in the intelligent devices interconnected to the gateway.

Specifically, in some embodiments, the one or more processors are specifically configured to invoke the computer instructions to enable the gateway to perform the following operation: determining the azimuth information of the first intelligent device relative to the gateway based on the mark information of the first intelligent device, the current pointing direction information, the current mark information, and an azimuth information calculation model. The azimuth information calculation model is used to determine azimuth information of a pointed point relative to the gateway under a condition that mark information of a pointing point and the pointed point in space and pointing azimuth information when the pointing point points to the pointed point are known.

With reference to the sixth aspect, in some embodiments, the one or more processors are specifically configured to invoke the computer instructions to enable the gateway to perform the following operations: receiving the distances to the gateway and each intelligent device that are measured on the at least two movement location points and that are sent by the mobile device; determining azimuth information of the at least two movement location points relative to the gateway and mark information of the at least two movement location points based on the determined azimuth information of the at least two intelligent devices relative to the gateway, the mark information of the at least two intelligent devices, and distances from the at least two movement location points to the at least two intelligent devices and the gateway; and determining the azimuth information of each of the other intelligent devices relative to the gateway based on the azimuth information of the at least two movement location points relative to the gateway, the mark information of the at least two movement location points, and distances from the at least two movement location points to each of the other intelligent devices different from the at least two intelligent devices.

With reference to the sixth aspect, in some embodiments, the one or more processors are specifically configured to invoke the computer instructions to enable the gateway to perform the following operations: in response to an operation that the user points the mobile device towards the intelligent device, determining the current pointing direction information, the current mark information, and the current azimuth information of the mobile device; and determining the intelligent device in the current pointing direction of the mobile device as the control target based on the current pointing direction information, the current mark information, and the current azimuth information of the mobile device, the mark information and the azimuth information of each intelligent device, and a pointed target calculation model, where the pointed target calculation model is used to determine the pointed point under a condition that mark information and azimuth information of each point in space and the pointing direction information when the pointing point points to the pointed point are known.

According to a seventh aspect, an embodiment of this application provides a chip. The chip is applied to a gateway, the chip includes one or more processors, and the processor is configured to invoke computer instructions to enable the gateway to perform the method according to any one of the first aspect and the possible implementations of the first aspect.

According to an eighth aspect, an embodiment of this application provides a computer program product including instructions. When the computer program product is run on a gateway, the gateway is enabled to perform the method according to any one of the first aspect and the possible implementations of the first aspect.

According to a ninth aspect, an embodiment of this application provides a computer-readable storage medium, including instructions. When the instructions are run on a gateway, the gateway is enabled to perform the method according to any one of the first aspect and the possible implementations of the first aspect.

It may be understood that the gateway according to the sixth aspect, the chip according to the seventh aspect, the computer program product according to the eighth aspect, and the computer storage medium according to the ninth aspect are all configured to perform the method provided in embodiments of this application. Therefore, for beneficial effects that can be achieved, refer to beneficial effects in a corresponding method. Details are not described herein again.

BRIEF DESCRIPTION OF DRAWINGS

FIG. 13A and FIG. 13B are a schematic diagram of a scenario of controlling an intelligent device according to an embodiment of this application;

FIG. 24A and FIG. 24B are an example schematic flowchart of determining a control target based on a pointing direction according to an embodiment of this application;

FIG. 28A, FIG. 28B, and FIG. 28C are another example schematic flowchart of determining azimuth information of an intelligent device according to an embodiment of this application;

FIG. 30A and FIG. 30B are another example schematic flowchart of determining a control target based on a pointing direction according to an embodiment of this application;

FIG. 32A and FIG. 32B are still another example schematic flowchart of determining mark information of each intelligent device according to an embodiment of this application;

DESCRIPTION OF EMBODIMENTS

Terms used in the following embodiments of this application are merely intended to describe particular embodiments, but are not intended to limit this application. Terms "one", "a", "the", "the foregoing", "this", and "the one" of singular forms used in this specification and the appended claims of this application are also intended to include plural forms, unless otherwise specified in the context clearly. It should be further understood that, a term "and/or" used in this application indicates and includes any one or all of possible combinations of one or more listed items.

The following terms "first" and "second" are merely intended for a purpose of description, and shall not be understood as an implication or implication of relative importance or implicit instruction of a quantity of indicated technical features. Therefore, a feature limited by "first" or "second" may explicitly or implicitly include one or more features. In the descriptions of embodiments of this application, unless otherwise specified, "a plurality of" means two or more than two.

Because embodiments of this application relate to construction of an intelligent network including three-dimensional location information, for ease of understanding, the following first describes related terms and related concepts in the embodiments of this application.

(1) Three-Dimensional Location Information

The three-dimensional location information is location information of an object in three-dimensional space. Usually, the three-dimensional space is a space system formed by adding a vector representing an upper and down direction to a plane two-dimensional system.

The three-dimensional location information may be described in a plurality of different representation manners. The following describes three common coordinate systems for representing the three-dimensional location information.

1. Three-Dimensional Rectangular Coordinate System (Three-Dimensional Cartesian Coordinate System)

Three-dimensional Cartesian coordinates (X, Y, Z) are similar to two-dimensional Cartesian coordinates (X, Y), that is, a Z value is added based on an X value and a Y value.

Similarly, an absolute coordinate value based on an origin of a current coordinate system or a relative coordinate value based on a previous input point may also be used.

Figure 1:
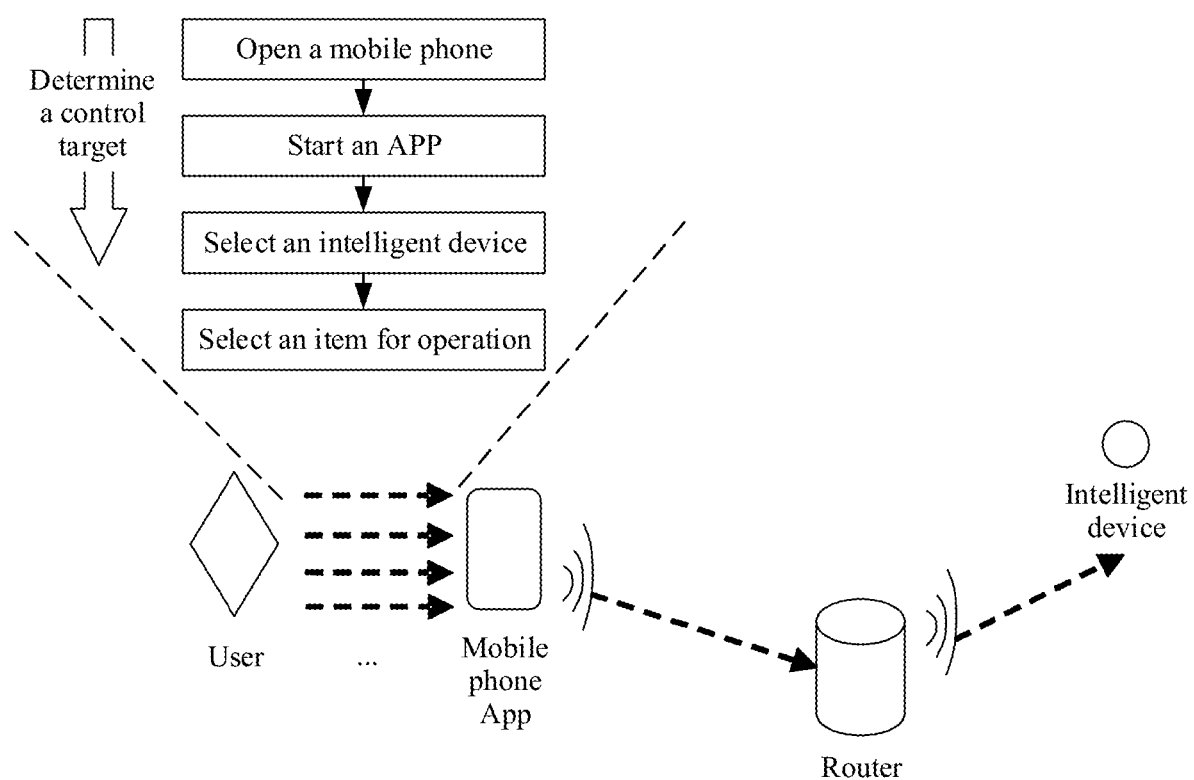
FIG. 1 is a schematic diagram of a scenario of controlling an intelligent device in the conventional technology.
Figure 2:
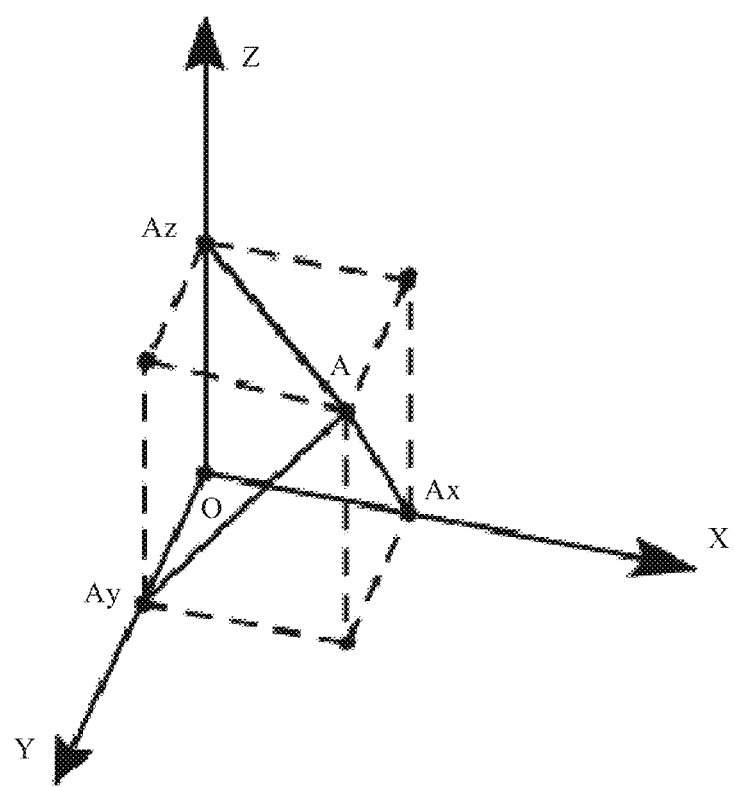
FIG. 2 is a schematic diagram of representing three-dimensional location information by using a three-dimensional rectangular coordinate system according to an embodiment of this application.

FIG. 2 is a schematic diagram of representing three-dimensional location information by using a three-dimensional rectangular coordinate system. For example, if location information of a point A in three-dimensional space needs to be described, a point O in the three-dimensional space may be used as an origin, and three vectors that are perpendicular to each other and that start from the origin are used as positive directions of X, Y, and Z coordinate axes, to establish a three-dimensional rectangular coordinate system. In this case, values (Ax, Ay, Az) of projected points of the point A on the three coordinate axes may be used to represent three-dimensional location information of the point A.

2. Cylindrical Coordinate System

Cylindrical coordinates are similar to two-dimensional polar coordinates, but add a distance value from a point to be determined to an XY plane. That is, cylindrical coordinates of a three-dimensional point may be determined based on a length of a projection of a connection line between the point and an origin on the XY plane, an included angle between the projection and the X axis, and a Z value of the point perpendicular to the XY plane.

Figure 3:
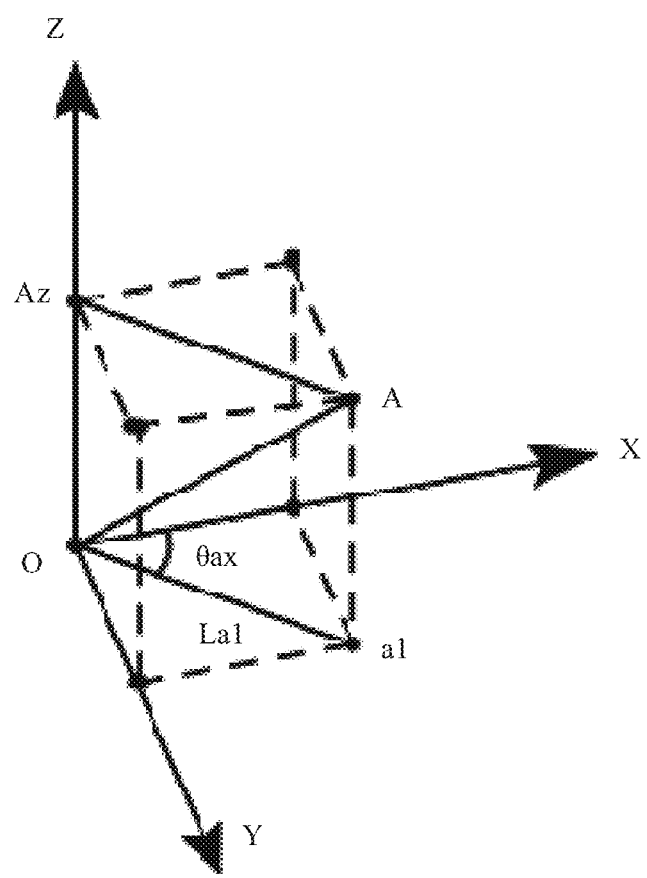
FIG. 3 is a schematic diagram of representing three-dimensional location information by using a cylindrical coordinate system according to an embodiment of this application.

FIG. 3 is a schematic diagram of representing three-dimensional location information by using a cylindrical coordinate system. For example, if location information of a point A in three-dimensional space needs to be described, a point O in the three-dimensional space may be used as an origin, and three vectors that are perpendicular to each other and that start from the origin are used as positive directions of X, Y, and Z coordinate axes, to establish a cylindrical coordinate system. In this case, "La1<θax, Az" may be formed by using a length La1 of a projection Oa1 of a connection line OA between the point A and the origin O on an XY plane, an included angle θax between the projection and the X axis, and a value Az of the projection of the point A on the Z axis, to represent three-dimensional coordinates of the point A. For example, if the coordinates are "15<40, 20", it indicates that the length La1 of the projection Oa1 of the connection line OA between the point A and the origin O on the XY plane is 15 units, the included angle between the projection Oa1 and the X axis is 40 degrees, and a Z value of a projection point Az on the Z axis is 20.

3. Spherical Coordinate System

Spherical coordinates are also similar to two-dimensional polar coordinates. When determining a point, it needs to separately specify a distance between a point and an origin of a current coordinate system, an angle between the X axis and a projection of a connection line between the point and the origin on an XY plane, and an angle between the XY plane and the connection line between the point and the origin.

Figure 4:
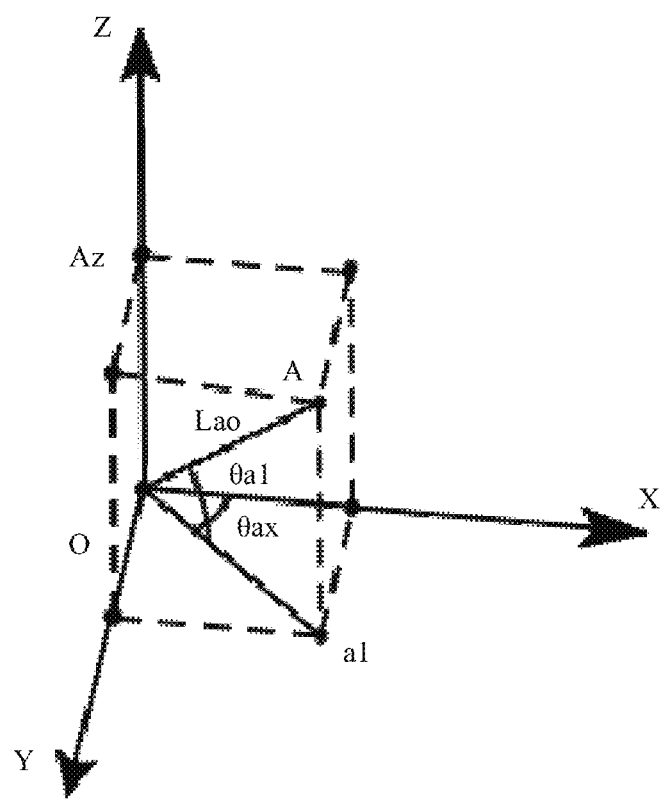
FIG. 4 is a schematic diagram of representing three-dimensional location information by using a spherical coordinate system according to an embodiment of this application.

FIG. 4 is a schematic diagram of representing three-dimensional location information by using a spherical coordinate system. If location information of a point A in three-dimensional space needs to be described, a point O in the three-dimensional space may be used as an origin, and three vectors that are perpendicular to each other and that start from the origin are used as positive directions of X, Y, and Z coordinate axes, to establish a spherical coordinate system. In this case, "Lao<θax<θa1" may be formed by using a distance Lao between the point A and the origin O, an angle θax between the X axis and a projection line Oa1 of AO on an XY plane, and an angle θa1 between AO and the projection line Oa1 of AO on the XY plane, to represent three-dimensional coordinates of the point A. For example, if the coordinates are "20<45<50", it indicates that the distance between the point A and the origin O is 20 units, the included angle between the X axis and the projection Oa1 of AO on the XY plane is 45 degrees, and the included angle between AO and the projection Oa1 of AO on the XY plane is 50 degrees.

It may be understood that, for intelligent devices at fixed three-dimensional spatial locations, representation forms of three-dimensional location information of the intelligent devices and three-dimensional location relationships between the intelligent devices may be different based on different types of coordinate systems, different origins of the coordinate systems, and different positive directions of the coordinate axes.

In some cases, even a coordinate system may not be used, only a location in space is used as a basic location, and distance and angle relationships between another location and the basic location are described to represent three-dimensional location information of the another location in three-dimensional space.

However, regardless of the representation form, the represented three-dimensional location information and the three-dimensional location relationship are substantially the same, and both indicate that the intelligent device is at a determined three-dimensional spatial location. In addition, because the represented content is substantially the same, various different representation forms may be converted to each other through corresponding modification of functions and parameters.

For ease of description and understanding, in subsequent descriptions of embodiments of this application, a representation form of a three-dimensional rectangular coordinate system and a point for ease of description and understanding as an origin are used as an example for feasibility description. It may be understood that a representation form used to represent the three-dimensional location information during actual application is not limited in embodiments of this application.

(2) Mark Information and Azimuth Information

In embodiments of this application, mark information of a device (a mobile device or an intelligent device) includes at least a straight-line distance from the device to a gateway (referred to as a device-gateway straight-line distance for short below) and a perpendicular distance from the device to a horizontal plane of the gateway (referred to as a device-gateway perpendicular distance for short below). The mark information may further include a horizontal distance from a mapping point of the device on the horizontal plane of the gateway to the gateway (referred to as a device-gateway horizontal distance for short below).

It may be understood that, even if the mark information does not include the device-gateway horizontal distance, the device-gateway horizontal distance can be easily calculated based on the device-gateway straight-line distance and the device-gateway perpendicular distance with reference to the Pythagorean theorem. Therefore, during actual application, the mark information may directly include the device-gateway horizontal distance, or the device-gateway horizontal distance may be directly calculated based on the device-gateway straight-line distance and the device-gateway perpendicular distance when required, which is not limited herein.

Azimuth information of a device is used to represent an azimuth of a projection of the device on the horizontal plane of the gateway relative to the gateway. The azimuth information may be represented by an angle between a connection line between a projection of the device on the horizontal plane of the gateway and the gateway (referred to as a device-gateway projection line for short below) and a coordinate axis of reference coordinate axes of the horizontal plane of the gateway, and which coordinate axis of the reference coordinate axes is utilized is not limited in embodiments of this application because represented information is substantially the same.

Directions of the reference coordinate axes of the horizontal plane of the gateway may be preset according to an actual situation. For example, a positive direction of the X axis may be preset to point to due east, and a positive direction of the Y axis may be preset to point to due south. For another example, a positive direction of the X axis may be preset to point to due north, and a positive direction of the Y axis may be preset to point to due east. Regardless of how the positive directions of the reference coordinate axes are preset, represented information is substantially the same. A specific reference coordinate axis to be used and a point to be selected as an origin of coordinates have no impact on essence of the solution in embodiments of this application. This is not limited in embodiments of this application.

In the following, a three-dimensional rectangular coordinate system is established by using a gateway as an origin of coordinates, a positive direction of the X axis pointing to due east, a positive direction of the Y axis pointing to due south, and a positive direction of the Z axis pointing upward in perpendicular to an XY horizontal plane. In addition, mark information and azimuth information in embodiments of this application are described by using an example in which the mark information includes a device-gateway straight-line distance, a device-gateway perpendicular distance, and a device-gateway horizontal distance, and the azimuth information is an angle between a device-gateway projection line and the X axis.

Figure 5:
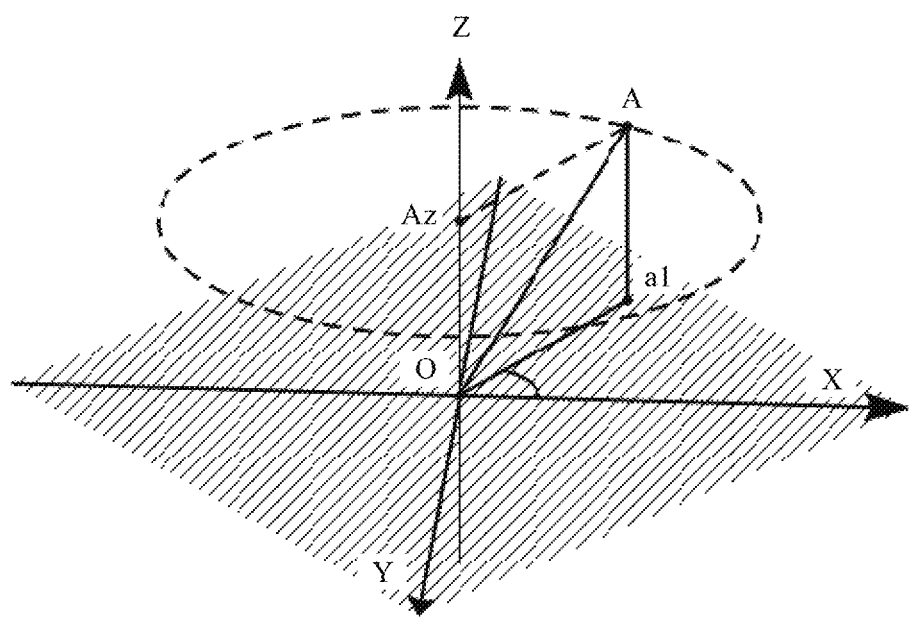
FIG. 5 is a schematic diagram of mark information and azimuth information according to an embodiment of this application.

FIG. 5 is a schematic diagram of mark information and azimuth information according to an embodiment of this application. The mark information of an intelligent device A includes: a straight-line distance AO from the intelligent device A to a gateway O, a perpendicular distance Aa1 from the intelligent device A to a projection point a1 of the intelligent device A on a horizontal plane of the gateway, and a horizontal distance a1O from the projection point a1 of the intelligent device A on the horizontal plane of the gateway to the gateway.

It may be understood that, when only the mark information of the intelligent device A is determined, from the perspective of the gateway, a spatial location of the intelligent device A cannot be completely determined and may be any point on a circle which is formed by using a projection point Az of the intelligent device A on the coordinate axis OZ as the center of the circle and using the device-gateway horizontal distance a1O as the radius.

The spatial location of the intelligent device A can be determined when the azimuth information is added. If the azimuth information of the intelligent device A is an angle ∠a1OX between the device-gateway projection line a1O and the X axis, the intelligent device A can be completely positioned, based on the mark information and the azimuth information of the intelligent device A, at the spatial location relative to the gateway O shown in FIG. 5.

(3) Pointing Direction Information

In embodiments of this application, pointing direction information of a mobile device includes an elevation angle of the mobile device and a pointing azimuth of the mobile device.

The elevation angle of the mobile device may be represented by an angle between a central axis of the mobile device (namely, a pointing direction line of the mobile device) and a horizontal plane, and the pointing azimuth of the mobile device may be represented by an angle between a projection of the central axis of the mobile device on the horizontal plane and a coordinate axis of reference coordinate axes of the horizontal plane, and which coordinate axis of the reference coordinate axes is used is not limited in embodiments of this application because represented information is substantially the same.

In the following, a three-dimensional rectangular coordinate system is established by using a mobile device as an origin of coordinates, a positive direction of the X axis pointing to due east, a positive direction of the Y axis pointing to due south, and a positive direction of the Z axis pointing upward in perpendicular to an XY horizontal plane. In addition, pointing direction information in embodiments of this application is described by using an example in which a pointing azimuth of the mobile device uses an included angle between a projection of the central axis of the mobile device on the horizontal plane and the Y axis.

Figure 6:
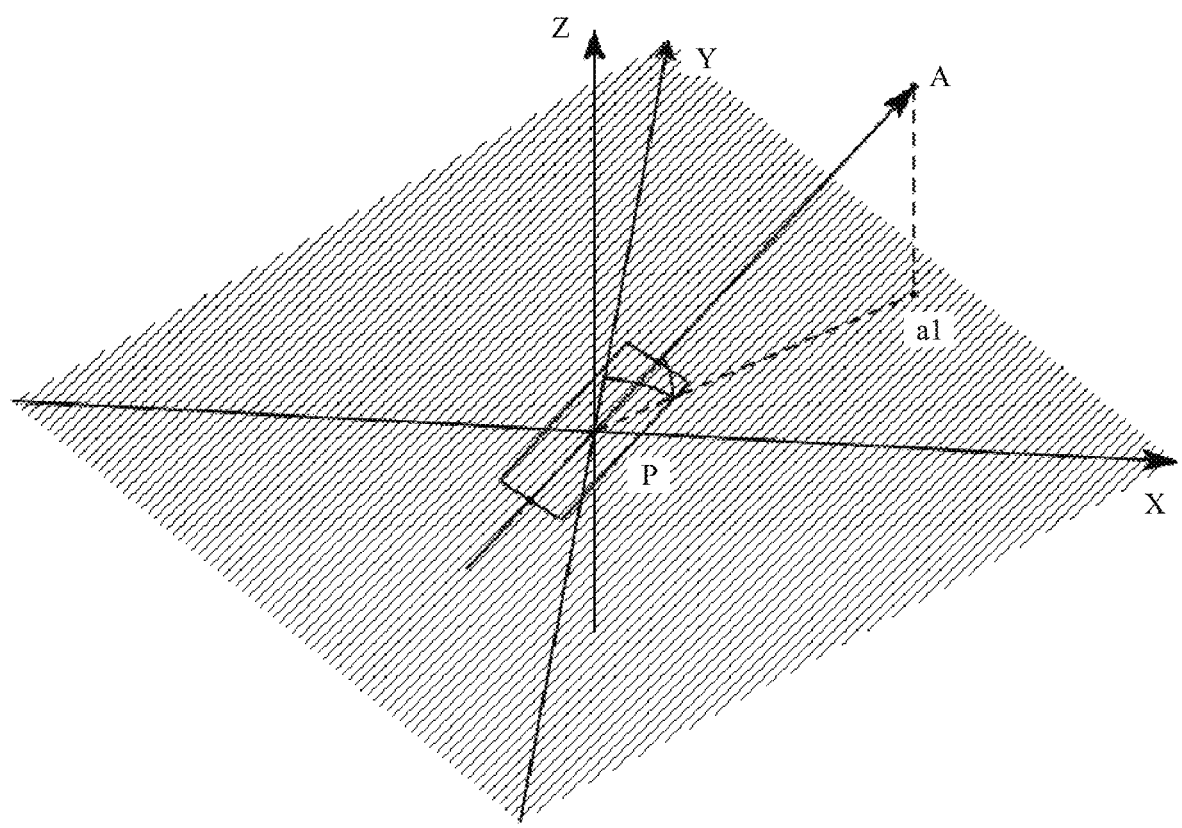
FIG. 6 is a schematic diagram of pointing direction information according to an embodiment of this application.

FIG. 6 is a schematic diagram of pointing direction information according to an embodiment of this application. The pointing direction information of a mobile device P includes: an angle ∠APa1 between a pointing direction line PA of the mobile device P and a projection Pa1 of the pointing direction line PA on a horizontal plane, and an angle ∠a1PY between the projection Pa1 of the pointing direction line PA on the horizontal plane and the Y axis.

Data of the pointing direction information of the mobile device comes from a direction sensor in the mobile device. The direction sensor in the mobile device may be a sensor produced in the mobile device according to an algorithm, and a direction is mainly calculated by using a magnetic field sensor and an acceleration sensor. Usually, the direction sensor returns three angle values (Azimuth, Pitch, and Roll) in degrees. Azimuth represents a pointing azimuth of the mobile device, for example, is the angle ∠a1PY between the projection Pa1 of the pointing direction line PA on the horizontal plane and the Y axis shown in FIG. 6. Pitch represents an elevation angle of the mobile device, for example, is the angle ∠APa1 between the pointing direction line PA of the mobile device P and the projection Pa1 of the pointing direction line PA on the horizontal plane shown in FIG. 6. Roll represents an angle at which the mobile device tilts leftward or rightward, which usually does not need to be used in embodiments of this application, so that details are not described herein again.

It may be understood that, because an angle value fed back by the direction sensor is calculated based on the magnetic field sensor and the acceleration sensor, the returned angle value (such as Azimuth) of the pointing azimuth of the mobile device is usually an angle between the projection of the pointing direction line of the mobile device on the horizontal plane and the Y axis pointing to due north (the geomagnetic north pole). If in a process of constructing entire three-dimensional location information of an intelligent network, the Y axis of the horizontal plane points to another direction, the angle returned by the direction sensor may be converted into an angle that is consistent with a direction of a coordinate axis used in the process of constructing the current three-dimensional location information. For example, if an angle Azimuth returned by the direction sensor of the mobile device is 30 degrees, a direction of the Y axis of the angle is due north, and a positive direction of the Y axis in a reference coordinate system for constructing the entire three-dimensional location information is due south, the angle may be converted into −150 degrees in the reference coordinate system for constructing the entire three-dimensional location information, and is used as the pointing azimuth of the mobile device. If the positive direction of the Y axis of the angle obtained by the direction sensor of the mobile device is the same as the positive direction of the Y axis in the reference coordinate system for constructing the entire three-dimensional location information, the returned value does not need to be converted.

(4) Wireless Ranging Technology

In two devices that directly communicate with each other by using a radio signal, a distance between the two devices may be determined based on time of sending the radio signal and time of receiving the radio signal.

In embodiments of this application, both a gateway and a mobile device can directly communicate with another device, so that a real-time straight-line distance between the gateway and the another device and a real-time straight-line distance between the mobile device and the another device can be obtained by using the wireless ranging technology.

The following first describes examples of a mobile device, a gateway, and an intelligent device according to embodiments of this application.

Figure 7:
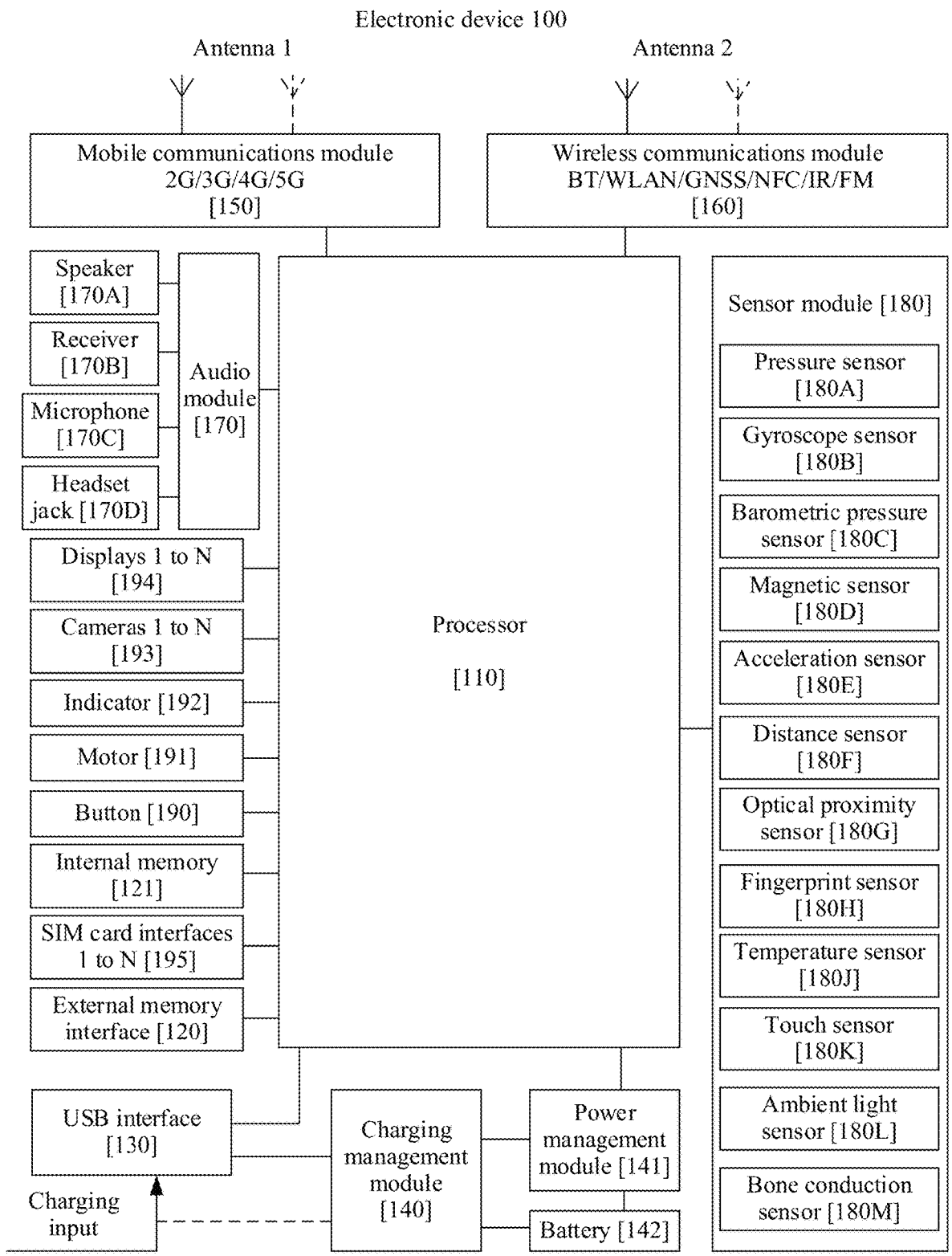
FIG. 7 is a schematic diagram of a structure of a mobile device 100 according to an embodiment of this application.

FIG. 7 is a schematic diagram of a structure of a mobile device 100 according to an embodiment of this application.

The mobile device 100 is used as an example below to describe embodiments in detail. It should be understood that the mobile device 100 may have more or fewer components than those shown in the figure, or may combine two or more components, or may have different component configurations. Components shown in the figure may be implemented by hardware including one or more signal processing and/or application-specific integrated circuits, software, or a combination of hardware and software.

The mobile device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, an eSIM chip 196, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the mobile device 100. In some other embodiments of this application, the mobile device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural network processing unit (neural-network processing unit, NPU). Different processing units may be independent components, or may be integrated into one or more processors.

The controller may be a nerve center and a command center of the mobile device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, an embedded-universal integrated circuit card (Embedded-Universal Integrated Circuit Card, eUICC) interface, a universal serial bus (universal serial bus, USB) interface, and/or the like.

The I2C interface is a two-way synchronous serial bus, including a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through an I2C interface, so that the processor 110 communicates with the touch sensor 180K through the I2C bus interface to implement a touch function of the mobile device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through the Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface to implement a photographing function of the mobile device 100. The processor 110 communicates with the display 194 through the DSI interface, to implement a display function of the mobile device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The SIM interface may be configured to communicate with the SIM card interface 195, to implement a function of transmitting data to an SIM card or reading data in an SIM card.

The eUICC interface may be configured to communicate with the eSIM chip 196, to implement a function of sending data to the eSIM chip or reading data in the eSIM chip.

The USB interface 130 is an interface that conforms to a USB standard specification, and may be specifically a mini USB interface, a micro USB interface, a USB Type-C interface, or the like. The USB interface 130 may be configured to connect to the charger to charge the mobile device 100, or may be configured to transmit data between the mobile device 100 and a peripheral device, or may be configured to connect to a headset for playing audio through the headset. The interface may be further configured to connect to another mobile device such as an AR device.

It may be understood that an interface connection relationship between the modules that is shown in this embodiment of the present invention is merely an example for description, and does not constitute a limitation on the structure of the mobile device 100. In some other embodiments of this application, the mobile device 100 may alternatively use an interface connection manner different from that in the foregoing embodiment, or use a combination of a plurality of interface connection manners.

The charging management module 140 is configured to receive charging input from the charger. The charger may be a wireless charger or a wired charger.

The power management module 141 is configured to connect the battery 142 and the charging management module 140 to the processor 110. The power management module 141 receives input of the battery 142 and/or the charging management module 140, and supplies power to the processor 110, the internal memory 121, an external memory, the display 194, the camera 193, the wireless communications module 160, and the like.

A wireless communication function of the mobile device 100 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the mobile device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that includes 2G, 3G, 4G, 5G, or the like and that is applied to the mobile device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules of the mobile communications module 150 may be disposed in the same device as at least some modules of the processor 110.

The modem processor may include a modulator and a demodulator. The modulator is configured to modulate a to-be-sent low-frequency baseband signal into a medium/high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in the same device as the mobile communications module 150 or another functional module.

The wireless communications module 160 may provide a wireless communications solution that is applied to the mobile device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like. The wireless communications module 160 may be one or more components integrating at least one communications processor module. The wireless communications module 160 receives an electromagnetic wave by the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the mobile device 100, the antenna 1 and the mobile communications module 150 are coupled, and the antenna 2 and the wireless communications module 160 are coupled, so that the mobile device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The mobile device 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the mobile device 100 may include one or N displays 194, where N is a positive integer greater than 1.

The mobile device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal of a standard format such as RGB or YUV. In some embodiments, the mobile device 100 may include one or N cameras 193, where N is a positive integer greater than 1.

The digital signal processor is configured to process a digital signal, and may process another digital signal in addition to the digital image signal. For example, when the mobile device 100 selects a frequency, the digital signal processor is configured to perform Fourier transform on frequency energy.

The video codec is configured to compress or decompress a digital video. The mobile device 100 may support one or more video codecs. In this way, the mobile device 100 can play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the mobile device 100 may be implemented through the NPU, for example, image recognition, facial recognition, speech recognition, and text understanding.

The external memory interface 120 may be configured to connect to an external storage card, for example, a micro SD card, to extend a storage capability of the mobile device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121 to perform various function applications of the mobile device 100 and data processing. The internal memory 121 may include a program storage area and a data storage area. The program storage area may store an operating system, an application required by at least one function (for example, a facial recognition function, a fingerprint recognition function, and a mobile payment function), and the like. The data storage area may store data (for example, facial information template data and a fingerprint information template) and the like created when the mobile device 100 is used. In addition, the internal memory 121 may include a high-speed random access memory, and may further include a nonvolatile memory, for example, at least one magnetic disk storage device, a flash memory device, or a universal flash storage (universal flash storage, UFS).

The mobile device 100 may implement audio functions by using the audio module 170, the speaker 170A, the receiver 170B, the microphone 170C, the headset jack 170D, the application processor, and the like, for example, implement a music playback function and a recording function.

The audio module 170 is configured to convert digital audio information into an analog audio signal for output, and is also configured to convert analog audio input into a digital audio signal. The audio module 170 may be further configured to code and decode audio signals. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The mobile device 100 may be used to listen to music or answer a call in a hands-free mode over the speaker 170A.

The receiver 170B, also referred to as an "earpiece", is configured to convert an electrical audio signal into a sound signal. When a call is answered or speech information is received by using the mobile device 100, the receiver 170B may be put close to a human ear to listen to a speech.

The microphone 170C, also referred to as a "mike" or a "mic", is configured to convert a sound signal into an electrical signal. When making a call or sending voice information, a user may make a sound near the microphone 170C through the mouth of the user, to input a sound signal to the microphone 170C. At least one microphone 170C may be disposed in the mobile device 100. In some other embodiments, two microphones 170C may be disposed in the mobile device 100, to collect a sound signal and implement a noise reduction function. In some other embodiments, three, four, or more microphones 170C may alternatively be disposed in the mobile device 100, to collect a sound signal, reduce noise, further identify a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The mobile device 100 determines pressure strength based on the change of the capacitance. When a touch operation is performed on the display 194, the mobile device 100 detects strength of the touch operation by using the pressure sensor 180A. The mobile device 100 may also calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating an SMS message is performed.

The gyroscope sensor 180B may be configured to determine a motion posture of the mobile device 100. In some embodiments, an angular velocity of the mobile device 100 around three axes (namely, x, y, and z axes) may be determined by using the gyroscope sensor 180B. The gyroscope sensor 180B may be configured to implement image stabilization during photographing. For example, when the shutter is pressed, the gyroscope sensor 180B detects an angle at which the mobile device 100 shakes, and calculates, based on the angle, a distance for which a lens module needs to compensate, so that the lens cancels the shake of the mobile device 100 through reverse motion, to implement image stabilization. The gyroscope sensor 180B may also be used in navigation and motion sensing game scenarios.

The barometric pressure sensor 180C is configured to measure barometric pressure. In some embodiments, the mobile device 100 calculates a sea level height based on the barometric pressure measured by the barometric pressure sensor 180C, to assist in positioning and navigation.

The magnetic sensor 180D includes a Hall sensor. The mobile device 100 may detect opening and closing of a flip cover by using the magnetic sensor 180D. In some embodiments, when the mobile device 100 is a flip phone, the mobile device 100 can detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect values of accelerations of the mobile device 100 in various directions (usually on three axes). When the mobile device 100 is still, a value and a direction of gravity may be detected. The acceleration sensor 180E may be further configured to identify a posture of the mobile device, and is used in an application such as screen switching between a landscape mode and a portrait mode or a pedometer.

The distance sensor 180F is configured to measure a distance. The mobile device 100 may measure a distance in an infrared manner or a laser manner. In some embodiments, in a photographing scenario, the mobile device 100 may measure a distance by using the distance sensor 180F to implement quick focusing.

The optical proximity sensor 180G may include, for example, a light-emitting diode (LED) and an optical detector, for example, a photodiode. The light-emitting diode may be an infrared light-emitting diode. The mobile device 100 emits infrared light outward by using the light-emitting diode. The mobile device 100 detects infrared reflected light from a nearby object by using the photodiode. When sufficient reflected light is detected, it may be determined that there is an object near the mobile device 100. When insufficient reflected light is detected, the mobile device 100 may determine that there is no object near the mobile device 100. The mobile device 100 may detect, by using the optical proximity sensor 180G, that the user holds the mobile device 100 close to the ear for a call, to automatically turn off a screen to save power. The optical proximity sensor 180G may also be used in a smart cover mode or a pocket mode to automatically perform screen unlocking or locking.

The ambient light sensor 180L is configured to sense ambient light brightness. The mobile device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the mobile device 100 is in a pocket, to prevent an accidental touch.

The fingerprint sensor 180H is configured to collect a fingerprint. The mobile device 100 may use a feature of the collected fingerprint to implement fingerprint-based unlocking, application access locking, fingerprint-based photographing, fingerprint-based call answering, and the like.

The temperature sensor 180J is configured to detect a temperature. In some embodiments, the mobile device 100 executes a temperature processing policy based on the temperature detected by the temperature sensor 180J. For example, when the temperature reported by the temperature sensor 180J exceeds a threshold, the mobile device 100 lowers performance of a processor nearby the temperature sensor 180J, to reduce power consumption for thermal protection. In some other embodiments, when the temperature is less than another threshold, the mobile device 100 heats the battery 142 to prevent the mobile device 100 from being shut down abnormally due to a low temperature. In some other embodiments, when the temperature is less than still another threshold, the mobile device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor, to determine a type of a touch event. A visual output related to the touch operation may be provided through the display 194. In some other embodiments, the touch sensor 180K may alternatively be disposed on a surface of the mobile device 100 at a location different from that of the display 194.

The button 190 includes a power button, a volume button, and the like. The button 190 may be a mechanical button, or may be a touch button. The mobile device 100 may receive button input, and generate button signal input related to a user setting and function control of the mobile device 100.

The motor 191 may generate a vibration prompt. The motor 191 may be configured to provide an incoming call vibration prompt or a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the mobile device 100. The mobile device 100 may support one or N SIM card interfaces, where N is a positive integer greater than 1. The SIM card interface 195 may support a nano-SIM card, a micro-SIM card, a SIM card, and the like. A plurality of cards may be inserted into the same SIM card interface 195 at the same time. The plurality of cards may be of a same type or different types. The SIM card interface 195 may be compatible with different types of SIM cards. The SIM card interface 195 is also compatible with an external storage card. The mobile device 100 interacts with a network through the SIM card, to implement functions such as calling and data communication.

A software system of the mobile device 100 may use a hierarchical architecture, an event-driven architecture, a microkernel architecture, a microservice architecture, or a cloud architecture. In this embodiment of this application, an Android system with the hierarchical architecture is used as an example to describe a software structure of the mobile device 100.

Figure 8:
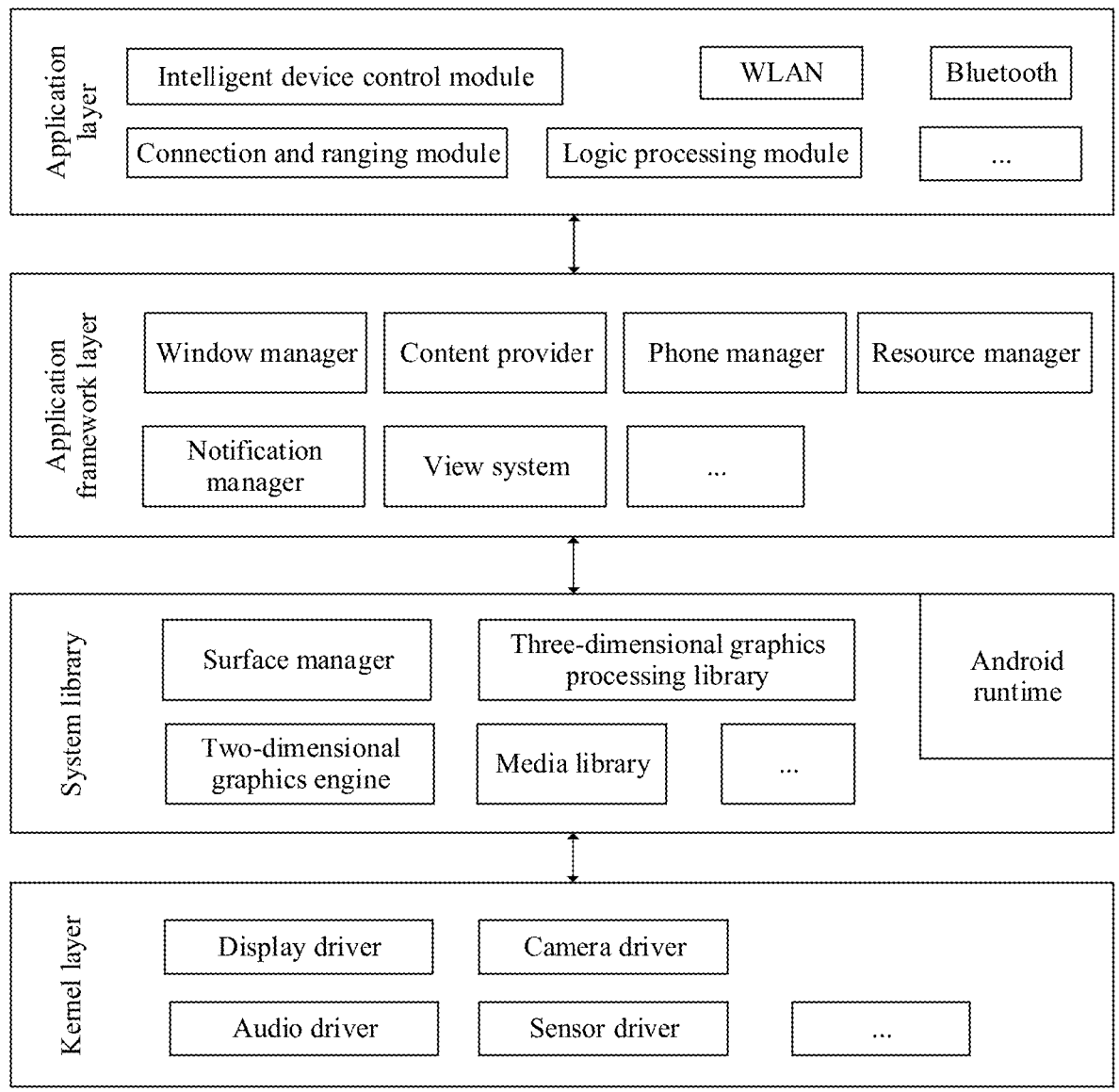
FIG. 8 is a block diagram of a software structure of a mobile device 100 according to an embodiment of this application.

FIG. 8 is a block diagram of a software structure of the mobile device 100 in this embodiment of this application.

In the hierarchical architecture, software is divided into several layers, and each layer has a clear role and task. The layers communicate with each other through a software interface. In some embodiments, the Android system is divided into four layers, namely, an application layer, an application framework layer, an Android runtime (Android runtime) and a system library, and a kernel layer from top to bottom.

The application layer may include a series of application packages.

As shown in FIG. 8, the application packages may include applications (which may also be referred to as application programs) such as an intelligent device control module, a WLAN, Bluetooth, a connection and ranging module, and a logic processing module.

The intelligent device control module is configured to trigger a control instruction based on a user operation, to control the intelligent device.

The WLAN is configured to construct a wireless local area network.

The Bluetooth is configured to construct a short-distance wireless communication connection.

The connection and ranging module is configured to perform wireless communication connection and wireless communication ranging with a gateway and an intelligent device, and transfer obtained data to the logic processing module for subsequent processing.

The logic processing module is configured to perform sensor information processing, participate in calculation for constructing three-dimensional location information, and the like.

The application framework layer provides an application programming interface (application programming interface, API) and a programming framework for an application at the application layer. The application framework layer includes some predefined functions.

As shown in FIG. 8, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS notification icon may include a text display view and an image display view.

The phone manager is configured to provide a communications function of the mobile device 100, for example, management of a call status (including answering, declining, or the like).

The resource manager provides various resources for an application, such as a localized character string, an icon, an image, a layout file, and a video file.

The notification manager enables an application to display notification information in the status bar, and may be configured to transmit a notification-type message. The displayed information may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application running on the background or a notification that appears on a screen in a form of a dialog interface. For example, text information is prompted in the status bar, a prompt tone is produced, the mobile device vibrates, or an indicator light blinks.

The Android runtime (Android Runtime) includes a core library and a virtual machine. The Android runtime is responsible for scheduling and management of the Android system.

The core library includes two parts: a function that needs to be invoked in java language, and a core library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a two-dimensional graphics engine (for example, SGL).

The surface manager is configured to manage a display subsystem and provide fusion of two-dimensional (2-Dimensional, 2D) and three-dimensional (3-Dimensional, 3D) image layers for a plurality of applications.

The media library supports playback and recording in a plurality of commonly used audio and video formats, and static image files. The media library may support a plurality of audio and video coding formats, for example, MPEG-4, H.264, MP3, AAC, AMR, JPG, and PNG.

The three-dimensional graphics processing library is configured to implement 3D graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, a sensor driver, and a virtual card driver.

The following describes an example of a working procedure of software and hardware of the mobile device 100 with reference to a photographing scenario.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a single-tap operation and a control corresponding to the single-tap operation is a control of a camera application icon. A camera application invokes an interface at the application framework layer, so that the camera application is started. Then, the camera driver is started by invoking the kernel layer, and a static image or a video is captured by using the camera 193.

Figure 9:
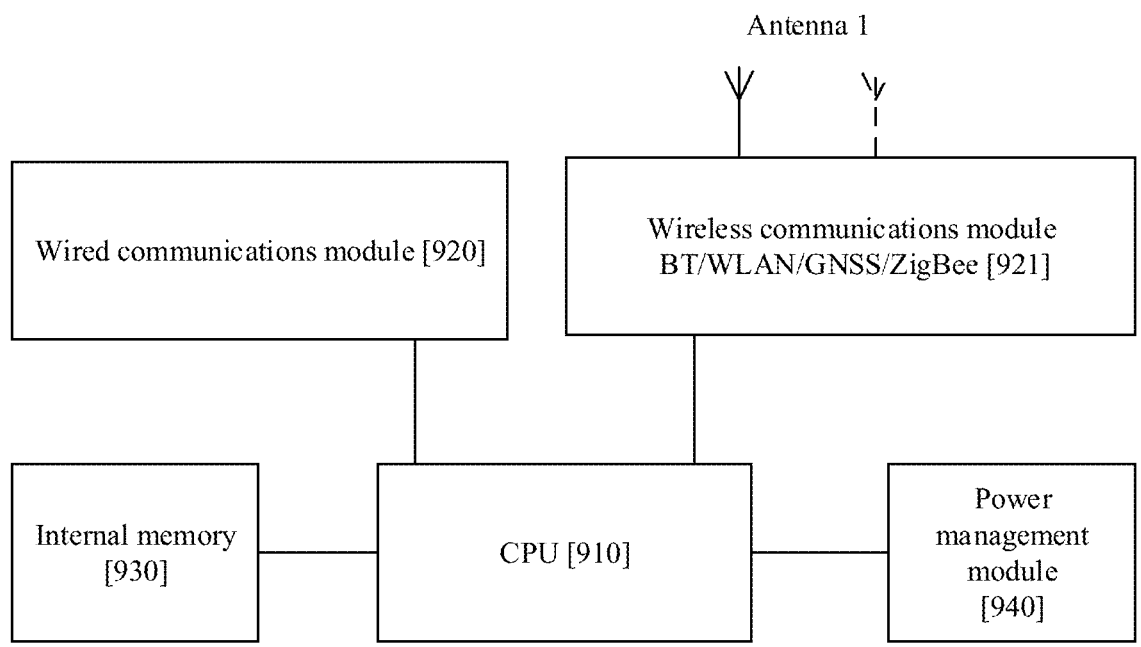
FIG. 9 is a schematic diagram of a structure of a gateway 900 according to an embodiment of this application.

FIG. 9 is a schematic diagram of a structure of a gateway 900 according to an embodiment of this application.

The gateway 900 is used as an example below to describe embodiments in detail. It should be understood that the gateway 900 may have more or fewer components than those shown in the figure, or may combine two or more components, or may have different component configurations. Components shown in the figure may be implemented by hardware including one or more signal processing and/or application-specific integrated circuits, software, or a combination of hardware and software.

The gateway 900 may include a processor 910, an internal memory 930, a power management module 940, an antenna 1, a wired communications module 920, a wireless communications module 921, and the like.

For descriptions of the processor 910, the internal memory 930, the wireless communications module 921, and the power management module 940, refer to the processor 110, the internal memory 121, the wireless communications module 160, and the power management module 141 shown in FIG. 7. Details are not described herein again.

A software system of the gateway 900 may use a hierarchical architecture, an event-driven architecture, a microkernel architecture, a microservice architecture, or a cloud architecture. In this embodiment of this application, a system with the hierarchical architecture is used as an example to describe a software structure of the gateway 900.

Figure 10:
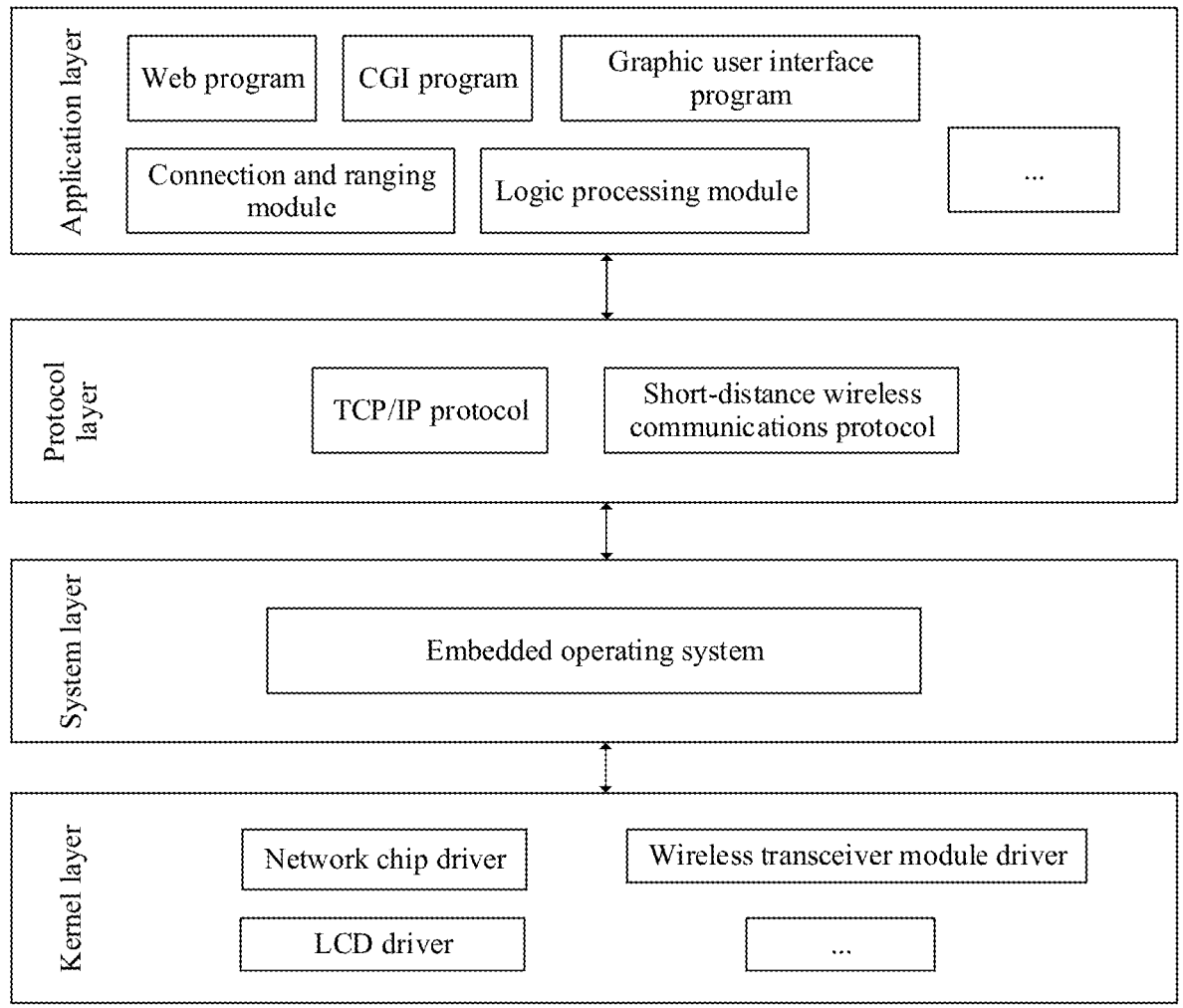
FIG. 10 is a block diagram of a software structure of a gateway 900 according to an embodiment of this application.

FIG. 10 is a block diagram of a software structure of the gateway 900 in this embodiment of this application.

In the hierarchical architecture, software is divided into several layers, and each layer has a clear role and task. The layers communicate with each other through a software interface. In some embodiments, the system is divided into four layers, namely, an application layer, an application framework layer, a system layer, and a kernel layer from top to bottom.

The application layer may include a series of application packages.

As shown in FIG. 10, the application packages may include applications (which may also be referred to as application programs) such as a Web program, a CGI program, a graphical user interface program, a connection and ranging module, and a logic processing module.

The connection and ranging module is configured to perform wireless communication connection and wireless communication ranging with a mobile device and an intelligent device, and transfer obtained data to the logic processing module for subsequent processing.

The logic processing module is configured to participate in calculation for constructing three-dimensional location information and the like.

The protocol layer provides a standardized protocol execution process that supports applications at the application layer. The protocol layer may include a TCP/IP protocol and a short-distance wireless communications protocol.

The system layer includes an embedded operating system that supports system running.

The kernel layer is a layer between hardware and software. The kernel layer includes at least a network chip driver, a wireless transceiver module driver, an LCD driver, and the like.

Figure 11:
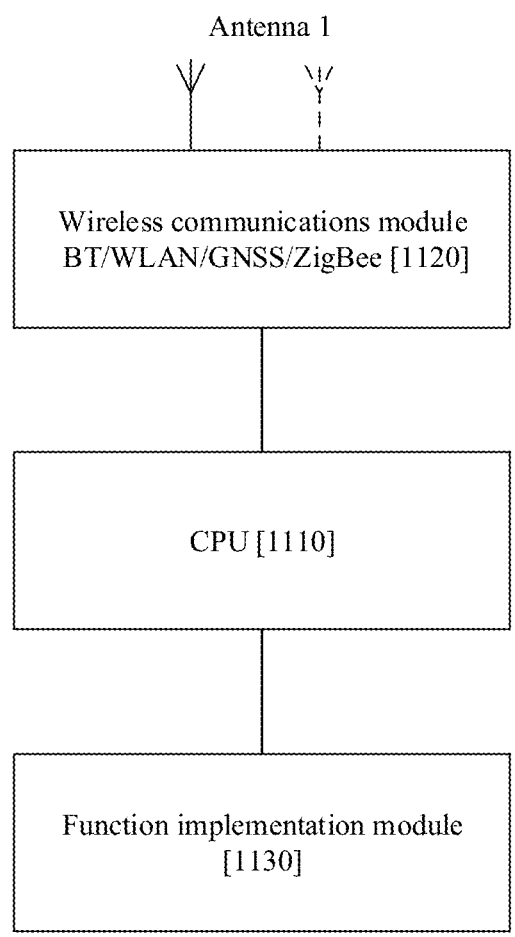
FIG. 11 is a schematic diagram of a structure of an intelligent device 1100 according to an embodiment of this application.

FIG. 11 is a schematic diagram of a structure of an intelligent device 1100 according to an embodiment of this application.

The intelligent device 1100 is used as an example below to describe embodiments in detail. It should be understood that the intelligent device 1100 may have more or fewer components than those shown in the figure, or may combine two or more components, or may have different component configurations. Components shown in the figure may be implemented by hardware including one or more signal processing and/or application-specific integrated circuits, software, or a combination of hardware and software.

The intelligent device 1100 may include a processor 1110, a wireless communications module 1120, a function implementation module 1130, and the like.

For descriptions of the processor 1110 and the wireless communications module 1120, refer to the processor 110 and the wireless communications module 160 shown in FIG. 7. Details are not described herein again.

The function implementation module 1130 may provide, under control of the processor 1110, a function of a conventional household appliance, for example, a function of an electrical appliance such as an electric lamp, a television, a washing machine, a refrigerator, or an air conditioner.

A software system of the intelligent device 1100 may use a hierarchical architecture, an event-driven architecture, a microkernel architecture, a microservice architecture, or a cloud architecture. In this embodiment of this application, a system with the hierarchical architecture is used as an example to describe a software structure of the intelligent device 1100.

Figure 12:
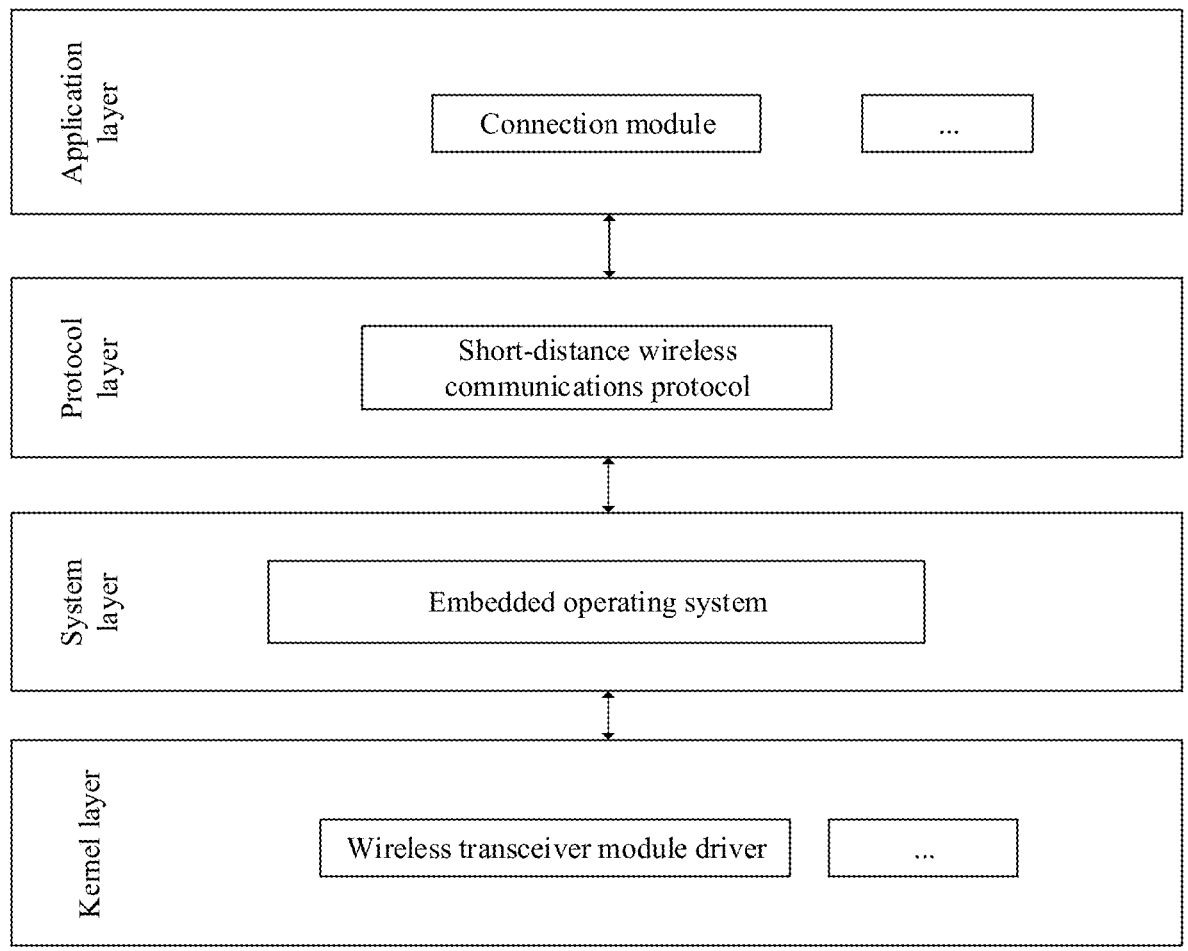
FIG. 12 is a block diagram of a software structure of an intelligent device 1100 according to an embodiment of this application.

FIG. 12 is a block diagram of a software structure of the intelligent device 1100 in this embodiment of this application.

In some embodiments, the system is divided into four layers, namely, an application layer, an application framework layer, a system layer, and a kernel layer from top to bottom.

The application layer may include a connection module.

The connection module is configured to perform wireless communication connection and wireless communication ranging with a gateway and a mobile device.

The protocol layer provides a standardized protocol execution process that supports applications at the application layer. The protocol layer may include a short-distance wireless communications protocol.

The system layer includes an embedded operating system that supports system running.

The kernel layer is a layer between hardware and software. The kernel layer includes at least a wireless transceiver module driver and the like.

The following embodiments of this application provide a method for determining a control target. After three-dimensional network location information of all networked intelligent devices is intelligently and autonomously constructed, a control target can be determined only by using a mobile device to point to a to-be-controlled target intelligent device, to perform subsequent control. This greatly simplifies a process of determining the control target, and improves usability of human-machine interaction.

Figure 13A:
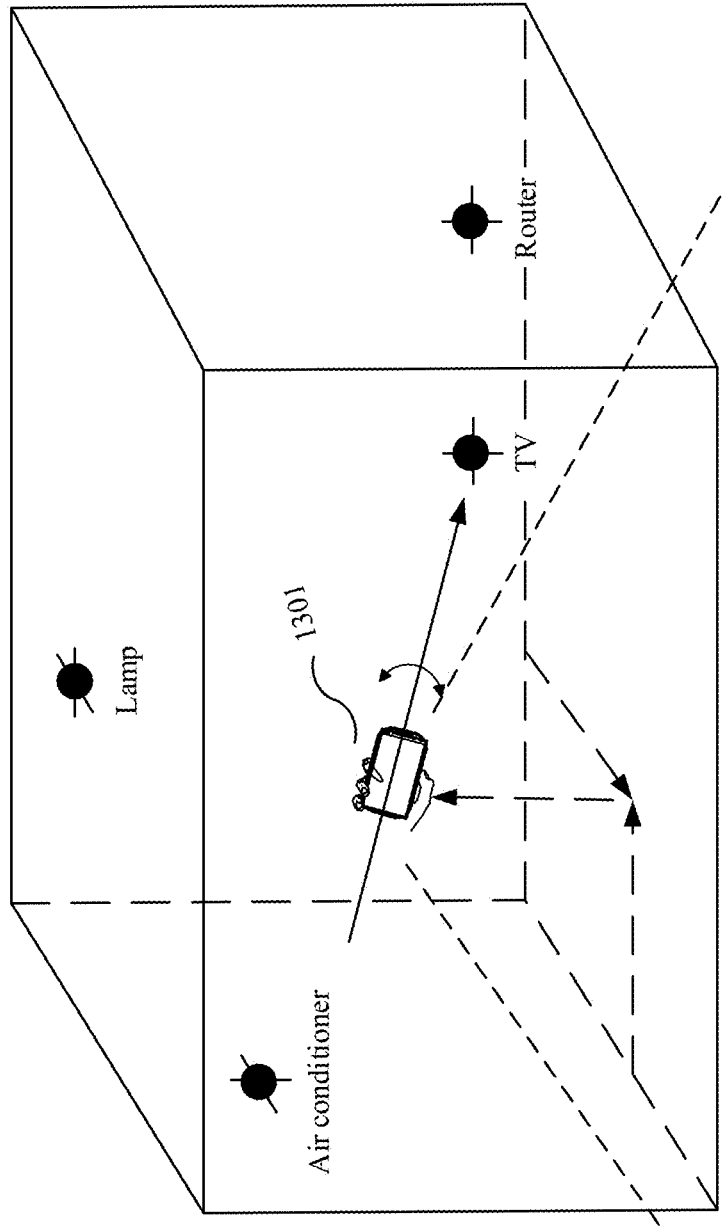

FIG. 13A and FIG. 13B are a schematic diagram of a scenario of controlling an intelligent device according to an embodiment of this application. Intelligent devices such as an air conditioner, a television, and the like and a mobile device 1301 all access a network by using a router. After the mobile device and the router intelligently construct three-dimensional network location information of all networked intelligent devices, a user holds the mobile device 1301 to point to the television. In this case, the mobile device intelligently determines that a control target is the television, and an interface displayed on a display of the mobile device 1301 directly jumps from a standby display interface 1302 to a television control interface 1303, to control the television. This saves a plurality of tap and selection operations, and improves user control experience on the intelligent device.

Embodiment 1

Figure 14:
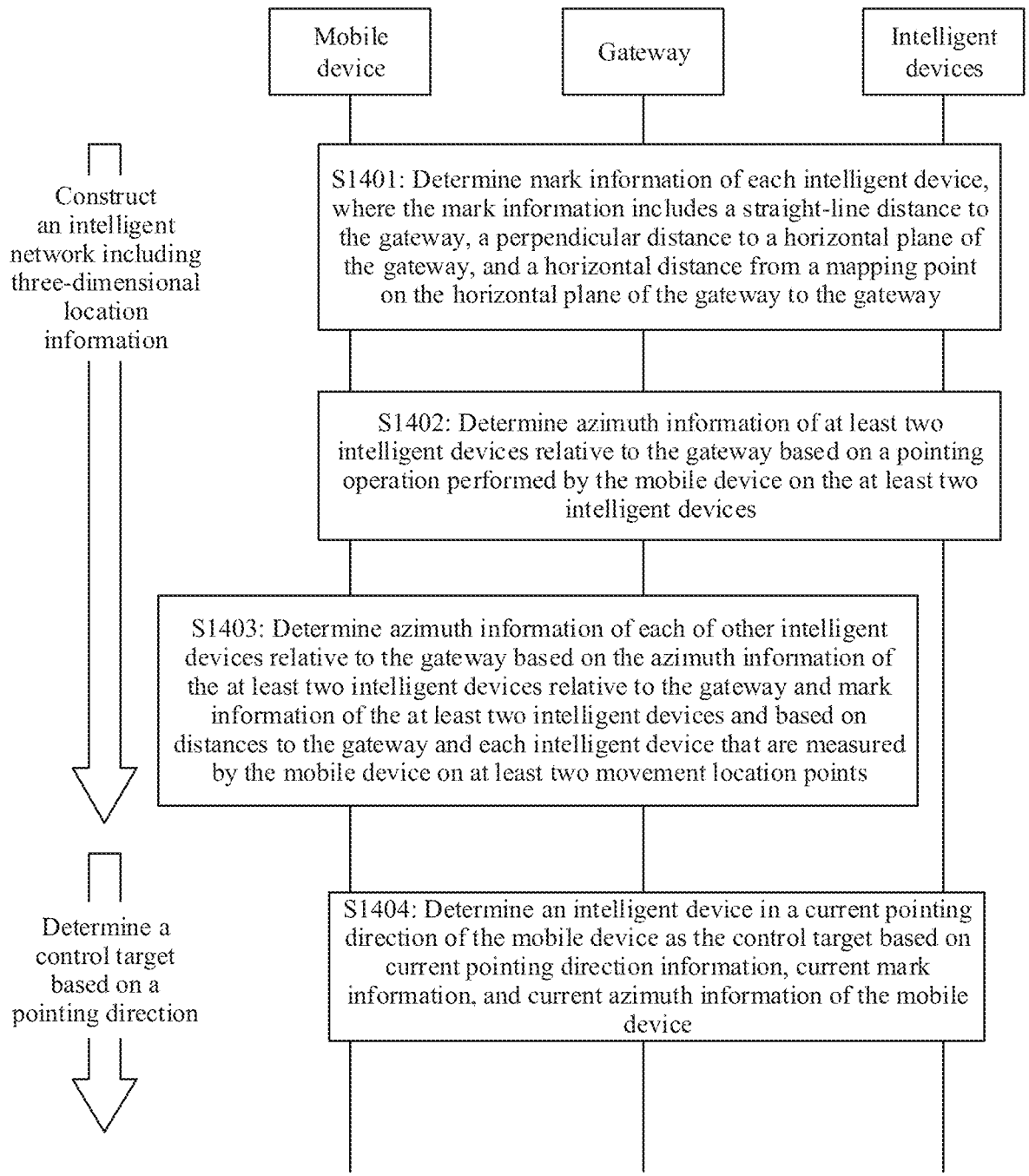
FIG. 14 is a schematic flowchart of a method for determining a control target according to an embodiment of this application.

As shown in FIG. 14, the method for determining a control target includes steps S1401 to S1404. S1401 to S1403 describe how to construct an intelligent network including three-dimensional location information. S1404 describes how to determine a control target based on a pointing direction after the intelligent network including three-dimensional location information is constructed. The following provides descriptions separately.

S1401: Determine mark information of each intelligent device.

For content of the mark information, refer to specific descriptions of the mark information in the foregoing terms. Details are not described herein again.

It may be understood that the mark information of each intelligent device is obtained through collaborative calculation by a mobile device, a gateway device, and the intelligent devices. The calculation process may be performed in the mobile device, or may be performed in the gateway, or may be partially performed in the mobile device and partially performed in the gateway in a distributed manner, and specifically, may be preset based on an actual situation or may be allocated by the mobile device or the gateway based on a current calculation amount, which is not limited herein.

The following describes an example of a specific process of determining the mark information of each intelligent device.

Figure 15:
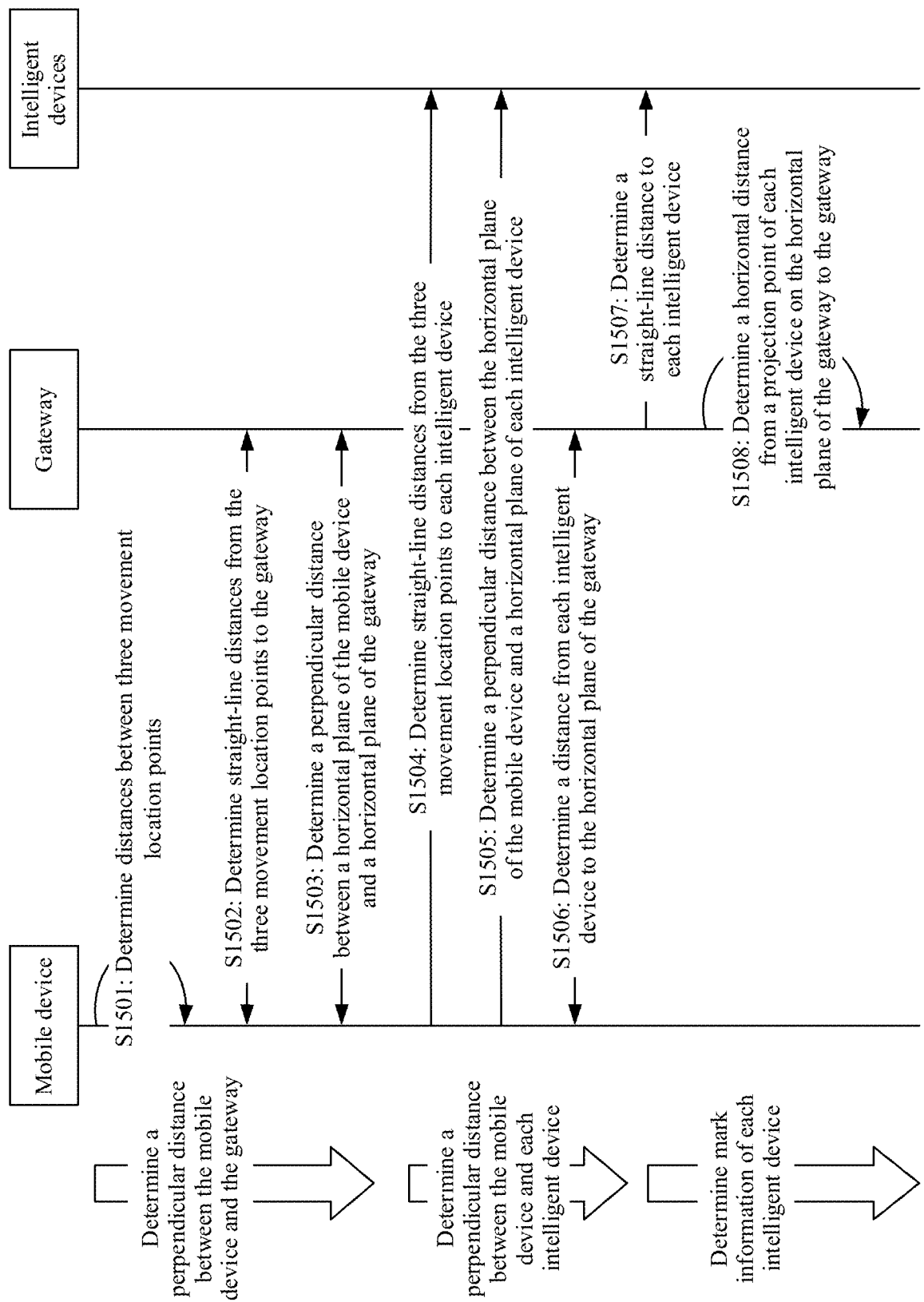
FIG. 15 is an example schematic flowchart of determining mark information of each intelligent device according to an embodiment of this application.

As shown in FIG. 15, the specific process of determining the mark information of each intelligent device includes steps S1501 to S1508. In S1501 to S1503, a perpendicular distance between the mobile device and the gateway may be determined. In S1504 and S1505, a perpendicular distance between the mobile device and each intelligent device may be determined. In S1506 to S1508, the mark information of each intelligent device may be determined based on the perpendicular distances respectively obtained in the previous two stages.

First, a calculation model for determining a perpendicular height from another device to a horizontal plane of the mobile device (referred to as a perpendicular height calculation model for short below) is described.

Figure 16:
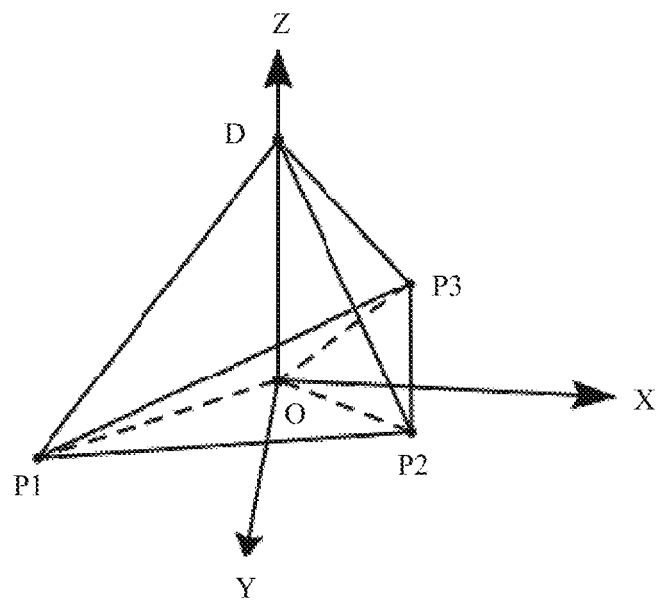
FIG. 16 is a schematic diagram of a perpendicular height calculation model according to an embodiment of this application.

FIG. 16 is a schematic diagram of a perpendicular height calculation model according to an embodiment of this application. A three-dimensional rectangular coordinate system is established by using a projection O of a device D on a horizontal plane of a mobile device as an origin, where a height from the device D to the horizontal plane of the mobile device needs to be calculated. In a movement process of the mobile device, three movement location points P1, P2, and P3 are located on the horizontal plane of the mobile device and are not collinear.

In this case, four points in the calculation model form a triangular pyramid. Only an edge length of each edge of the triangular pyramid needs to be determined, so that a height DO of the triangular pyramid can be determined based on the analytical geometry. The height DO of the triangular pyramid is the distance from the device D to the horizontal plane of the mobile device.

The edge lengths of the triangular pyramid are classified into two types:

A first type includes distances P1P2, P2P3, and P3P1 between the movement location points of the mobile device.

If the three movement location points are generated by one mobile device, this type of distance may be obtained through calculation by using data obtained by an internal sensor or module such as an acceleration sensor or a GPS module in the mobile device.

If the three movement location points are generated by a plurality of mobile devices, the distances between the movement location points generated by the plurality of mobile devices may be obtained through calculation based on a wireless ranging technology, calculation based on GPS data of the plurality of mobile devices, or the like.

The second type includes distances DP1, DP2, and DP3 from the device D to the movement location points.

The mobile device can directly communicate with the device D at each movement location point, and this type of distance is calculated by using the wireless ranging technology.

Therefore, the mobile device only needs to determine three movement location points that are located on a same horizontal plane of the mobile device and that are not collinear, so that the mobile device can determine distances between the three movement location points, and determine distances from the device D to the three movement location points by using the wireless ranging technology, to determine a perpendicular height from the device D to the horizontal plane of the mobile device based on the perpendicular height calculation model.

It may be understood that, in a network environment accessed to the gateway, because a movement environment is usually relatively flat, movement of a user with a mobile device may be considered as movement on a same horizontal plane in most cases.

The following describes specific steps based on the perpendicular height calculation model.

(1) Determine a Perpendicular Distance Between the Mobile Device and the Gateway:

S1501: The mobile device determines distances between three movement location points.

The movement location point is a location point that the mobile device passes through in a movement process. The three movement location points are located on the same horizontal plane and are not collinear.

In the movement process, the mobile device may detect whether a current movement location point meets a calculation requirement. If the current movement location point does not meet the calculation requirement, the mobile device may ignore the current movement location point until a movement location point that meets the calculation requirement is found.

It may be understood that, in embodiments of this application, provided that a perpendicular distance between horizontal planes is less than a preset value, it may be considered that the horizontal planes are on a same horizontal plane.

If the three movement location points are generated by one mobile device, the distances between the three movement location points may be obtained through calculation by using data obtained by an internal sensor or module such as an acceleration sensor or a GPS module in the mobile device.

If the three movement location points are generated by a plurality of mobile devices, the distances between the movement location points generated by the plurality of mobile devices may be obtained through calculation based on a wireless ranging technology, calculation based on GPS data of the plurality of mobile devices, or the like.

S1502: The mobile device and/or the gateway determines straight-line distances from the three movement location points to the gateway.

Based on the wireless ranging technology, the mobile device and/or the gateway may determine the straight-line distances from the three movement location points to the gateway.

S1503: The mobile device and/or the gateway determines a perpendicular distance between a horizontal plane of the mobile device and a horizontal plane of the gateway.

After the distances between the three movement location points and the straight-line distances from the three movement location points to the gateway are determined, the mobile device and/or the gateway may determine the perpendicular distance between the horizontal plane of the mobile device and the horizontal plane of the gateway based on the perpendicular height calculation model.

(2) Determine a perpendicular distance between the mobile device and each intelligent device:

S1504: The mobile device determines straight-line distances from the three movement location points to each intelligent device.

Each intelligent device is an intelligent device that is located in a same network environment as the mobile device and the gateway.

It should be noted that step S1504 is performed after step S1501. The three movement location points used in step S1504 may be the same as the three movement location points used in steps S1502 and S1503, or may be three movement location points that are re-determined after step S1501 is performed and that are different from the three movement location points used in steps S1502 and S1503. This is not limited herein.

The mobile device can directly communicate with each intelligent device at each movement location point, and a straight-line distance from the current location point to each intelligent device is calculated by using the wireless ranging technology.

S1505: The mobile device determines a perpendicular distance between the horizontal plane of the mobile device and a horizontal plane of each intelligent device.

After the distances between the three movement location points and the straight-line distances from the three movement location points to each intelligent device are determined, the mobile device may determine the perpendicular distance between the horizontal plane of the mobile device and the horizontal plane of the gateway based on the perpendicular height calculation model.

It may be understood that, when step S1504 and step S1505 are performed, calculation may be performed for each intelligent device by using the same three movement location points, or calculation may be performed by using different three movement location points after step S1501 is performed again. This is not limited herein.

(3) Determine the Mark Information of Each Intelligent Device Based on the Data Determined in (1) and (2):

S1506: The mobile device and/or the gateway determines a distance from each intelligent device to the horizontal plane of the gateway.

After the distance from the horizontal plane of the gateway to the horizontal plane of the mobile device and the distance from each intelligent device to the horizontal plane of the mobile device are determined, the distance from each intelligent device to the horizontal plane of the gateway may be determined.

Figure 17:
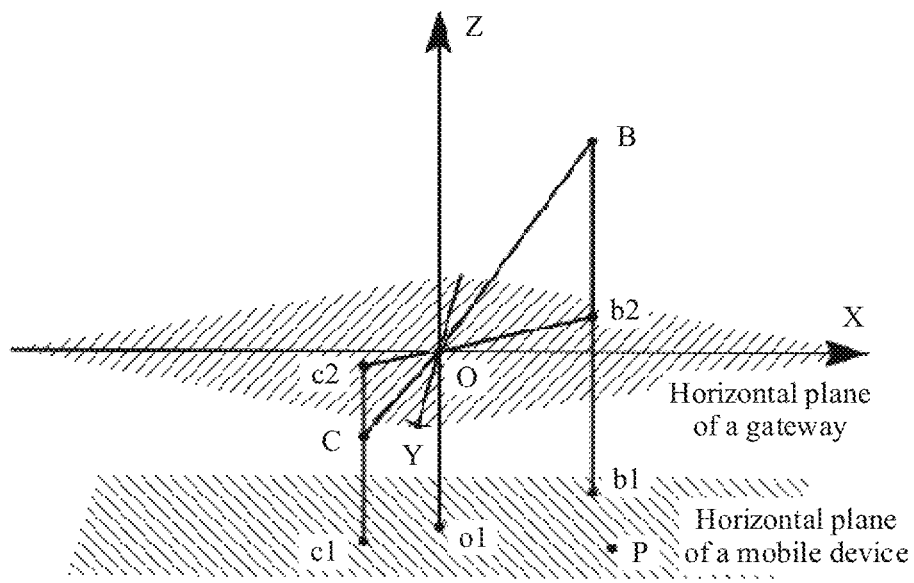
FIG. 17 is an example schematic diagram of determining mark information according to an embodiment of this application.

FIG. 17 is an example schematic diagram of determining mark information according to an embodiment of this application. A three-dimensional rectangular coordinate system is established with a gateway O as an origin. A perpendicular distance Oo1 from the gateway O to a horizontal plane of a mobile device P, a perpendicular distance Cc1 from an intelligent device C to the horizontal plane of the mobile device, and a perpendicular distance Bb1 from an intelligent device B to the horizontal plane of the mobile device have been determined. In this case, a perpendicular distance Cc2 from the intelligent device C to a horizontal plane of the gateway and a perpendicular distance Bb2 from the intelligent device B to the horizontal plane of the gateway may be determined. Optionally, to accurately represent a location of each intelligent device, a distance value below the horizontal plane of the gateway may be represented by a negative value, and a distance value above the horizontal plane of the gateway may be represented by a positive value. In this case, a value Cc2 of the perpendicular distance from the intelligent device C to the horizontal plane of the gateway may be equal to Cc1−Oo1, and a value Bb2 of the perpendicular distance from the intelligent device B to the horizontal plane of the gateway may be equal to Bb1−b2$b$1, namely, Bb1−Oo1.

S1507: The mobile device and/or the gateway determines a straight-line distance from the mobile device and/or the gateway to each intelligent device.

The gateway may directly communicate with each intelligent device. Based on the wireless ranging technology, the mobile device and/or the gateway may determine the straight-line distance to each intelligent device.

S1508: The mobile device and/or the gateway determines a horizontal distance from a projection point of each intelligent device on the horizontal plane of the gateway to the gateway.

When the gateway determines the straight-line distance to each intelligent device and determines the perpendicular distance from each intelligent device to the horizontal plane of the gateway, the mobile device and/or the gateway may determine the horizontal distance from the projection point of each intelligent device on the horizontal plane of the gateway to the gateway.

As shown in FIG. 17, the gateway O has determined a straight-line distance OB to the intelligent device B and a perpendicular distance Bb2 from the intelligent device B to the horizontal plane of the gateway. It can be clearly learned that the gateway O, the intelligent device B, and the projection point b2 of the intelligent device B on the horizontal plane of the gateway form a right triangle. In this case, a horizontal distance b2O from the projection point b2 of the intelligent device B on the horizontal plane of the gateway to the gateway may be determined based on the triangular Pythagorean theorem.

The distance from each intelligent device to the horizontal plane of the gateway determined in step S1506 and the straight-line distance from each intelligent device to the gateway determined in step S1507 are necessary components of the mark information in this embodiment of this application. It may be understood that the mark information may include a horizontal distance from a projection point of each intelligent device on the horizontal plane of the gateway to the gateway determined in step S1508, or may not include the horizontal distance. Step S1508 may be performed after steps S1506 and S1508 are performed, or step S1508 may be performed based on a requirement that the horizontal distance needs to be used. This is not limited herein.

Figure 18:
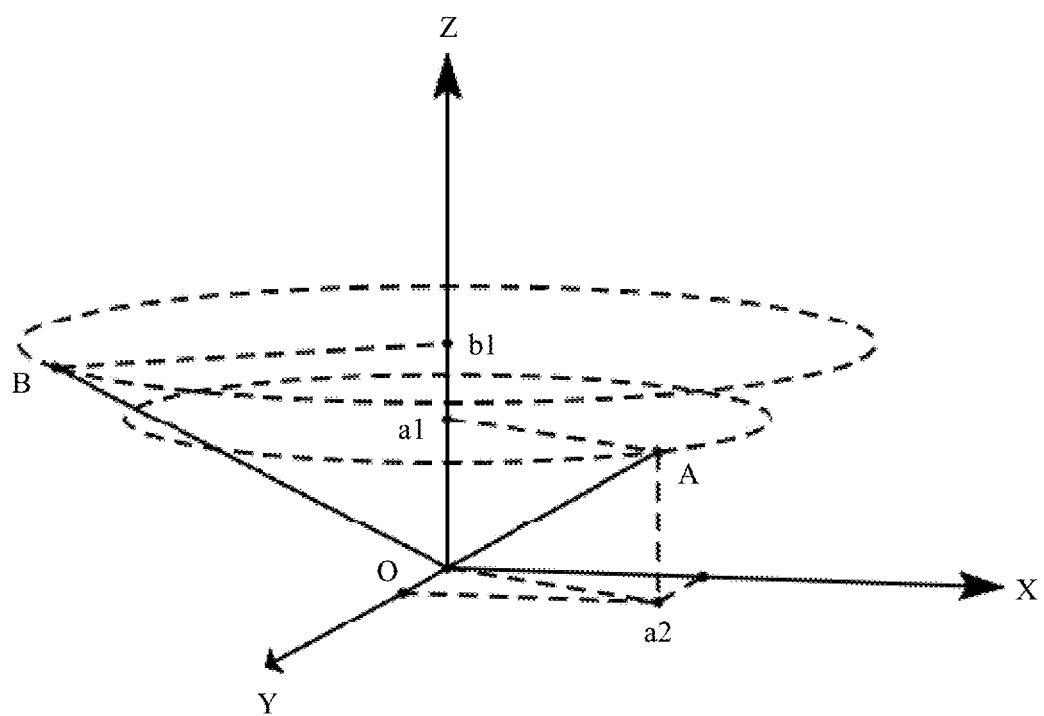
FIG. 18 is an example schematic diagram of a location of an intelligent device in a perspective of a gateway after mark information is determined according to an embodiment of this application.

After the mobile device and/or the gateway determines the mark information of each intelligent device, a location of each intelligent device relative to the gateway is not completely determined. FIG. 18 is an example schematic diagram of a location of an intelligent device in a perspective of a gateway after mark information is determined according to an embodiment of this application. Mark information of an intelligent device A and an intelligent device B is determined, but relative to a gateway O, it can only be determined that the intelligent device A may be at any point on a circle that uses a projection point a1 of the intelligent device A on the Z axis as the center and uses a horizontal distance Aa1 from the intelligent device A to the gateway O as the radius. Similarly, it can only be determined that the intelligent device B may be at any point on a circle that uses a projection point b1 of the intelligent device B on the Z axis as the center and uses a horizontal distance Bb1 from the intelligent device B to the gateway O as the radius.

If a spatial location of an intelligent device needs to be further determined, azimuth information of the intelligent device further needs to be determined. Usually, only the mobile device has an azimuth measurement function. Therefore, a user needs to hold the mobile device to perform a small amount of manual auxiliary positioning.

S1402: Determine azimuth information of at least two intelligent devices relative to the gateway based on a pointing operation performed by the mobile device on the at least two intelligent devices.

It may be understood that the mobile device may calculate azimuth information of an intelligent device relative to the gateway by performing a pointing operation on the intelligent device once. For content of the azimuth information, refer to specific descriptions of the azimuth information in the foregoing terms. Details are not described herein again.

Figure 19A:
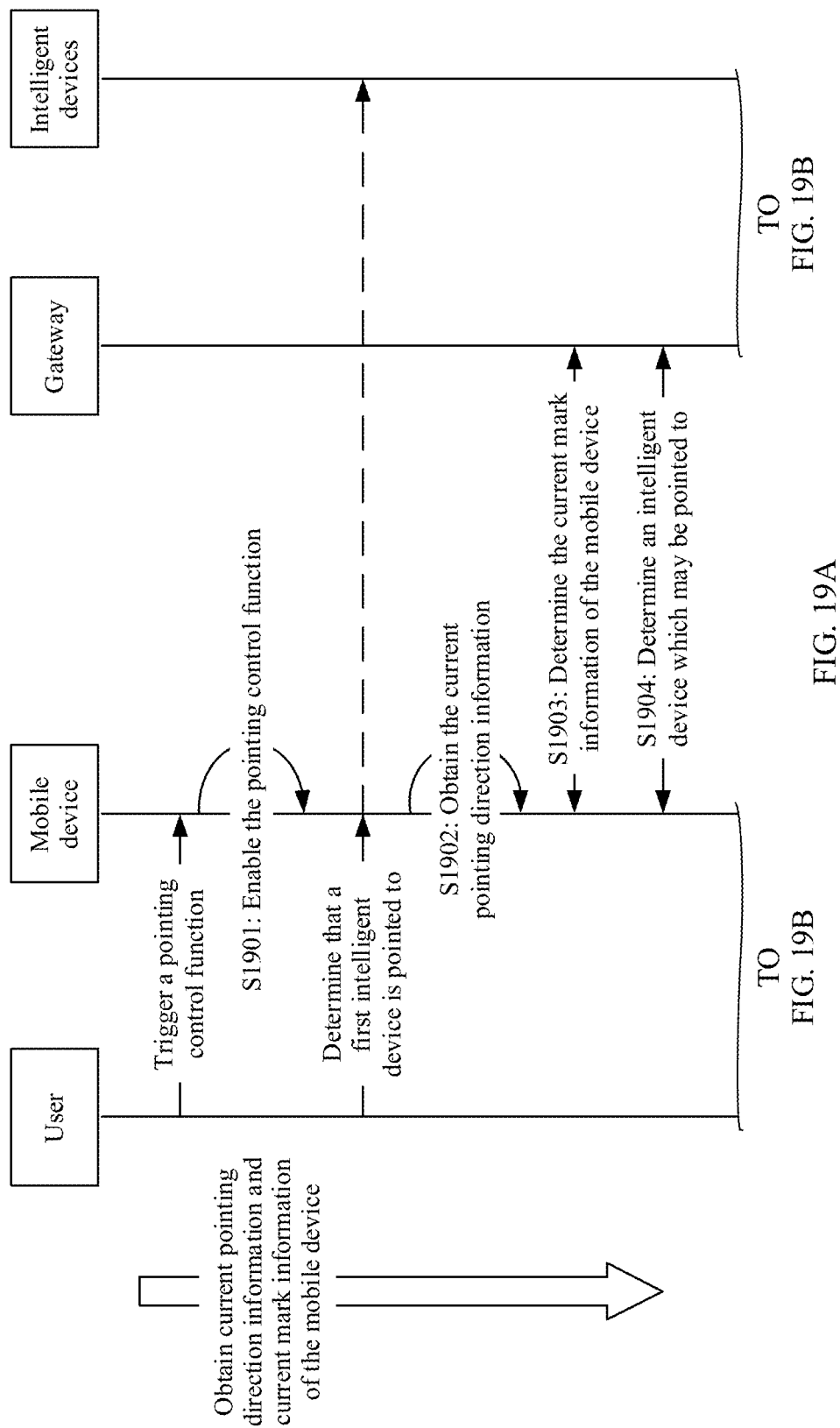
FIG. 19A, FIG. 19B, and FIG. 19C are an example schematic flowchart of determining azimuth information of an intelligent device according to an embodiment of this application.
Figure 19B:
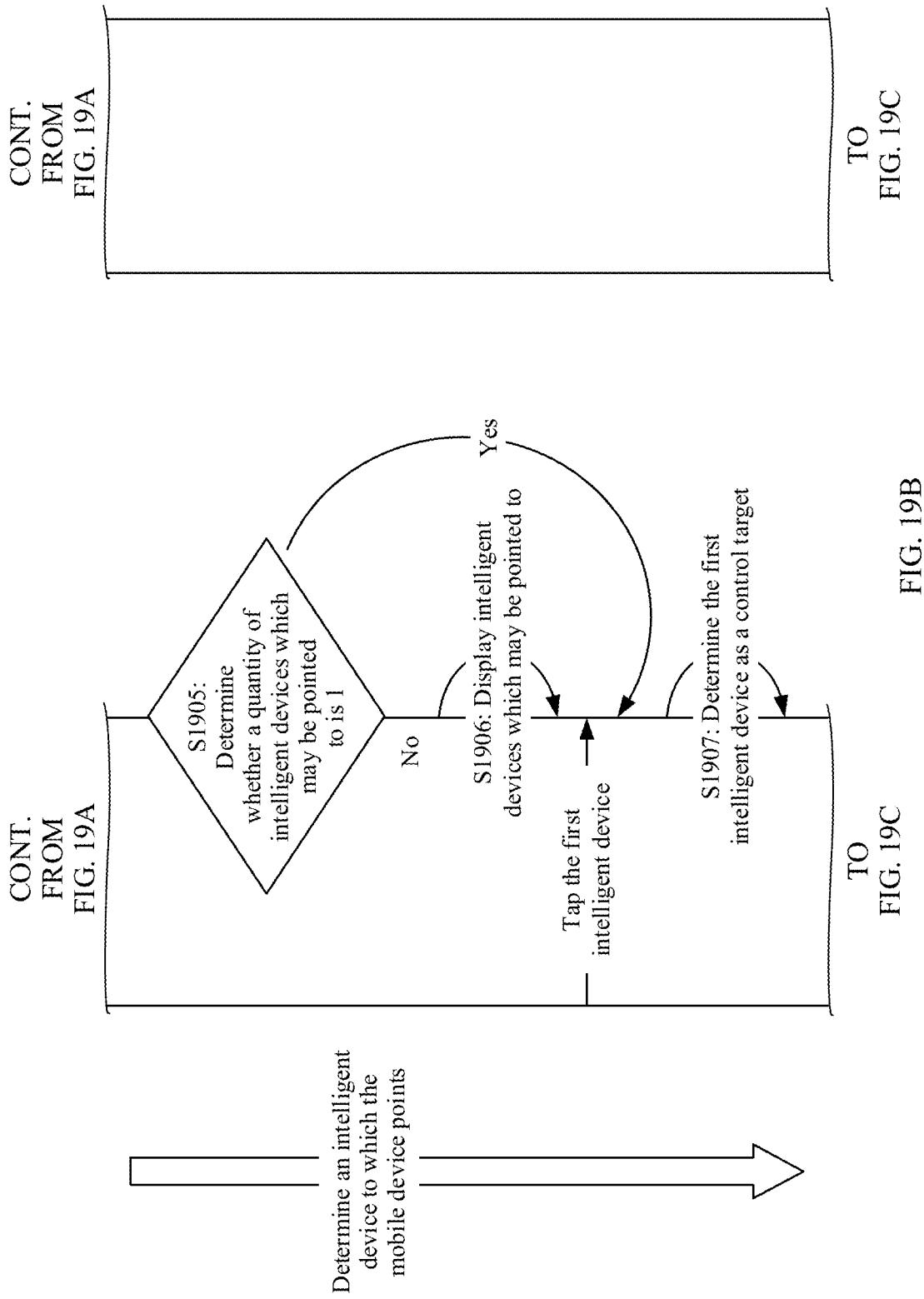
Figure 19C:
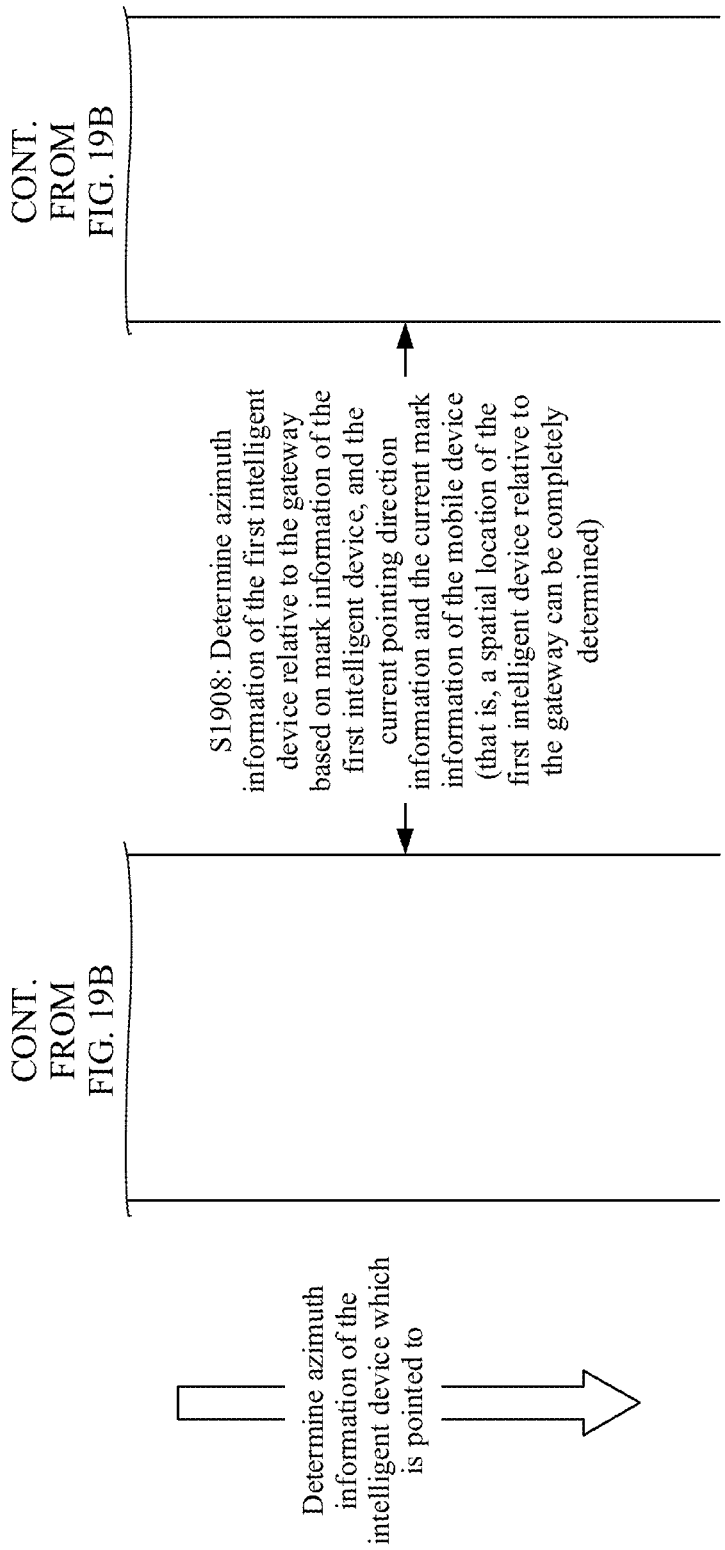

The following describes an example of a specific process of determining azimuth information of an intelligent device. As shown in FIG. 19A, FIG. 19B, and FIG. 19C, the specific process of determining the azimuth information of the intelligent device includes steps S1901 to S1908. In S1901 to S1903, current pointing azimuth information and mark information of a mobile device may be obtained. In S1904 to S1907, an intelligent device to which the mobile device points may be determined. In S1908, azimuth information of the intelligent device to which the mobile device points may be determined based on data obtained in the previous two stages.

First, a calculation model for determining azimuth information of an intelligent device (referred to as an azimuth information calculation model for short below) is described.

Figure 20:
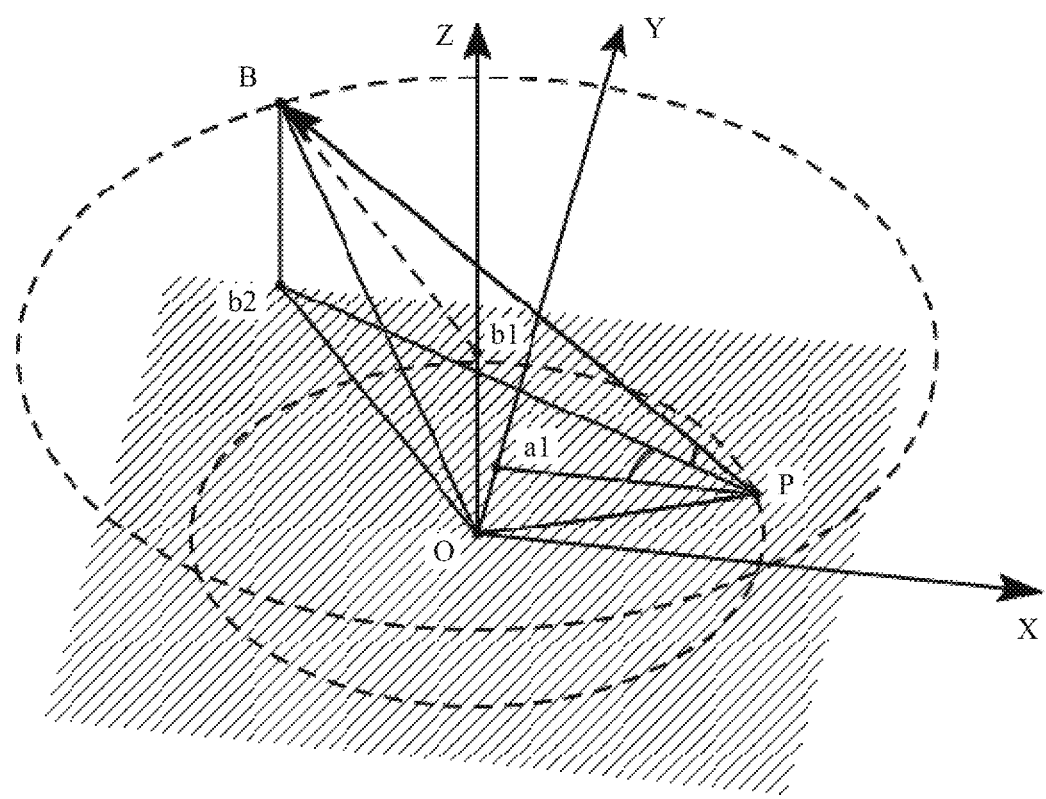
FIG. 20 is a schematic diagram of an azimuth information calculation model according to an embodiment of this application.

FIG. 20 is a schematic diagram of an azimuth information calculation model according to an embodiment of this application. For ease of understanding, this example of the calculation model is described by using an example in which a mobile device P and a gateway O are located on a same horizontal plane and azimuth information of an intelligent device B needs to be calculated.

In this case, the following information has been determined:

1. Mark information of the intelligent device B, including a straight-line distance BO from the intelligent device B to the gateway O, a perpendicular distance Bb2 from the intelligent device B to a projection point b2 on a horizontal plane of the gateway, and a horizontal distance b2O from the projection point b2 of the intelligent device B on the horizontal plane of the gateway to the gateway O.

The following information can be determined:

1. Current mark information of the mobile device P, including a straight-line distance PO from the mobile device P to the gateway O at this time, a perpendicular distance 0 from the mobile device P to the horizontal plane of the gateway O, and a horizontal distance PO from a projection point of the mobile device P on the horizontal plane of the gateway to the gateway.

The straight-line distance PO from the mobile device P to the gateway O can be determined by using the wireless ranging technology.

The perpendicular distance from the mobile device P to the horizontal plane of the gateway O can be determined based on the foregoing steps S1501 to S1503, and details are not described herein again.

The horizontal distance PO from the projection point of the mobile device P on the horizontal plane of the gateway to the gateway can be determined based on the triangular Pythagorean theorem.

2. Pointing direction information in which the mobile device P points to the intelligent device B, including an angle ∠BPb2 between a pointing direction line PB and the horizontal plane of the gateway, and an angle ∠b2Pa1 between a projection line of the pointing direction line PB on the horizontal plane of the gateway and a coordinate axis.

The information is obtained by a direction sensor in the mobile device P, and then is determined through adjustment according to whether a positive direction of a reference coordinate axis of the horizontal plane that is used to obtain the angle by the direction sensor is consistent with a positive direction of a coordinate axis of a horizontal plane in the process of constructing the overall three-dimensional location information of the intelligent network. For specific descriptions of the pointing direction information of the mobile device, refer to the pointing direction information in the foregoing terms. Details are not described herein again.

3. Straight-line distance PB from the mobile device P to the intelligent device B, and horizontal distance Pb2 from the mobile device P to the projection point b2 of the intelligent device B on the horizontal plane of the gateway.

The straight-line distance PB from the mobile device P to the intelligent device B may be determined by the mobile device P that applies a wireless ranging technology to the intelligent device B.

A horizontal distance Pb2 from the mobile device P to the projection point b2 of the intelligent device B on the horizontal plane of the gateway may be determined based on the triangular Pythagorean theorem under a condition that PB, current mark information of the mobile device P, and mark information of the intelligent device B are known.

The following information needs to be determined based on the foregoing information:
1. Azimuth information of the intelligent device B, namely, an angle between a connection line b2O between the projection point b2 of the intelligent device B on the horizontal plane of the gateway and the gateway O and a Y coordinate axis of the horizontal plane of the gateway.

Because lengths of edges b2O, PO, and Pb2 of the triangle b2OP on the horizontal plane of the gateway are determined, ∠b2PO and ∠b2OP can be determined. Because ∠b2Pa1 is determined, ∠a1PO=∠b2PO−∠b2Pa1, and ∠a1OP=90°−∠a1PO. In this case, ∠b2OY can be determined as follows: ∠b2OY=∠b2OP−∠a1OP.

Therefore, the azimuth information of the intelligent device B can be determined by using the azimuth information calculation model.

It may be understood that, if the mobile device P and the gateway O are not located on a same horizontal plane, only related data of the mobile device P needs to be converted to an intersection point of the pointing direction line PB of the mobile device and the horizontal plane of the gateway for calculation. Details are not described herein again.

It may be understood that, when both the azimuth information of the intelligent device B and the mark information of the intelligent device B are determined, a spatial location of the intelligent device B relative to the gateway O is determined.

The following describes specific steps based on the azimuth information calculation model.

(1) Obtain current pointing azimuth information and mark information of a mobile device:

S1901: In response to an operation that a user triggers a pointing control function, the mobile device enables the pointing control function.

The pointing control function is used to intelligently determine, based on a pointing direction of the mobile device held by the user, an intelligent device that is pointed to as a control target.

An operation manner for triggering the pointing control function may be preset in the mobile device, for example, different screen touch actions, buttons or button combinations, and voice.

For example, shake may be preset in the mobile device as an operation manner of triggering the pointing control function. If the mobile device detects an action of shaking the mobile device by the user, the pointing control function is enabled.

S1902: In response to an operation that the user determines to point to a first intelligent device, the mobile device obtains current pointing direction information.

An operation of determining a pointed target intelligent device is used to determine that a target that the user wants to control is an intelligent device in a current pointing direction. In this case, the user points to the first intelligent device, and the first intelligent device is one of intelligent devices that access the gateway.

In a process in which a pointing direction of the mobile device moves, the pointing direction of the mobile device may pass through many devices. Therefore, an operation manner, for example, different gesture actions and pause times, of determining a pointed target intelligent device may be built in the mobile device.

For example, in the mobile device, an operation manner of determining the pointed target intelligent device may be preset to pause in a pointing direction for one second. After the pointing control function is enabled, the user holds the mobile device to point to an intelligent device and pauses in the pointing direction for one second. If the mobile device detects the operation, current pointing direction information of the mobile device is obtained.

For specific descriptions of the pointing direction information, refer to the descriptions of the pointing direction information in the foregoing terms. Details are not described herein again.

S1903: The mobile device and/or the gateway determines current mark information of the mobile device.

The mobile device and/or the gateway may determine the current mark information of the mobile device in real time according to the foregoing steps S1501 to S1503, and details are not described herein again.

(2) Determine an Intelligent Device to which the Mobile Device Points:

S1904: The mobile device and/or the gateway determines an intelligent device which may be pointed to.

In this case, because construction of the intelligent network including the three-dimensional location information is not completed, and specific spatial locations of intelligent devices are not completely determined, the mobile device and/or the gateway may determine that all networked intelligent devices are intelligent devices which may be pointed to in this case.

Optionally, in some other embodiments of this application, the mobile device and/or the gateway may determine a current use scenario of the mobile device based on a location of the mobile device, to determine an intelligent device to which the mobile device may point.

For example, if the mobile device and/or the gateway may determine that the mobile device is in a bedroom, it may be determined that an intelligent device to which the mobile device may point is a curtain, an air conditioner, a desk lamp, or the like. Alternatively, if the mobile device and/or the gateway may determine that the mobile device is in a living room, it may be determined that an intelligent device to which the mobile device may point is a television, a ceiling lamp, or the like.

S1905: The mobile device determines whether a quantity of intelligent devices which may be pointed to is 1.

If step S1904 is performed by the mobile device, the mobile device may directly perform step S1905 based on a result determined in step S1904.

If step S1904 is performed by the gateway, after determining the intelligent device to which the mobile device may point, the gateway may send, to the mobile device, an identifier of the intelligent device to which the mobile device may point. In this case, the mobile device can determine, in step S1905 based on the received identifier of the intelligent device to which the mobile device may point, whether a quantity of intelligent devices which may be pointed to is 1.

If the quantity is not 1, it indicates that there are a plurality of intelligent devices which may be pointed to, and a target intelligent device that the user wants to control cannot be completely determined. In this case, step S1906 needs to be performed to display the intelligent devices which may be pointed to for the user to select and determine.

If the quantity is 1, it indicates that a target intelligent device that the user wants to control can be determined, and step S1907 may be performed to directly determine the intelligent device as the control target.

S1906: The mobile device displays intelligent devices which may be pointed to.

When the mobile device determines that the quantity of intelligent devices which may be pointed to is not 1, the mobile device displays the intelligent devices to which the mobile device may point, for the user to select.

S1907: The mobile device determines the first intelligent device as a control target.

When the mobile device determines, in step S1905, that the quantity of intelligent devices which may be pointed to is 1, or when the mobile device displays the intelligent devices to which the mobile device may point in step S1906, and then detects an operation that the user taps the first intelligent device, the mobile device determines, as the control target, the first intelligent device that the mobile device held by the user points to.

(3) Determine Azimuth Information of the Intelligent Device to which the Mobile Device Points:

S1908: The mobile device and/or the gateway determines the azimuth information of the first intelligent device relative to the gateway based on mark information of the first intelligent device, and the current pointing direction information and current mark information of the mobile device.

The azimuth information of the first intelligent device relative to the gateway may be determined based on the mark information of the first intelligent device, the current pointing direction information and current mark information of the mobile device, and the azimuth information calculation model.

For specific descriptions of the azimuth information, refer to the descriptions of the azimuth information in the foregoing terms. Details are not described herein again.

It may be understood that, because the mark information of the first intelligent device is determined, after the azimuth information is determined, the spatial location of the first intelligent device relative to the gateway may be completely determined, and reflected in a three-dimensional coordinate system, that is, values of coordinate points of the first intelligent device in the coordinate system have been determined.

Steps S1901 to S1908 are repeatedly performed to determine another intelligent device as the control target, so that azimuth information of at least two intelligent devices relative to the gateway can be determined. In the next step, azimuth information of all intelligent devices accessing the gateway needs to be determined.

S1403: Determine azimuth information of each of other intelligent devices relative to the gateway based on the azimuth information of the at least two intelligent devices relative to the gateway and mark information of the at least two intelligent devices and based on distances to the gateway and each intelligent device that are measured by the mobile device on at least two movement location points.

The following describes an example of a specific process of determining the azimuth information of each of the other intelligent devices relative to the gateway.

Figure 21:
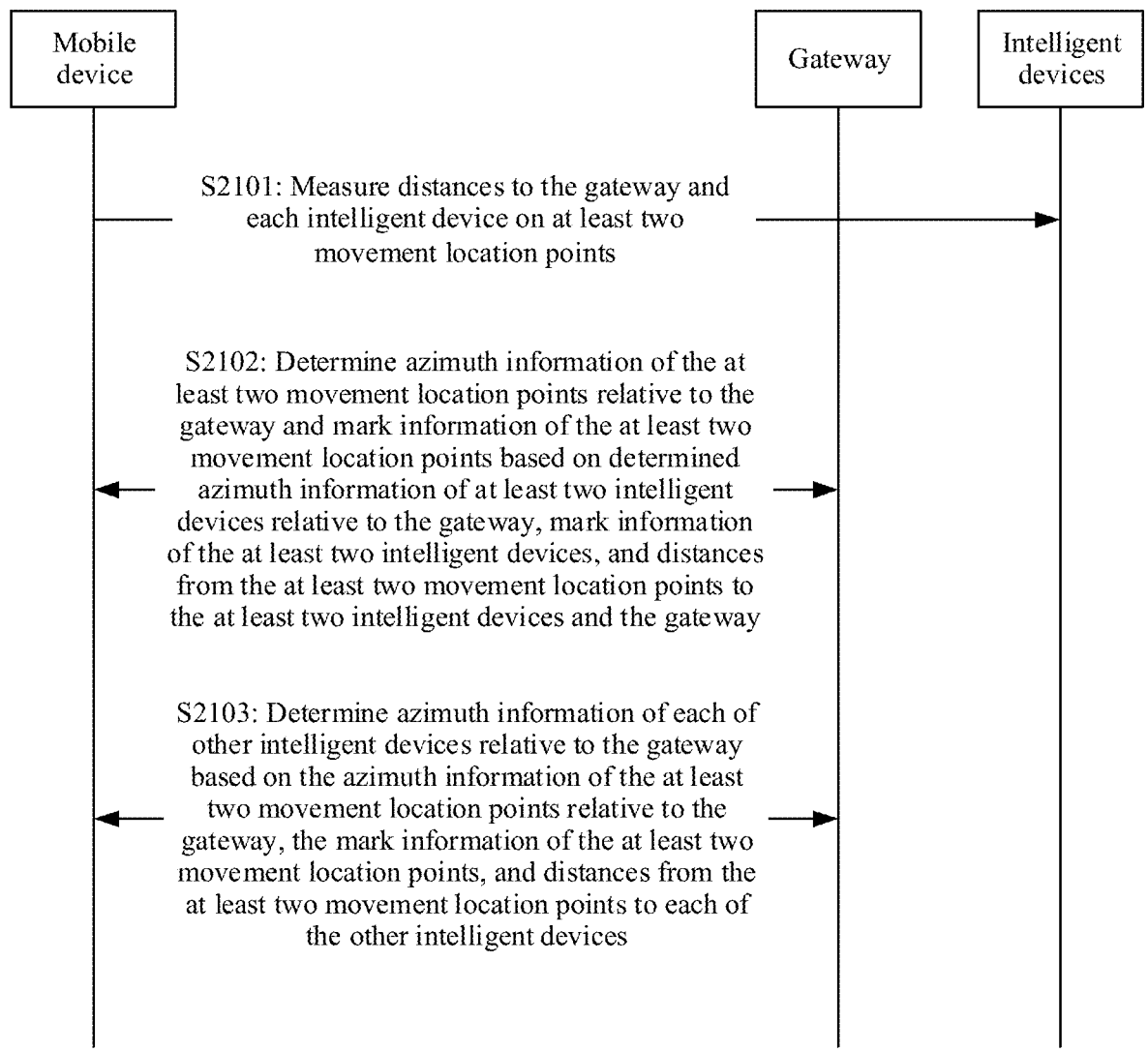
FIG. 21 is an example schematic flowchart of determining azimuth information of each of other intelligent devices relative to a gateway according to an embodiment of this application.

As shown in FIG. 21, a specific process of determining the azimuth information of each of the other intelligent devices relative to the gateway includes steps S2101 to S2103. In S2101, the distance between the mobile device and each intelligent device that is measured on the at least two movement location points may be determined. In S2102, mark information and azimuth information of the at least two movement location points may be determined. In S2103, the azimuth information of each of the other intelligent devices may be determined.

S2101: The mobile device measures distances to the gateway and each intelligent device on the at least two movement location points.

On the at least two movement location points, the mobile device may measure the distances from the mobile device to the gateway and each intelligent device by using a wireless ranging technology.

It may be understood that, if there are a plurality of mobile devices, each mobile device may measure distances to the gateway and each intelligent device on a movement location point that the mobile device has moved, and then share the distance information for use.

S2102: The mobile device and/or the gateway determines the azimuth information of the at least two movement location points relative to the gateway and the mark information of the at least two movement location points based on the determined azimuth information of the at least two intelligent devices relative to the gateway, the mark information of the at least two intelligent devices, the distances from the at least two movement location points to the at least two intelligent devices and the gateway.

In step S1401, the mark information of each intelligent device has been determined. In step S1402, the azimuth information of the at least two intelligent devices has been determined. In step S2101, the distances from the at least two movement location points to each intelligent device and the gateway have been determined, that is, spatial locations of three points (the at least two intelligent devices and the gateway) in three-dimensional space and distances from the three points to a movement location point are known. The three points are used as centers of spheres, the distances from the three points to the movement location point are used as the radius f the spheres, and an intersection point of the three spheres is a spatial location of the movement location point, that is, azimuth information of the movement location point relative to the gateway and mark information of the movement location point are determined.

Figure 22:
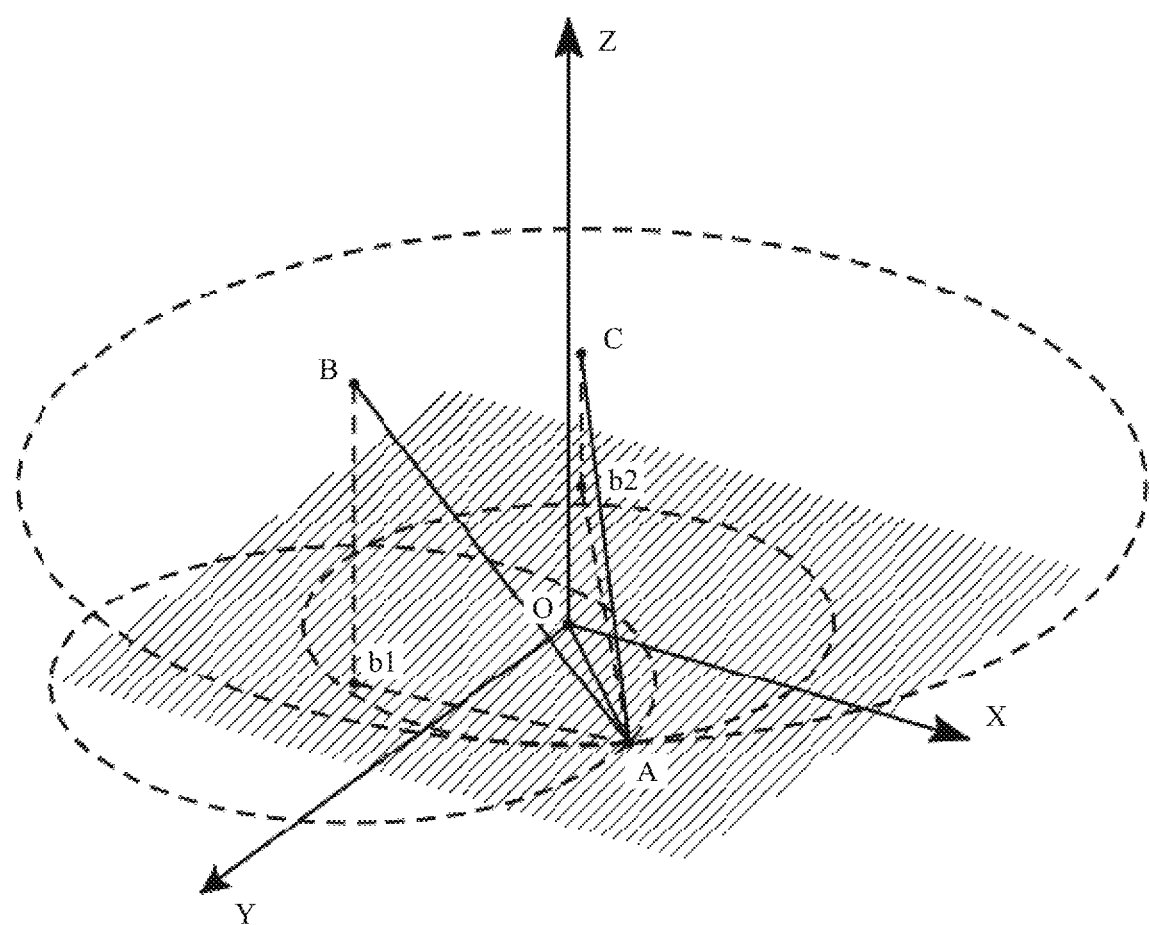
FIG. 22 is an example schematic diagram of determining azimuth information and mark information of a movement location point according to an embodiment of this application.

FIG. 22 is an example schematic diagram of determining azimuth information and mark information of a movement location point. For ease of understanding, an example in which a movement location point A and a gateway O are located on a same horizontal plane is used. Mark information and azimuth information of an intelligent device B and an intelligent device C are known, that is, spatial locations of the intelligent device B and the intelligent device C in three-dimensional space relative to the gateway O that is used as an origin are determined. A distance AB from a movement location point A to the intelligent device B, a distance AC from the movement location point A to the intelligent device C, and a distance AO from the movement location point A to the gateway O are also known. In this case, locations of the gateway O, a projection point b1 of the intelligent device B, and a projection point b2 of the intelligent device C are determined on a horizontal plane of the gateway, and Ab1, AO, and Ab2 are also determined. Therefore, azimuth information and mark information of the movement location point A may be determined by an intersection point of a circle with O as the center and AO as the radius, a circle with b1 as the center and Ab1 as the radius, and a circle with b2 as the center and Ab2 as the radius.

S2103: The mobile device and/or the gateway determines azimuth information of each of other intelligent devices relative to the gateway based on the azimuth information of the at least two movement location points relative to the gateway, the mark information of the at least two movement location points, and distances from the at least two movement location points to each of the other intelligent devices.

Each of the other intelligent devices is used to represent an intelligent device that is connected to the gateway but whose azimuth information is not determined currently.

In step S2101, the distances from the at least two movement location points to each intelligent device and the gateway are determined. In step S2102, the spatial locations of the at least two movement location points are determined. Therefore, in the three-dimensional space, the gateway is used as a reference point, spatial locations of the gateway and the at least two movement location points are determined, and distances from each intelligent device to the three points are known. The three points are used as centers of spheres, the distances are used as the radius of the spheres, and an intersection point is a spatial location of each intelligent device, that is, the azimuth information of each of the other intelligent devices relative to the gateway is determined.

Figure 23:
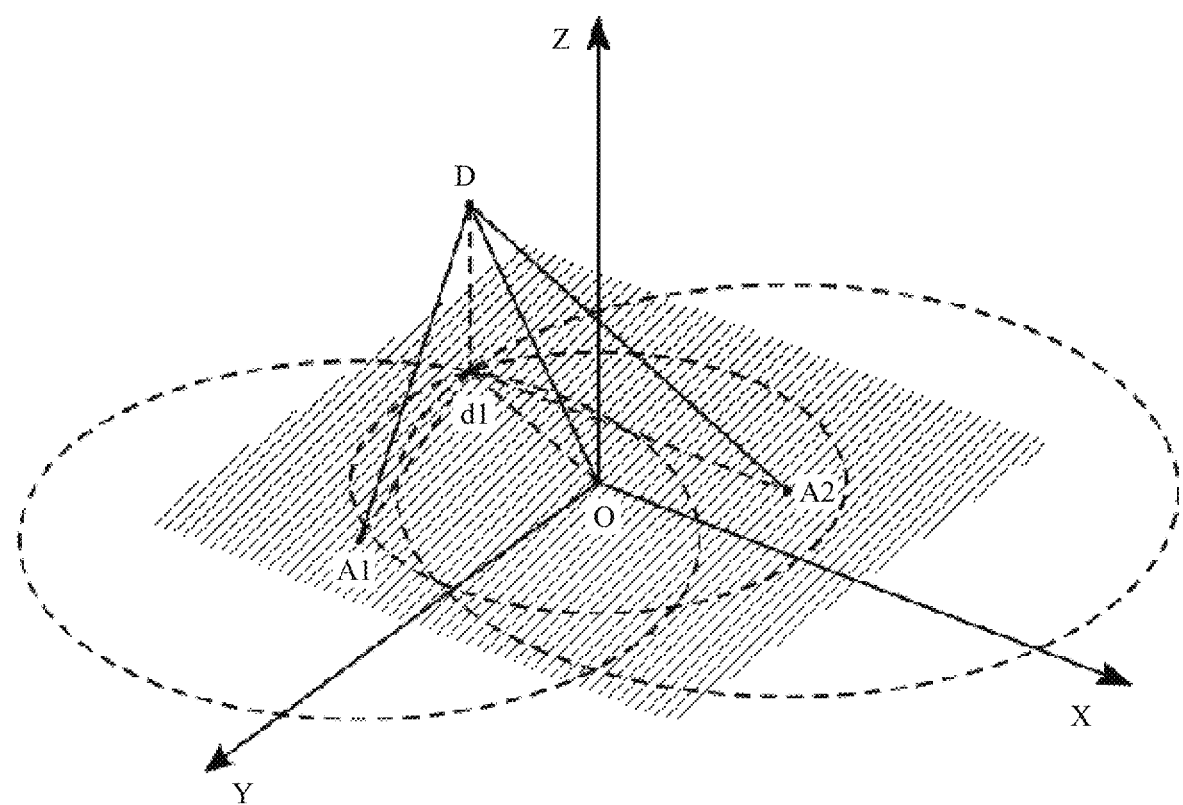
FIG. 23 is an example schematic diagram of determining azimuth information of another intelligent device according to an embodiment of this application.

FIG. 23 is an example schematic diagram of determining azimuth information of another intelligent device. For ease of understanding, an example in which movement location points A1 and A2 and a gateway O are located on a same horizontal plane is used. Mark information of an intelligent device D is known, that is, Dd1, DO, and Od1 are all determined. In addition, A1D and A2D are also determined. Therefore, A1$d$1 and A2$d$2 are also determined. Therefore, azimuth information of the intelligent device D may be determined by using an intersection point of a circle with O as the center and Od1 as the radius, a circle with A1 as the center and A1$d$1 as the radius, and a circle with A2 as the center and A2$d$2 as the radius.

After the azimuth information of each of the other intelligent devices relative to the gateway is determined, that is, construction of an intelligent network including three-dimensional location information is completed, spatial locations of all intelligent devices accessing the gateway relative to the gateway are determined. Based on this, pointing positioning may be performed to intelligently determine a control target.

S1404: The mobile device and/or the gateway determines an intelligent device in a current pointing direction of the mobile device as the control target based on current pointing direction information, current mark information, and current azimuth information of the mobile device.

The spatial locations of all intelligent devices accessing the gateway relative to the gateway are determined. Therefore, when the user holds the mobile device to point to a direction, the mobile device and/or the gateway may determine, according to the pointing direction, an intelligent device in the direction as the control target.

The following describes an example of a specific process of determining a control target based on a pointing direction.

Figure 24B:
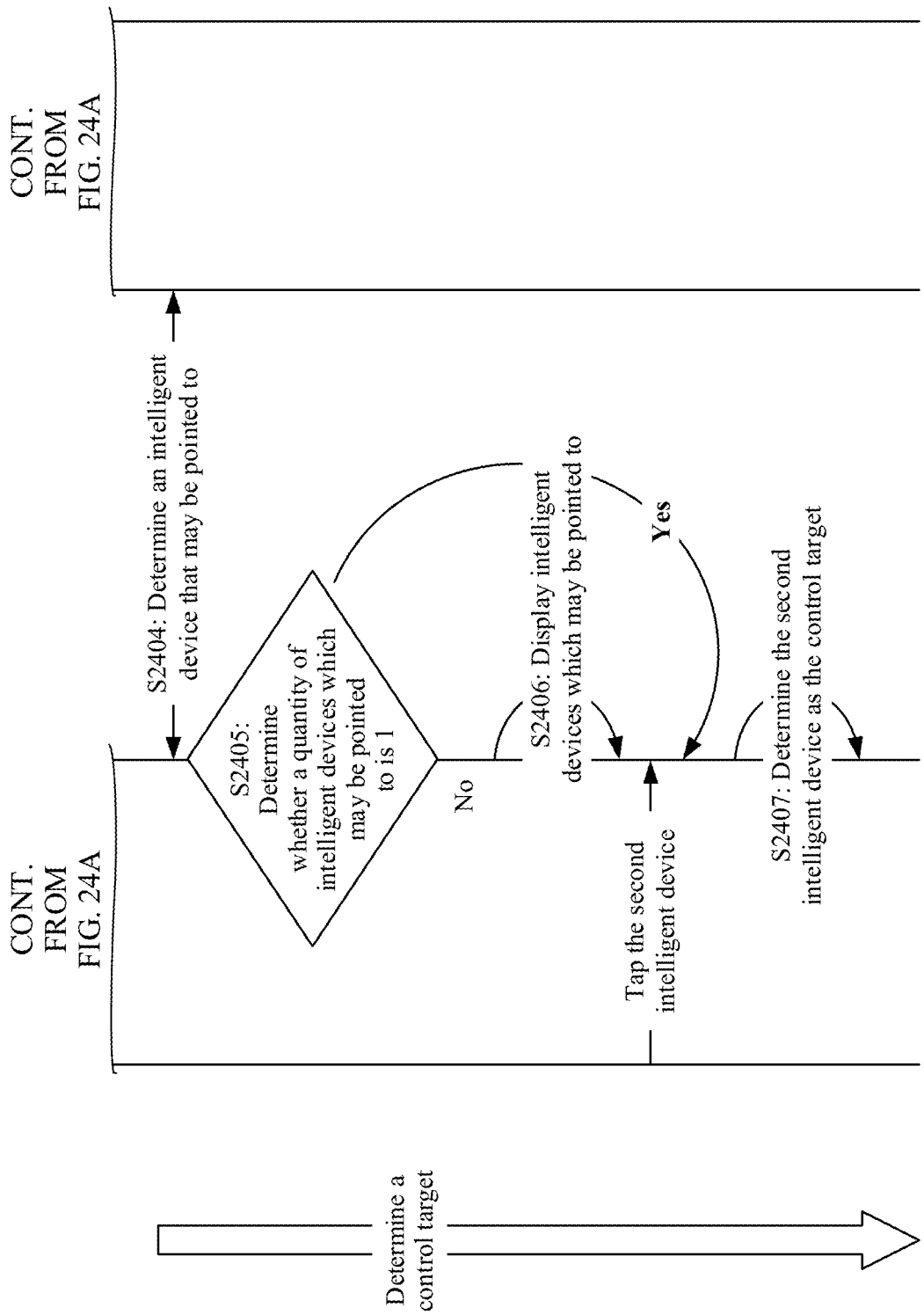

As shown in FIG. 24A and FIG. 24B, the specific process of determining the control target based on the pointing direction includes steps S2401 to S2407. S2401 to S2403 determine current pointing azimuth information, mark information, and azimuth information of the mobile device. S2404 to S2407 determine the control target.

First, a calculation model for determining a pointed target (referred to as a pointed target calculation model for short below) is described.

Figure 25:
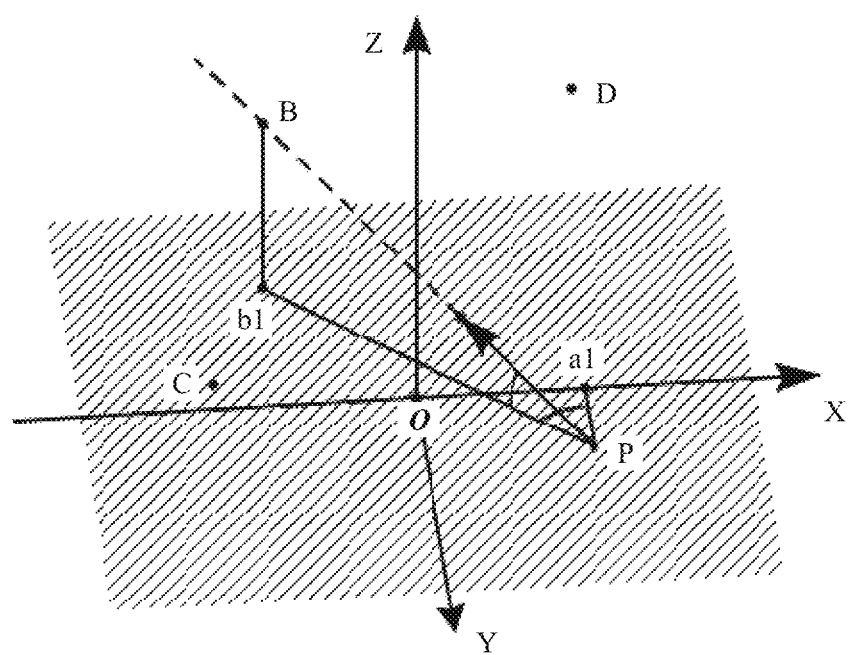
FIG. 25 is a schematic diagram of a pointed target calculation model according to an embodiment of this application.

FIG. 25 is a schematic diagram of a pointed target calculation model according to an embodiment of this application. For ease of understanding, this example of the calculation model is described by using an example in which a mobile device P and a gateway O are located on a same horizontal plane, and the mobile device P points to an intelligent device B.

The following information has been determined:
1. Mark information and azimuth information of intelligent devices B, C, and D.

The following information can be determined:
1. Current pointing direction information of the mobile device P.

The current pointing direction information may be obtained by using a direction sensor in the mobile device. For details, refer to the descriptions of the pointing direction information in the foregoing terms. Details are not described herein again.

2. Current mark information and current azimuth information of the mobile device P.

The mobile device P may determine distances to at least two intelligent devices and the gateway by using a wireless ranging technology, and then determine the current mark information and the current azimuth information of the mobile device P based on a method similar to the method for determining the mark information and the azimuth information of the movement location point in S2102. Details are not described herein again.

The following information needs to be determined based on the foregoing information:
1. Intelligent device through which a pointing direction line of the mobile device P passes.

The mark information and azimuth information of the intelligent devices B, C, and D are determined, and are represented by data in a three-dimensional rectangular coordinate axis using the gateway O as an origin, that is, coordinate values of the three coordinate points B, C, and D are determined, and coordinate values of the mobile device P are also determined. The current pointing direction information of the mobile device P is determined, that is, the angle ∠BPb1 between the pointing direction line of the mobile device P and the horizontal plane of the gateway, and the angle ∠a1Pb1 between a projection line b1P of the pointing direction line on the horizontal plane of the gateway and the coordinate axis are determined. Therefore, an equation of the current pointing direction line of the mobile device P may be constructed. Then, the coordinate point of each intelligent device is added to the equation of the pointing direction line for calculation, to determine which intelligent device is on the pointing direction line. As shown in FIG. 25, it may be determined that the intelligent device B is on the pointing direction line.

Therefore, the intelligent device in the pointing direction of the mobile device may be determined by using the foregoing pointed target calculation model.

The following describes specific steps based on the pointed target calculation model.

(1) Determine current pointing direction information, current mark information, and current azimuth information of the mobile device:

S2401: In response to an operation that a user triggers a pointing control function, the mobile device enables the pointing control function.

This step is similar to step S1901, and details are not described herein.

S2402: In response to an operation that the user determines to point to a second intelligent device, the mobile device obtains the current pointing direction information.

This step is similar to step S1902, and details are not described herein.

S2403: The mobile device and/or the gateway determines the current mark information and the current azimuth information of the mobile device.

Because the mark information and the azimuth information of all intelligent devices are determined, the mobile device may determine distances to at least two intelligent devices and the gateway on the location by using a wireless ranging technology, and then determine the current mark information and the current azimuth information of the mobile device by using the method for determining the mark information and the azimuth information of the movement location point in step S2102. Details are not described herein again.

(2) Determine a control target:

S2404: The mobile device and/or the gateway determines an intelligent device which may be pointed to.

In this case, construction of the three-dimensional location information has been completed. When the current pointing direction information, the current mark information, and the current azimuth information of the mobile device are determined, the mobile device and/or the gateway may determine, by using the foregoing pointed target calculation model, an intelligent device which may be pointed to.

Optionally, in some other embodiments of this application, when determining an intelligent device which may be pointed to, in addition to determining the intelligent device based on the pointed target calculation model, the mobile device and/or the gateway may further determine a current use scenario of the mobile device based on a location of the mobile device, and further filter and confirm a result determined based on the pointed target calculation model, to finally determine the intelligent device to which the mobile device may point.

For example, if the mobile device and/or the gateway determines, by using the pointed target calculation model, that intelligent devices which may be pointed to are a television and a desk lamp, and determines that the mobile device is currently located in a living room, there is no desk lamp in the living room, and the desk lamp is in a bedroom, so that it may be finally determined that the intelligent device to which the mobile device may point is the television.

S2405: The mobile device determines whether a quantity of intelligent devices which may be pointed to is 1.

This step is similar to step S1905, and details are not described herein.

S2406: The mobile device displays intelligent devices which may be pointed to.

When the mobile device determines that the quantity of intelligent devices which may be pointed to is not 1, the mobile device displays the intelligent devices to which the mobile device may point, for the user to select.

S2407: The mobile device determines the second intelligent device as the control target.

When the mobile device determines, in step S2405, that the quantity of intelligent devices which may be pointed to is 1, or when the mobile device displays the intelligent devices to which the mobile device may point in step S1906, and then detects an operation that the user taps the second intelligent device, the mobile device determines, as the control target, the second intelligent device that the mobile device held by the user points to.

It may be understood that, if the mobile device determines, in S2405, that the quantity of intelligent devices which may be pointed to is not 1, construction of the three-dimensional location information may be inaccurate. After step S2407 is performed, the process of constructing the three-dimensional location information in the intelligent network in steps S1401 to S1403 may be repeatedly performed, so that the three-dimensional location information can be optimized and more accurate.

In the foregoing embodiments, the mobile terminal, the gateway, and the intelligent devices collaborate to independently construct the intelligent network including the three-dimensional location information. After network construction is completed, the control target can be intelligently determined based on the pointing direction of the mobile device held by the user. This greatly simplifies the process of determining the control target and improves usability of human-machine interaction.

Embodiment 2

In some embodiments of this application, after a mobile device determines a control target, the mobile device may control the control target in a plurality of different triggering manners:

(1) Display a control interface for the control target, and trigger a corresponding operation instruction based on a touch control operation of a user.

After determining the operation control target, the mobile device may directly display the control interface for the control target. The user may select an item on the control interface to perform a touch control operation such as a tap operation or an adjustment operation. Based on the operation, a corresponding control instruction may be triggered.

For example, after the user holds the mobile device and points to an air conditioner, the mobile device determines the air conditioner as the control target, and displays a control interface for the air conditioner. If the user taps on, a power-on indication of the air conditioner is triggered. The mobile device sends the power-on indication to the air conditioner by using the gateway or by using an infrared transmitter of the mobile device. After receiving the power-on indication, the air conditioner performs a power-on operation.

(2) Monitor a user action, and trigger a corresponding control instruction based on the user action.

After determining the control target, the mobile device may monitor the user action. Based on the user action and according to a preset correspondence between an action and a control instruction, the mobile device triggers a corresponding control instruction.

For example, if that an action of shaking after the air conditioner is determined as the control target corresponds to the power-on indication is preset in the mobile device, after the user holds the mobile device and points to the air conditioner, the mobile device determines the air conditioner as the control target. The mobile device monitors the user action, and if it is detected that the user shakes the mobile device, the mobile device triggers the power-on indication of the air conditioner. The mobile device sends the power-on indication to the air conditioner by using the gateway or by using an infrared transmitter of the mobile device. After receiving the power-on indication, the air conditioner performs a power-on operation.

It may be understood that, after the mobile device determines the control target, there may be other triggering manners to control the control target. These triggering manners may be used separately, or may be used in combination with each other, which is not limited herein.

In some embodiments of this application, after triggering a corresponding control instruction, the mobile device may send the control instruction to the control target by using the gateway.

In some embodiments of this application, after triggering a corresponding control instruction, the mobile device may send the control instruction to the control target alternatively by using the infrared transmitter of the mobile device.

In the foregoing embodiments, some steps are performed by the mobile device and/or the gateway device, that is, the steps may be performed by the mobile device, or may be performed by the gateway device, or may be performed by the mobile device and the gateway in collaboration.

Preferably, in some embodiments of this application, the mobile device may be used as a master computing center, and the gateway and the intelligent device provide only a necessary data collection function.

Embodiment 3

Figure 26:
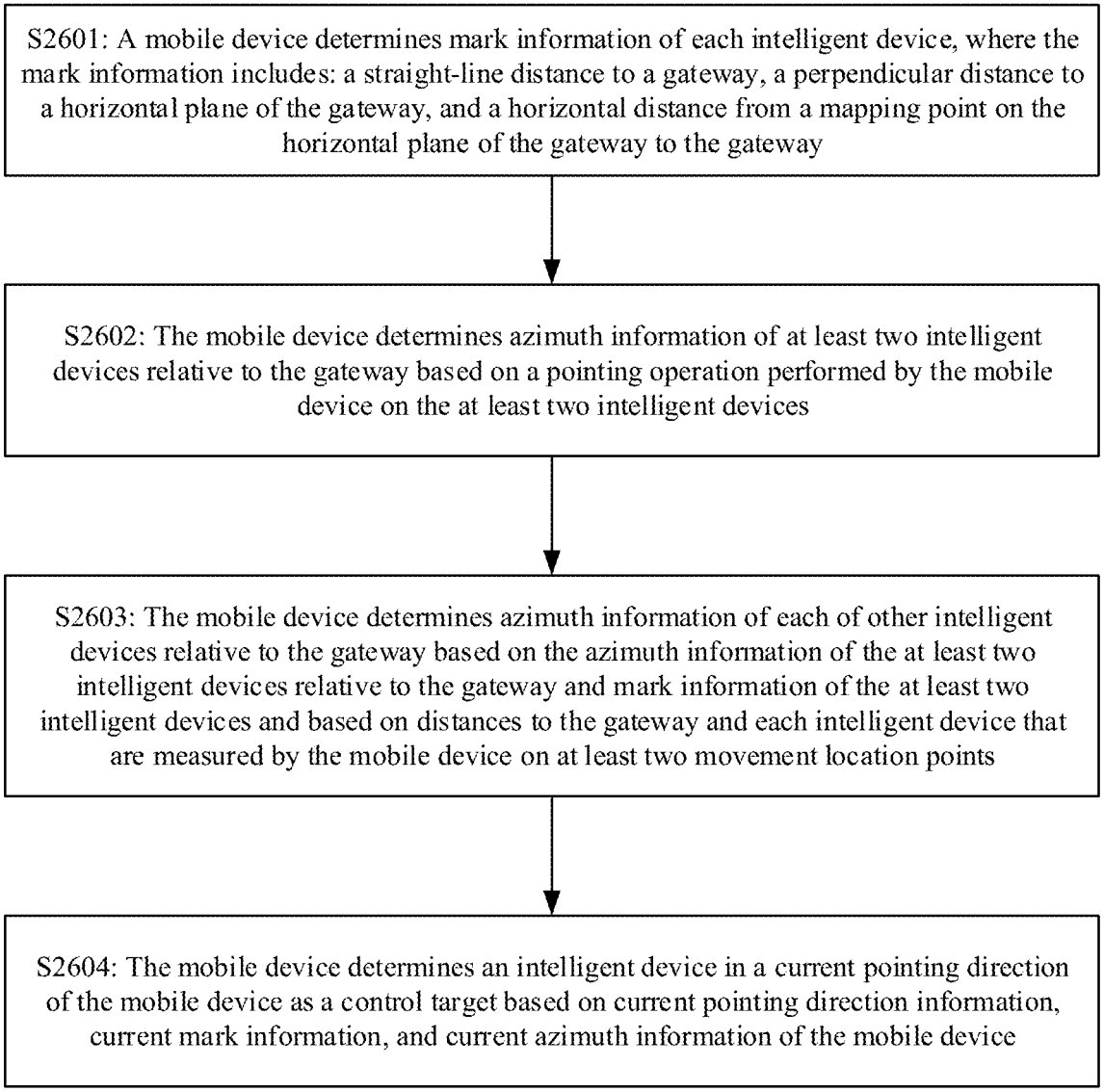
FIG. 26 is another schematic flowchart of a method for determining a control target according to an embodiment of this application.

As shown in FIG. 26, the following specifically describes a method for determining a control target in an embodiment of this application when a mobile device is used as a master computing center and three-dimensional location information is stored in the mobile device.

S2601: The mobile device determines mark information of each intelligent device.

This step is similar to step S1401, and details are not described herein again.

Figure 27A:
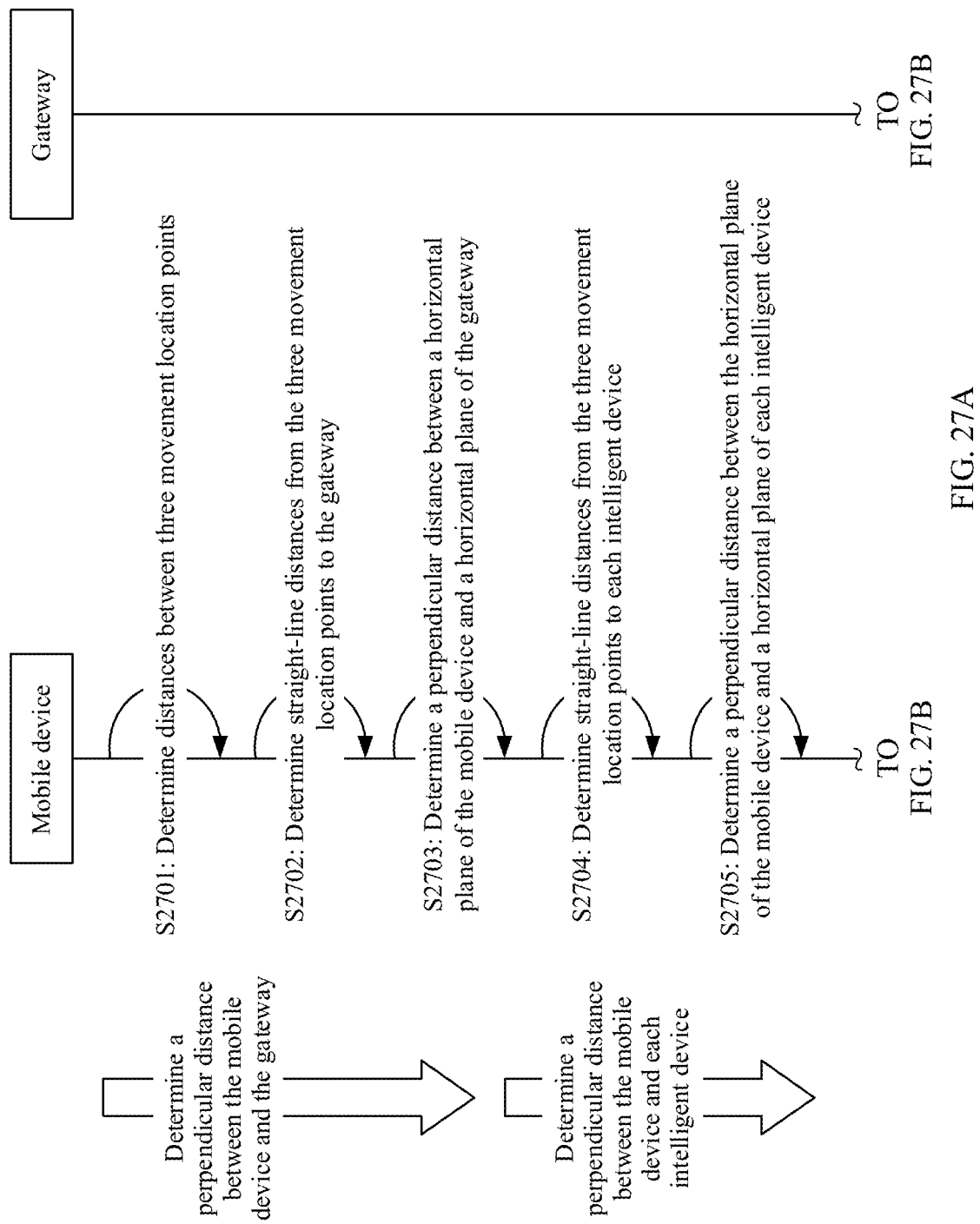
FIG. 27A and FIG. 27B are another example schematic flowchart of determining mark information of each intelligent device according to an embodiment of this application.
Figure 27B:
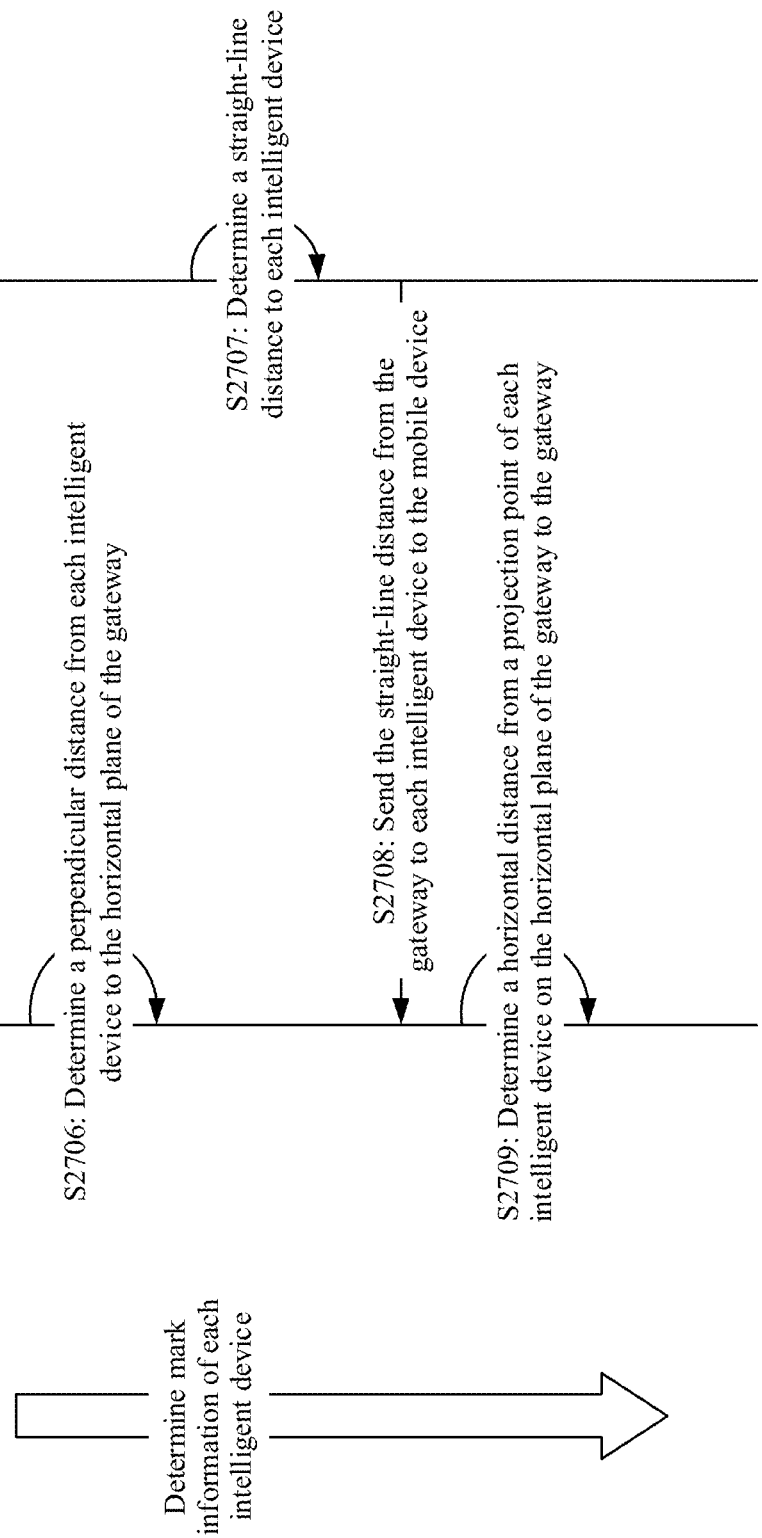

For details of this process, refer to example descriptions shown in FIG. 27A and FIG. 27B.

S2701: The mobile device determines distances between three movement location points.

S2702: The mobile device determines straight-line distances from the three movement location points to a gateway.

S2703: The mobile device determines a perpendicular distance between a horizontal plane of the mobile device and a horizontal plane of the gateway.

S2704: The mobile device determines straight-line distances from the three movement location points to each intelligent device.

S2705: The mobile device determines a perpendicular distance between the horizontal plane of the mobile device and a horizontal plane of each intelligent device.

S2706: The mobile device determines a perpendicular distance from each intelligent device to the horizontal plane of the gateway.

S2707: The gateway determines a straight-line distance to each intelligent device.

S2708: The gateway sends the straight-line distance from the gateway to each intelligent device to the mobile device.

S2709: The mobile device determines a horizontal distance from a projection point of each intelligent device on the horizontal plane of the gateway to the gateway.

For specific descriptions of steps S2701 to S2709, refer to steps S1501 to S1508, and details are not described herein again.

S2602: The mobile device determines azimuth information of at least two intelligent devices relative to the gateway based on a pointing operation performed by the mobile device on the at least two intelligent devices.

This step is similar to step S1402, and details are not described herein again.

For details of this process, refer to example descriptions shown in FIG. 28A, FIG. 28B, and FIG. 28C.

S2801: In response to an operation that a user triggers a pointing control function, the mobile device enables the pointing control function.

S2802: In response to an operation that the user determines to point to a first intelligent device, the mobile device obtains current pointing direction information.

S2803: The mobile device determines current mark information of the mobile device.

S2804: The mobile device determines an intelligent device which may be pointed to.

S2805: The mobile device determines whether a quantity of intelligent devices which may be pointed to is 1.

S2806: The mobile device displays intelligent devices which may be pointed to.

S2807: The mobile device determines a first intelligent device as a control target.

S2808: The mobile device determines azimuth information of the first intelligent device relative to the gateway based on mark information of the first intelligent device, and the current pointing direction information and current mark information of the mobile device.

For specific descriptions of steps S2801 to S2808, refer to steps S1901 to S1908, and details are not described herein again.

S2603: The mobile device determines azimuth information of each of other intelligent devices relative to the gateway based on the azimuth information of the at least two intelligent devices relative to the gateway and mark information of the at least two intelligent devices and based on distances to the gateway and each intelligent device that are measured by the mobile device on at least two movement location points.

Figure 29:
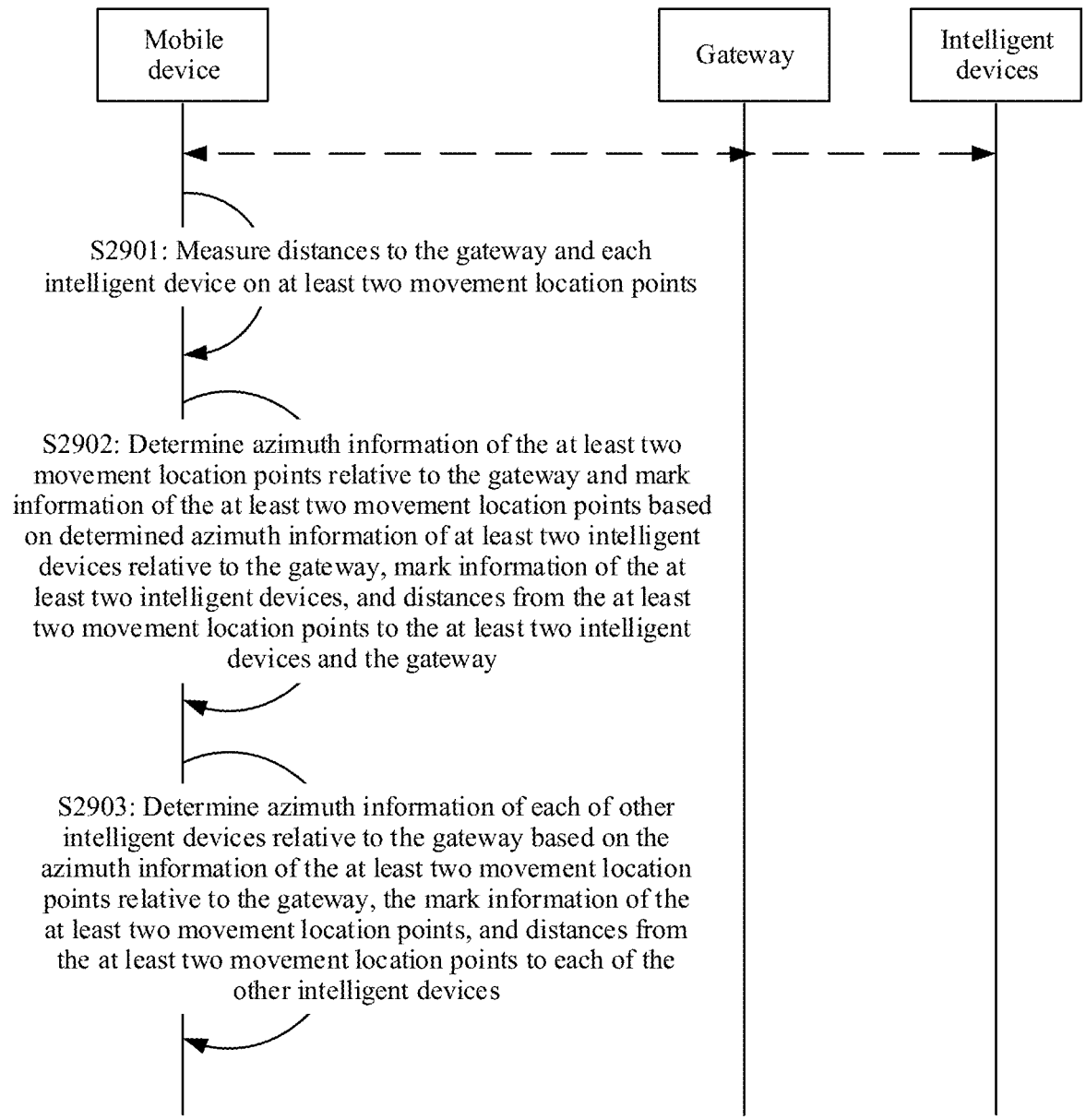
FIG. 29 is another example schematic flowchart of determining azimuth information of each of other intelligent devices relative to a gateway according to an embodiment of this application.

For details of this process, refer to example descriptions shown in FIG. 29.

S2901: The mobile device measures distances to the gateway and each intelligent device on the at least two movement location points.

S2902: The mobile device determines azimuth information of the at least two movement location points relative to the gateway and mark information of the at least two movement location points based on determined azimuth information of at least two intelligent devices relative to the gateway, mark information of the at least two intelligent devices, and distances from the at least two movement location points to the at least two intelligent devices and the gateway.

S2903: The mobile device determines azimuth information of each of other intelligent devices relative to the gateway based on the azimuth information of the at least two movement location points relative to the gateway, the mark information of the at least two movement location points, and distances from the at least two movement location points to each of the other intelligent devices.

For specific descriptions of steps S2901 to S2903, refer to steps S2101 to S2103, and details are not described herein again.

S2604: The mobile device determines an intelligent device in a current pointing direction of the mobile device as a control target based on current pointing direction information, current mark information, and current azimuth information of the mobile device.

Figure 30B:
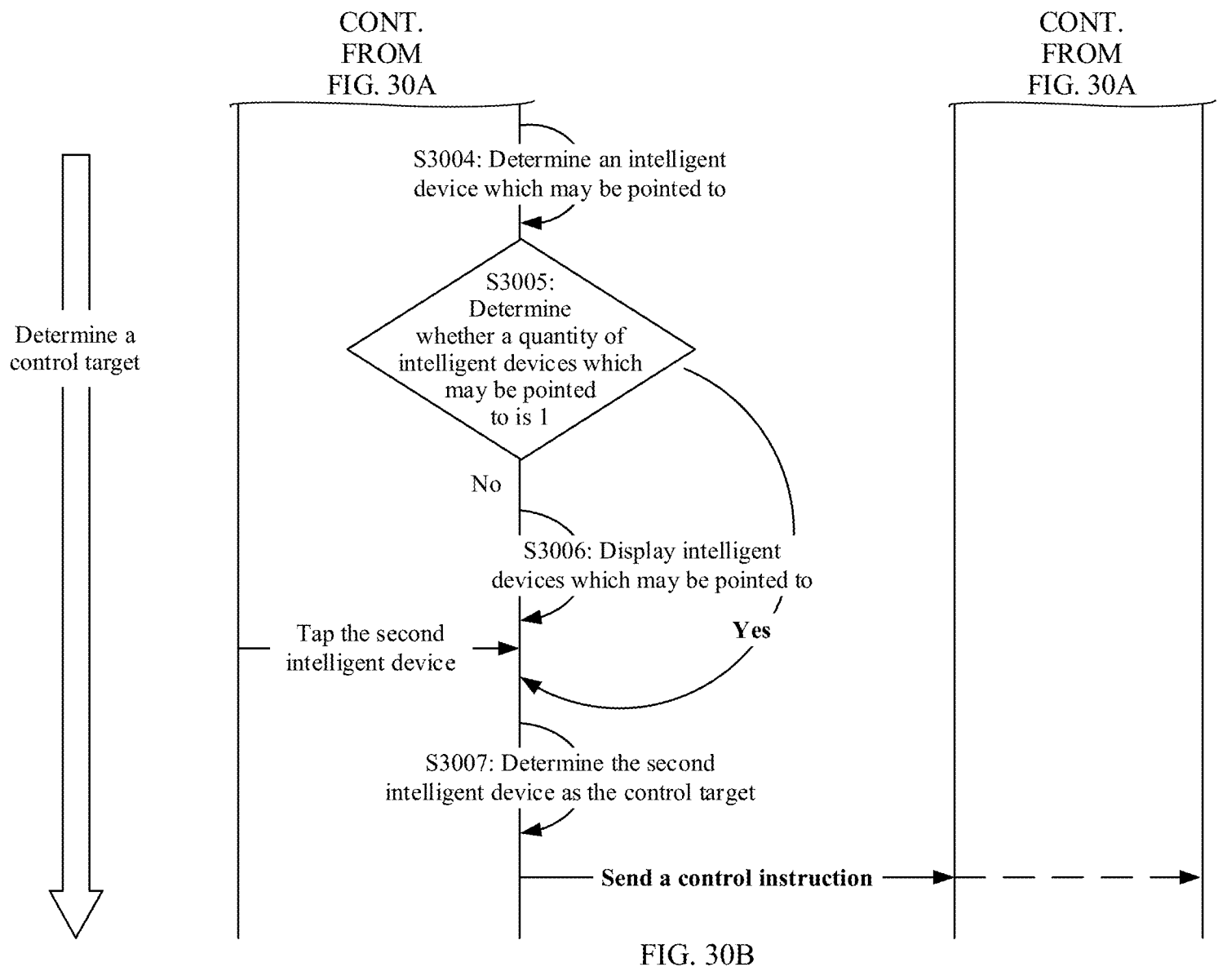

For details of this process, refer to example descriptions shown in FIG. 30A and FIG. 30B.

S3001: In response to an operation that a user triggers a pointing control function, the mobile device enables the pointing control function.

S3002: In response to an operation that the user determines to point to a second intelligent device, the mobile device obtains the current pointing direction information.

S3003: The mobile device determines current mark information and current azimuth information of the mobile device.

S3004: The mobile device determines an intelligent device which may be pointed to.

S3005: The mobile device determines whether a quantity of intelligent devices which may be pointed to is 1.

S3006: The mobile device displays intelligent devices which may be pointed to.

S3007: The mobile device determines a second intelligent device as the control target.

For specific descriptions of steps S3001 to S3007, refer to steps S2401 to S2407, and details are not described herein again.

In this embodiment of this application, the mobile device is used as the master computing center, and the three-dimensional location information is stored in the mobile device. Because the mobile device has a relatively strong computing capability, the three-dimensional location information can be determined more quickly, and a response to a user operation can be made more quickly.

Preferably, in some embodiments of this application, the gateway may be used as a master computing center, and the mobile device and the intelligent device provide only a necessary data collection function.

Embodiment 4

Figure 31:
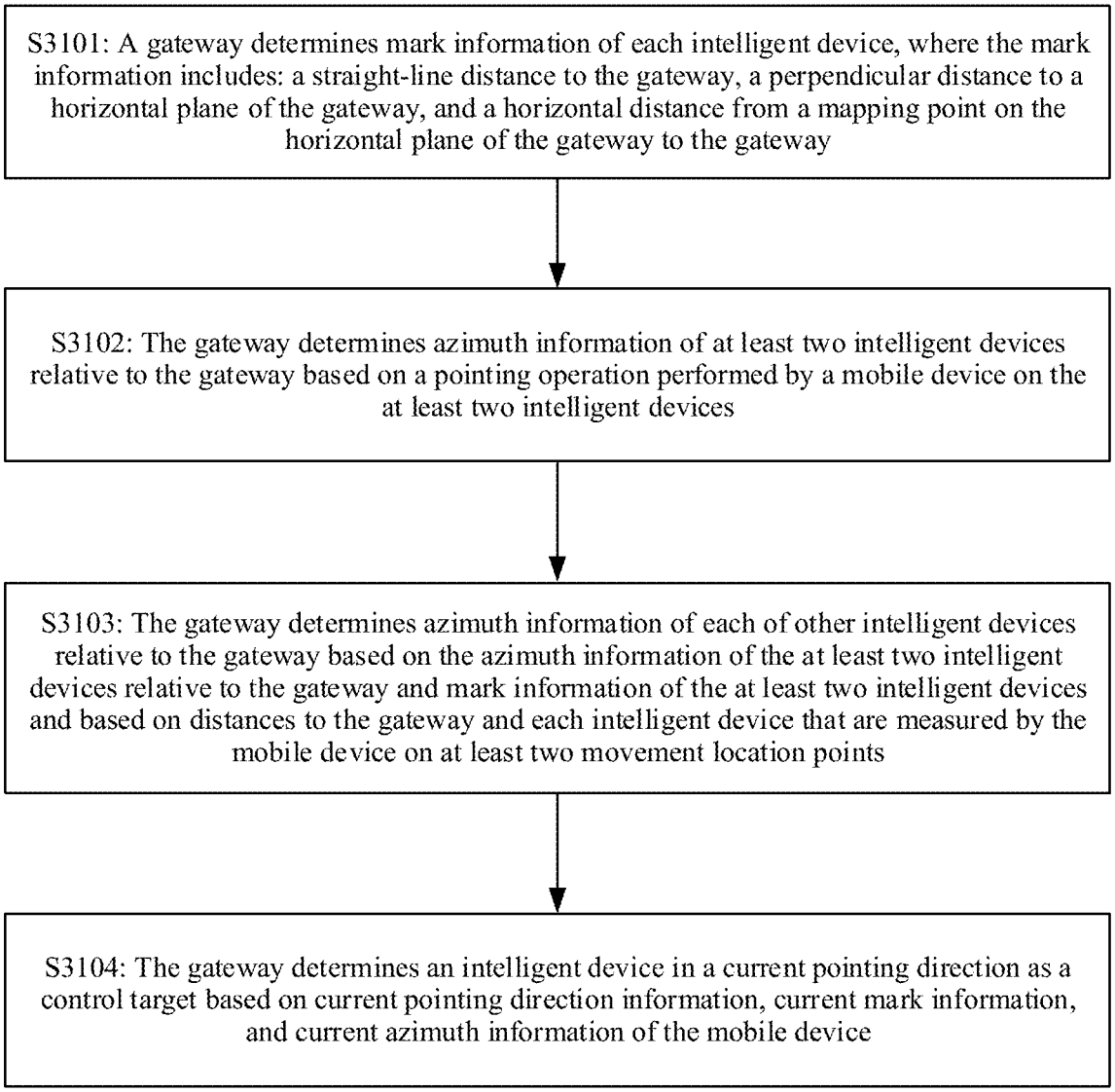
FIG. 31 is still another schematic flowchart of a method for determining a control target according to an embodiment of this application.

As shown in FIG. 31, the following specifically describes a method for determining a control target in an embodiment of this application when a gateway is used as a master computing center and three-dimensional location information is stored in the gateway.

S3101: The gateway determines mark information of each intelligent device.

Figure 32A:
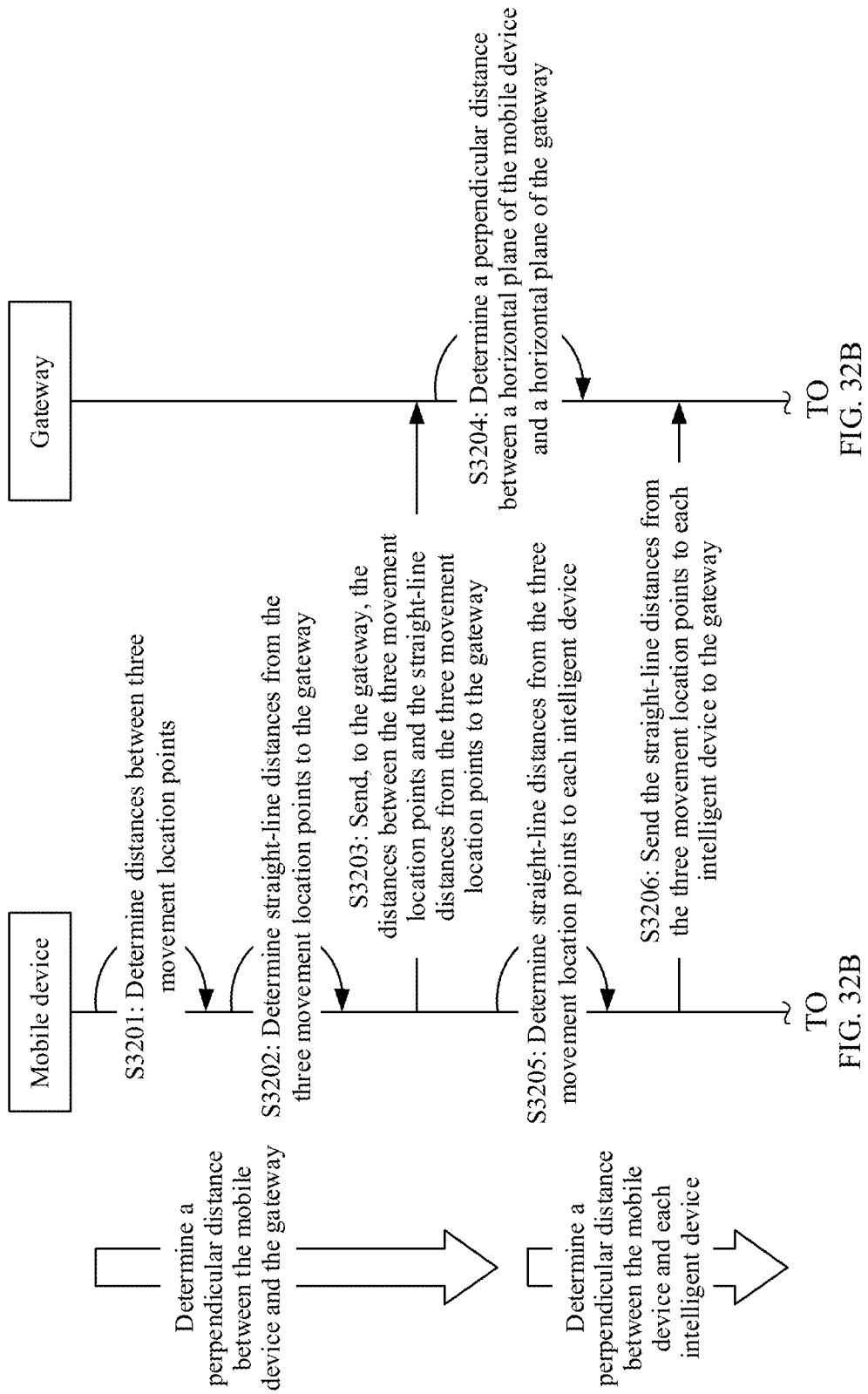

For details of this process, refer to example descriptions shown in FIG. 32A and FIG. 32B.

S3201: A mobile device determines distances between three movement location points.

S3202: The mobile device determines straight-line distances from the three movement location points to the gateway.

S3203: The mobile device sends, to the gateway, the distances between the three movement location points and the straight-line distances from the three movement location points to the gateway.

S3204: The gateway determines a perpendicular distance between a horizontal plane of the mobile device and a horizontal plane of the gateway.

S3205: The mobile device determines straight-line distances from the three movement location points to each intelligent device.

S3206: The mobile device sends the straight-line distances from the three movement location points to each intelligent device to the gateway.

S3207: The gateway determines a perpendicular distance between the horizontal plane of the mobile device and a horizontal plane of each intelligent device.

S3208: The gateway determines a perpendicular distance from each intelligent device to the horizontal plane of the gateway.

S3209: The gateway determines a straight-line distance to each intelligent device.

S3210: The gateway determines a horizontal distance from a projection point of each intelligent device on the horizontal plane of the gateway to the gateway.

For specific descriptions of steps S3201 to S3210, refer to steps S1501 to S1508, and details are not described herein again.

S3102: The gateway determines azimuth information of at least two intelligent devices relative to the gateway based on a pointing operation performed by a mobile device on the at least two intelligent devices.

Figure 33A:
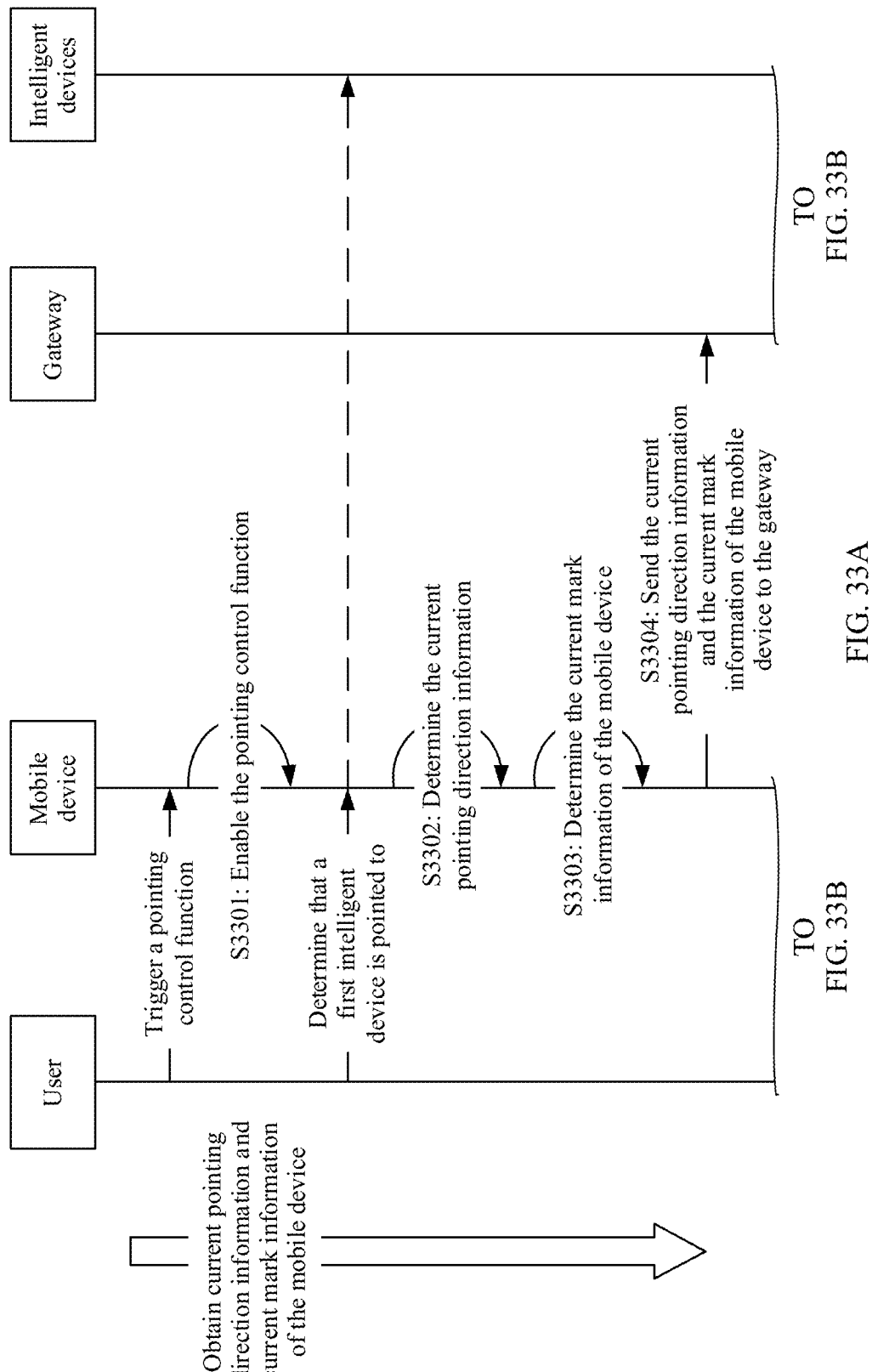
FIG. 33A, FIG. 33B, and FIG. 33C are still another example schematic flowchart of determining azimuth information of an intelligent device according to an embodiment of this application.
Figure 33B:
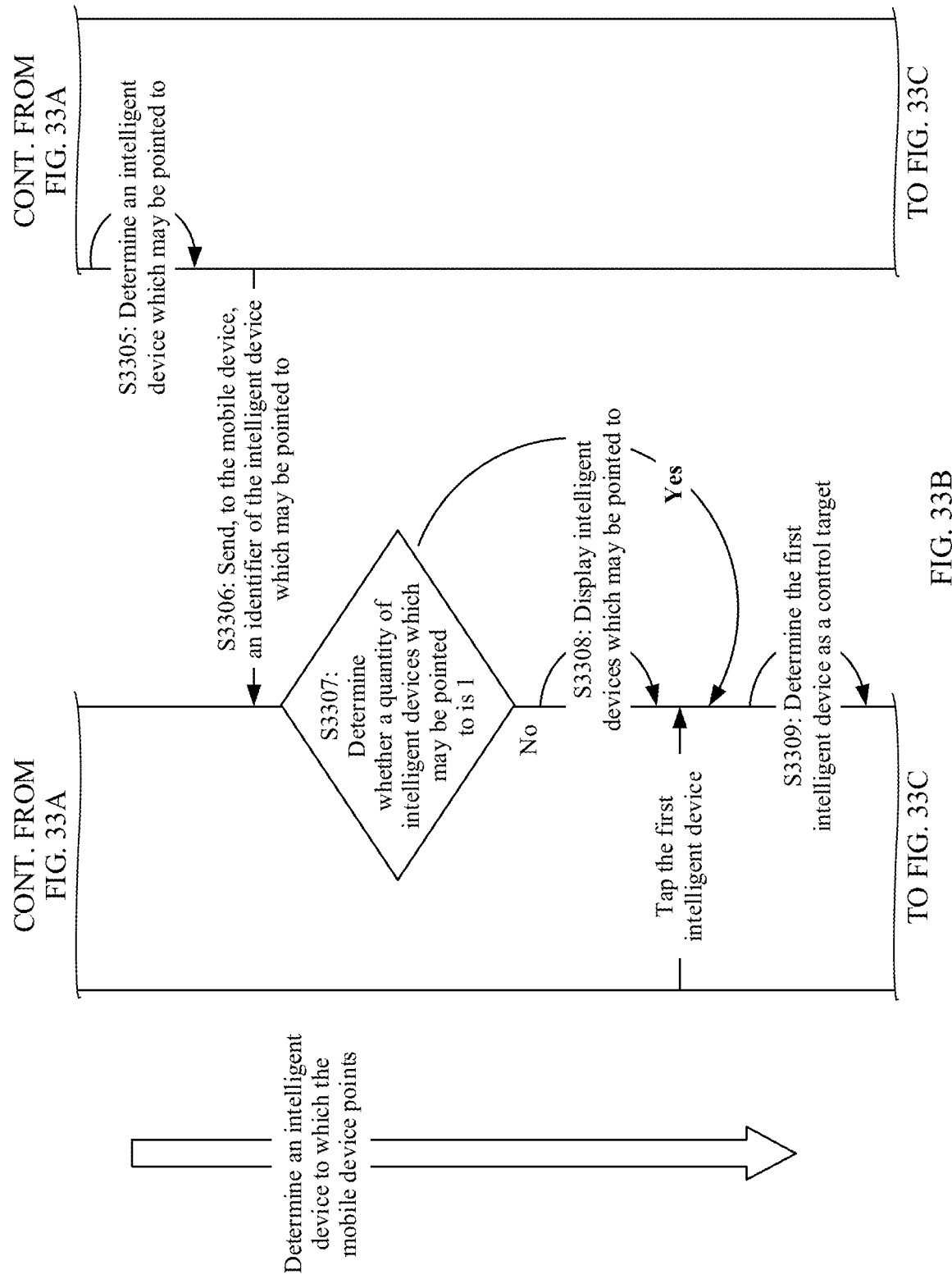
Figure 33C:
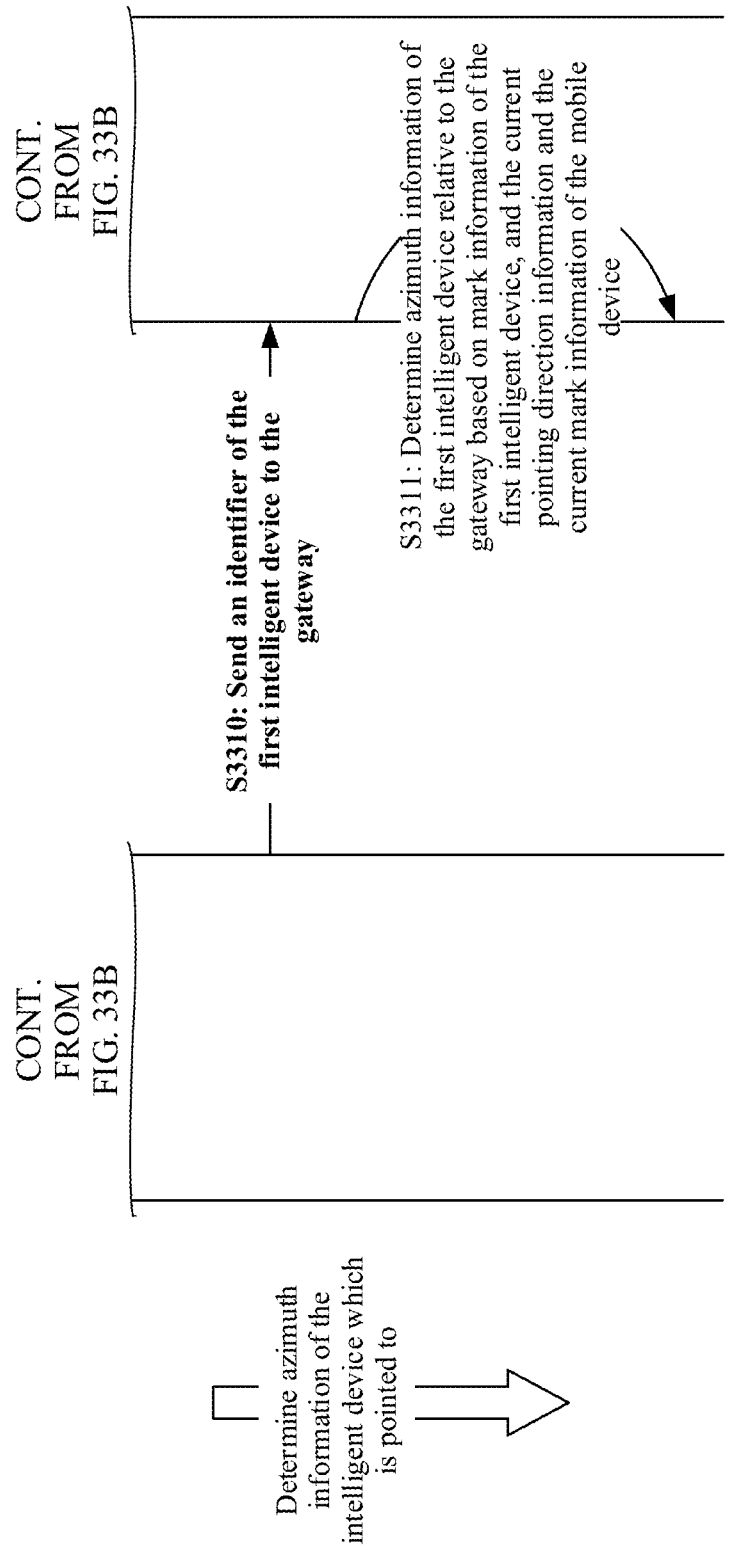

For details of this process, refer to example descriptions shown in FIG. 33A, FIG. 33B, and FIG. 33C.

S3301: In response to an operation that a user triggers a pointing control function, the mobile device enables the pointing control function.

S3302: In response to an operation that the user determines to point to a first intelligent device, the mobile device obtains current pointing direction information.

S3303: The mobile device determines current mark information of the mobile device.

S3304: The mobile device sends the current pointing direction information and current mark information of the mobile device to the gateway.

S3305: The gateway determines intelligent devices which may be pointed to.

S3306: The gateway sends, to the mobile device, an identifier of the intelligent device which may be pointed to.

S3307: The mobile device determines whether a quantity of intelligent devices which may be pointed to is 1.

S3308: The mobile device displays intelligent devices which may be pointed to.

S3309: The mobile device determines a first intelligent device as a control target.

S3310: The mobile device sends an identifier of the first intelligent device to the gateway.

S3311: The gateway determines azimuth information of the first intelligent device relative to the gateway based on mark information of the first intelligent device, and the current pointing direction information and current mark information of the mobile device.

For specific descriptions of steps S3301 to S3311, refer to steps S1901 to S1908, and details are not described herein again.

S3103: The gateway determines azimuth information of each of other intelligent devices relative to the gateway based on the azimuth information of the at least two intelligent devices relative to the gateway and mark information of the at least two intelligent devices and based on distances to the gateway and each intelligent device that are measured by the mobile device on at least two movement location points.

Figure 34:
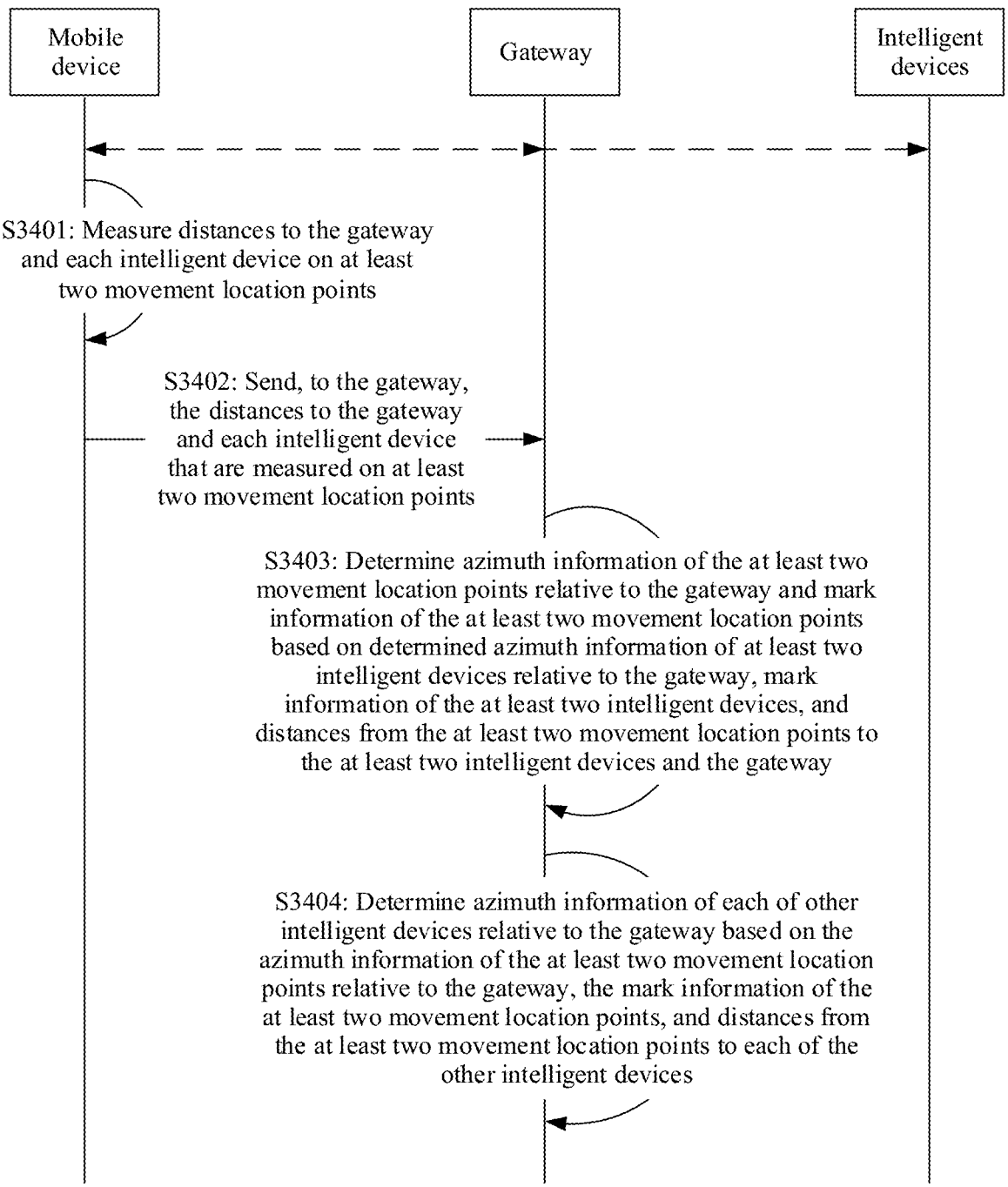
FIG. 34 is still another example schematic flowchart of determining azimuth information of each of other intelligent devices relative to a gateway according to an embodiment of this application; and FIG. 35A

For details of this process, refer to example descriptions shown in FIG. 34.

S3401: The mobile device measures distances to the gateway and each intelligent device on the at least two movement location points.

S3402: The mobile device sends, to the gateway, the distances to the gateway and each intelligent device that are measured on at least two movement location points.

S3403: The gateway determines azimuth information of the at least two movement location points relative to the gateway and mark information of the at least two movement location points based on determined azimuth information of at least two intelligent devices relative to the gateway, mark information of the at least two intelligent devices, and distances from the at least two movement location points to the at least two intelligent devices and the gateway.

S3404: The gateway determines azimuth information of each of other intelligent devices relative to the gateway based on the azimuth information of the at least two movement location points relative to the gateway, the mark information of the at least two movement location points, and distances from the at least two movement location points to each of the other intelligent devices.

For specific descriptions of steps S3401 to S3404, refer to steps S2101 to S2103, and details are not described herein again.

S3104: The gateway determines an intelligent device in a current pointing direction as a control target based on current pointing direction information, current mark information, and current azimuth information of the mobile device.

Figure 35A:
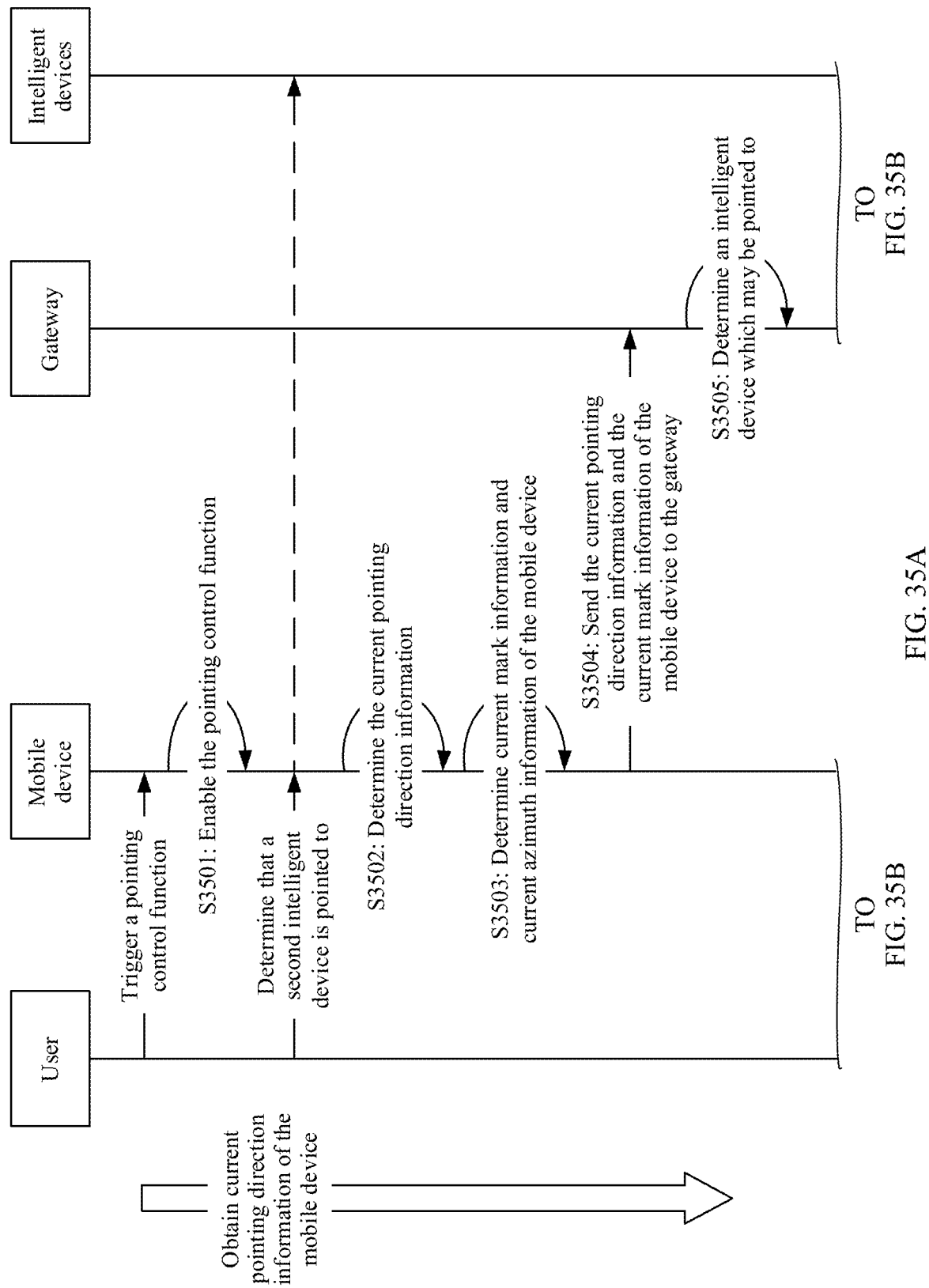
FIG. 35B is still another example schematic flowchart of determining a control target based on a pointing direction according to an embodiment of this application.
Figure 35B:
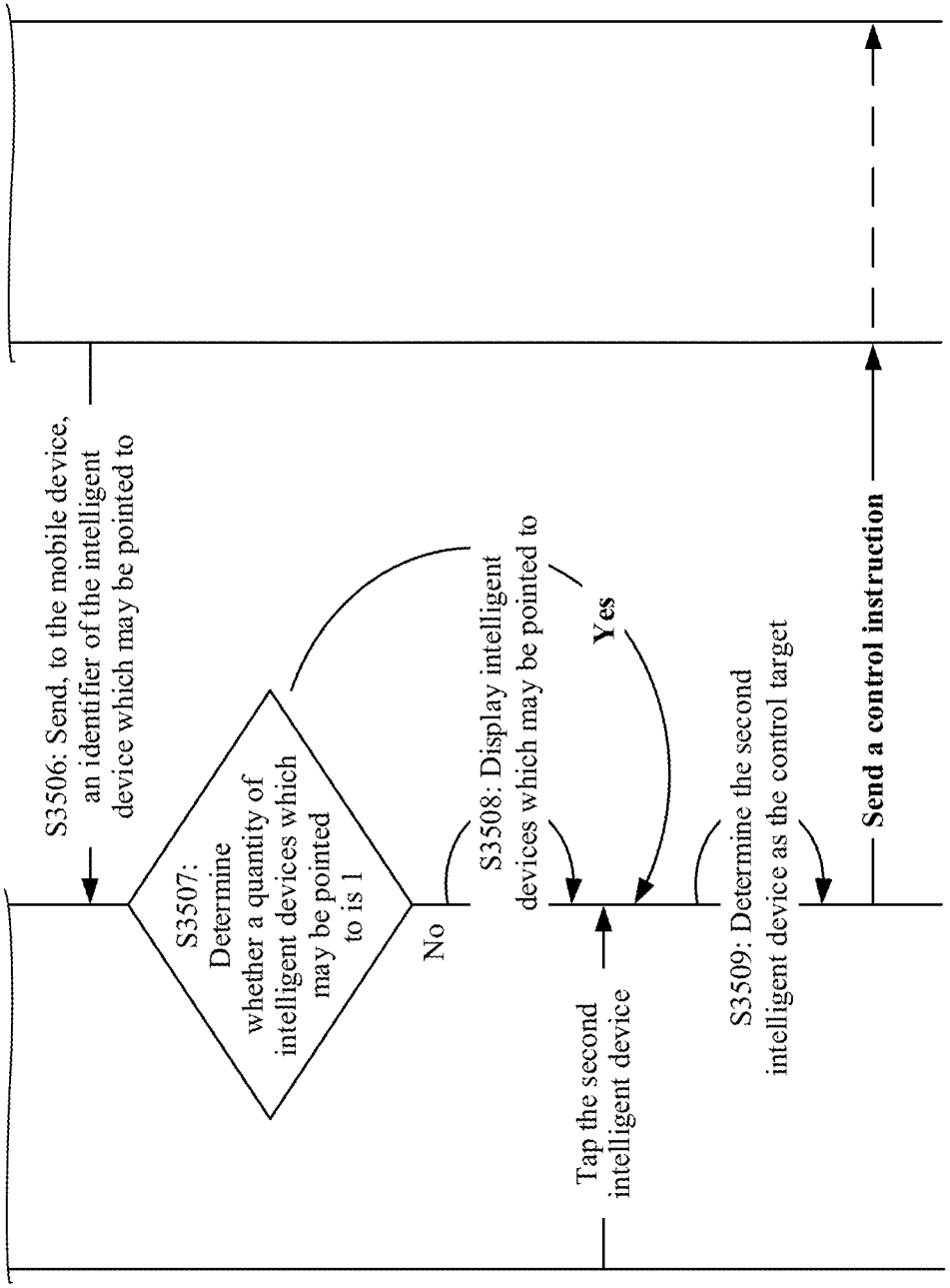

For details of this process, refer to example descriptions shown in FIG. 35A and FIG. 35B.

S3501: In response to an operation that a user triggers a pointing control function, the mobile device enables the pointing control function.

S3502: In response to an operation that the user determines to point to a second intelligent device, the mobile device obtains the current pointing direction information.

S3503: The mobile device determines current mark information and current azimuth information of the mobile device.

S3504: The mobile device sends the current pointing direction information and current mark information of the mobile device to the gateway.

S3505: The gateway determines an intelligent device which may be pointed to.

S3506: The gateway sends, to the mobile device, an identifier of the intelligent device which may be pointed to.

S3507: The mobile device determines whether a quantity of intelligent devices which may be pointed to is 1.

S3508: The mobile device displays intelligent devices which may be pointed to.

S3509: The mobile device determines a second intelligent device as the control target.

For specific descriptions of steps S3501 to S3509, refer to steps S2401 to S2407, and details are not described herein again.

In this embodiment of this application, the gateway is used as the master computing center, and the three-dimensional location information is stored in the gateway, so that a newly added mobile device can implement a pointing positioning function only by interacting with the gateway, and the mobile device does not need to perform a large amount of calculation, to improve usability of the pointing positioning function.

According to the context, the term "when" used in the foregoing embodiments may be interpreted as a meaning of "if", "after", "in response to determining", or "in response to detecting". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)".

All or a part of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the processes of the methods in embodiments may be implemented by a computer program instructing relevant hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

What is claimed is:

1. A method for determining a control target, comprising:
   determining, by a mobile device, mark information of each intelligent device of a plurality of intelligent devices, wherein the mobile device is interconnected to the plurality of intelligent devices through a gateway, wherein the mark information comprises a straight-line distance to the gateway and a perpendicular distance to a horizontal plane of the gateway;
   determining, by the mobile device, azimuth information of at least two intelligent devices relative to the gateway based on a pointing operation performed by the mobile device on the at least two intelligent devices, wherein the azimuth information indicates an azimuth of a projection on the horizontal plane of the gateway relative to the gateway;
   determining, by the mobile device, azimuth information of each of other intelligent device relative to the gateway based on the azimuth information of the at least two intelligent devices relative to the gateway and mark information of the at least two intelligent devices and based on distances to the gateway and each intelligent device, wherein the distances are measured by the mobile device on at least two movement location points that the mobile device passes through in a movement process; and determining, by the mobile device, an intelligent device in a current pointing direction of the mobile device as a control target based on current pointing direction information, current mark information, and current azimuth information of the mobile device.

2. The method according to claim 1, wherein the determining, by the mobile device, the mark information of each intelligent device comprises:

determining, by the mobile device, distances among three movement location points and straight-line distances from the three movement location points to each intelligent device, wherein the three movement location points are not on a same straight line; and determining, by the mobile device, the mark information of each intelligent device based on the distances between the three movement location points and the straight-line distances from the three movement location points to each intelligent device.

3. The method according to claim 2, wherein the determining, by the mobile device, the mark information of each intelligent device based on the distances among the three movement location points and the straight-line distances from the three movement location points to each intelligent device comprises:

determining, by the mobile device, the mark information of each intelligent device based on the distances among the three movement location points, the straight-line distances from the three movement location points to each intelligent device, and a perpendicular height calculation model, wherein the perpendicular height calculation model is used to determine a height of a triangular pyramid under a condition that each edge length of the triangular pyramid is known.

4. The method according to claim 1, wherein the determining, by the mobile device, the azimuth information of at least two intelligent devices relative to the gateway based on the pointing operation performed by the mobile device on the at least two intelligent devices comprises:

in response to an operation that the mobile device points towards a first intelligent device, obtaining, by the mobile device, current pointing direction information and current mark information, wherein the pointing direction information comprises an elevation angle of the mobile device and a pointing azimuth of the mobile device, and the first intelligent device is an intelligent device in the plurality of intelligent devices interconnected to the gateway;

in response to a user operation that determines the first intelligent device as a control target, determining, by the mobile device, azimuth information of the first intelligent device relative to the gateway based on mark information of the first intelligent device, the current pointing direction information, and the current mark information.

5. The method according to claim 4, wherein the determining, by the mobile device, the azimuth information of the first intelligent device relative to the gateway based on mark information of the first intelligent device, the current pointing direction information, and the current mark information comprises:

determining, by the mobile device, the azimuth information of the first intelligent device relative to the gateway based on the mark information of the first intelligent device, the current pointing direction information, the current mark information, and an azimuth information calculation model, wherein the azimuth information calculation model is used to determine azimuth information of a pointed point relative to the gateway under a condition that mark information of a pointing point and the pointed point in space and pointing azimuth information when the pointing point points to the pointed point are known.

6. The method according to claim 1, wherein the determining, by the mobile device, the azimuth information of each of other intelligent devices relative to the gateway based on the azimuth information of the at least two intelligent devices relative to the gateway and mark information of the at least two intelligent devices and based on distances to the gateway and each intelligent device comprises:

measuring, by the mobile device, the distances to the gateway and each intelligent device on the at least two movement location points;

determining, by the mobile device, azimuth information of the at least two movement location points relative to the gateway and mark information of the at least two movement location points based on the determined azimuth information of the at least two intelligent devices relative to the gateway, the mark information of the at least two intelligent devices, and distances from the at least two movement location points to the at least two intelligent devices and the gateway; and determining, by the mobile device, the azimuth information of each of the other intelligent devices relative to the gateway based on the azimuth information of the at least two movement location points relative to the gateway, the mark information of the at least two movement location points, and distances from the at least two movement location points to each of the other intelligent devices different from the at least two intelligent devices.

7. The method according to claim 1, wherein the determining, by the mobile device, the intelligent device in the current pointing direction of the mobile device as the control target based on current pointing direction information, current mark information, and current azimuth information of the mobile device comprises:

in response to an operation that the mobile device points towards the intelligent device, determining, by the mobile device, the current pointing direction information, the current mark information, and the current azimuth information of the mobile device; and determining, by the mobile device, the intelligent device in the current pointing direction of the mobile device as the control target based on the current pointing direction information, the current mark information, and the current azimuth information of the mobile device, the mark information and the azimuth information of each intelligent device, and a pointed target calculation model, wherein the pointed target calculation model is used to determine the pointed point under a condition that mark information and azimuth information of each point in space and the pointing direction information when the pointing point points to the pointed point are known.

8. The method according to claim 1, wherein before the determining, by the mobile device, the intelligent device in the current pointing direction of the mobile device as the control target based on current pointing direction information, current mark information, and current azimuth information of the mobile device, the method further comprises:
enabling, by the mobile device, a pointing control function in response to a user operation that triggers the pointing control function.

9. The method according to claim 1, wherein after the determining, by the mobile device, the intelligent device in the current pointing direction of the mobile device as the control target based on current pointing direction information, current mark information, and current azimuth information of the mobile device, the method further comprises:
displaying, by the mobile device, a control interface for the control target, and triggering a corresponding operation instruction in response to a user touch operation; or
monitoring, by the mobile device, a user action, and triggering a corresponding control instruction in response to the user action.

10. A mobile device, comprising:
one or more processors; and
a memory coupled to the one or more processors and storing computer instructions that, when executed by the one or more processors, cause the mobile device to perform the following operations:
determining mark information of each intelligent device of a plurality of intelligent devices, wherein the mobile device is interconnected to the plurality of intelligent devices through a gateway, and the mark information comprises a straight-line distance to the gateway and a perpendicular distance to a horizontal plane of the gateway;
determining azimuth information of at least two intelligent devices relative to the gateway based on a pointing operation performed by the mobile device on the at least two intelligent devices, wherein the azimuth information indicates an azimuth of a projection on the horizontal plane of the gateway relative to the gateway;
determining azimuth information of each of other intelligent devices relative to the gateway based on the azimuth information of the at least two intelligent devices relative to the gateway and mark information of the at least two intelligent devices and based on distances to the gateway and each intelligent device, wherein the distances are measured by the mobile device on at least two movement location points that the mobile device passes through in a movement process; and
determining an intelligent device in a current pointing direction of the mobile device as a control target based on current pointing direction information, current mark information, and current azimuth information of the mobile device.

11. The mobile device according to claim 10, wherein the computer instructions, when executed by the one or more processors, cause the mobile device to perform the following operations:
determining distances among three movement location points and straight-line distances from the three movement location points to each intelligent device, wherein the three movement location points are not on a same straight line; and
determining the mark information of each intelligent device based on the distances among the three movement location points and the straight-line distances from the three movement location points to each intelligent device.

12. The mobile device according to claim 11, wherein the computer instructions, when executed by the one or more processors, cause the mobile device to perform the following operation:
determining the mark information of each intelligent device based on the distances among the three movement location points, the straight-line distances from the three movement location points to each intelligent device, and a perpendicular height calculation model, wherein the perpendicular height calculation model is used to determine a height of a triangular pyramid under a condition that each edge length of the triangular pyramid is known.

13. The mobile device according to claim 10, wherein the computer instructions, when executed by the one or more processors, cause the mobile device to perform the following operations:
in response to an operation that the mobile device points towards a first intelligent device, obtaining current pointing direction information and current mark information, wherein the pointing direction information comprises an elevation angle of the mobile device and a pointing azimuth of the mobile device, and the first intelligent device is an intelligent device in intelligent devices interconnected to the gateway;
in response to a user operation that determines the first intelligent device as a control target, determining azimuth information of the first intelligent device relative to the gateway based on mark information of the first intelligent device, the current pointing direction information, and the current mark information.

14. The mobile device according to claim 13, wherein the computer instructions, when executed by the one or more processors, cause the mobile device to perform the following operation:
determining the azimuth information of the first intelligent device relative to the gateway based on the mark information of the first intelligent device, the current pointing direction information, the current mark information, and an azimuth information calculation model, wherein the azimuth information calculation model is used to determine azimuth information of a pointed point relative to the gateway under a condition that mark information of a pointing point and the pointed point in space and pointing azimuth information when the pointing point points to the pointed point are known.

15. The mobile device according to claim 10, wherein the computer instructions, when executed by the one or more processors, cause the mobile device to perform the following operations:
measuring the distances to the gateway and each intelligent device on the at least two movement location points;
determining azimuth information of the at least two movement location points relative to the gateway and mark information of the at least two movement location points based on the determined azimuth information of the at least two intelligent devices relative to the gateway, the mark information of the at least two intelligent devices, and distances from the at least two movement location points to the at least two intelligent devices and the gateway; and determining the azimuth information of each of the other intelligent devices relative to the gateway based on the azimuth information of the at least two movement location points relative to the gateway, the mark information of the at least two movement location points, and distances from the at least two movement location points to each of the other intelligent devices different from the at least two intelligent devices.

16. The mobile device according to claim 10, wherein the computer instructions, when executed by the one or more processors, cause the mobile device to perform the following operations:
   in response to an operation that the mobile device points towards the intelligent device, determining the current pointing direction information, the current mark information, and the current azimuth information of the mobile device; and
   determining the intelligent device in the current pointing direction of the mobile device as the control target based on the current pointing direction information, the current mark information, and the current azimuth information of the mobile device, the mark information and the azimuth information of each intelligent device, and a pointed target calculation model, wherein the pointed target calculation model is used to determine the pointed point under a condition that mark information and azimuth information of each point in space and the pointing direction information when the pointing point points to the pointed point are known.

17. The mobile device according to claim 10, wherein the computer instructions, when executed by the one or more processors, cause the mobile device to perform the following operation:
   enabling a pointing control function in response to a user operation that triggers the pointing control function.

18. The mobile device according to claim 10, wherein the computer instructions, when executed by the one or more processors, cause the mobile device to perform the following operation:
   displaying a control interface for the control target, and triggering a corresponding operation instruction in response to a user touch operation; or
   monitoring a user action, and triggering a corresponding control instruction in response to the user action.

19. A non-transitory computer-readable storage medium, comprising computer instructions that, when the computer instructions are run on a mobile device, cause the mobile device to perform the following operations:
   determining mark information of each intelligent device of a plurality of intelligent devices,
   wherein the mobile device is interconnected to the plurality of intelligent devices through a gateway, and the mark information comprises a straight-line distance to the gateway and a perpendicular distance to a horizontal plane of the gateway;
   determining azimuth information of at least two intelligent devices relative to the gateway based on a pointing operation performed by the mobile device on the at least two intelligent devices,
   wherein the azimuth information indicates an azimuth of a projection on the horizontal plane of the gateway relative to the gateway;
   determining azimuth information of each of other intelligent devices relative to the gateway based on the azimuth information of the at least two intelligent devices relative to the gateway and mark information of the at least two intelligent devices and based on distances to the gateway and
   each intelligent device, wherein the distances are measured by the mobile device on at least two movement location points that the mobile device passes through in a movement process; and
   determining an intelligent device in a current pointing direction of the mobile device as a control target based on current pointing direction information, current mark information, and
   current azimuth information of the mobile device.

20. The non-transitory computer-readable storage medium according to claim 19, wherein the computer instructions when run on the mobile device, cause the mobile device to perform the following operations:
   determining distances among three movement location points and straight-line distances from the three movement location points to each intelligent device, wherein the three movement location points are not on a same straight line; and
   determining the mark information of each intelligent device based on the distances among the three movement location points and the straight-line distances from the three movement location points to each intelligent device.

* * * * *